United States Patent [19]
Okayama et al.

[11] Patent Number: 5,940,221
[45] Date of Patent: Aug. 17, 1999

[54] ZOOM LENS AND VIDEO CAMERA COMPRISING THE SAME

[75] Inventors: Hiroaki Okayama, Nara; Hisayuki II; Shusuke Ono, both of Osaka, all of Japan

[73] Assignee: Matsushita Electric Industrial Co. Ltd., Osaka, Japan

[21] Appl. No.: 08/603,639

[22] Filed: Feb. 20, 1996

[30] Foreign Application Priority Data

Feb. 20, 1995 [JP] Japan .................................. 7-031063

[51] Int. Cl.⁶ ........................................................ G02B 15/14
[52] U.S. Cl. ........................... 359/687; 359/683; 359/708
[58] Field of Search ................................. 359/687, 682, 359/681, 684, 683, 708

[56] References Cited

U.S. PATENT DOCUMENTS

| | | | |
|---|---|---|---|
| 5,000,551 | 3/1991 | Shibayama | 359/687 |
| 5,235,466 | 8/1993 | Ono et al. | 359/687 |
| 5,363,242 | 11/1994 | Yokota | 359/684 |
| 5,396,367 | 3/1995 | Ono et al. | 359/687 |
| 5,430,576 | 7/1995 | Hamano | 359/684 |
| 5,568,321 | 10/1996 | Ogawa et al. | 359/687 |
| 5,570,233 | 10/1996 | Mihara et al. | 359/687 |

FOREIGN PATENT DOCUMENTS

| | | |
|---|---|---|
| 0 531 925 | 9/1992 | European Pat. Off. . |
| 0 566 073 | 4/1993 | European Pat. Off. . |
| 0 628 844 | 6/1994 | European Pat. Off. . |
| 2-053017 | 2/1990 | Japan . |
| 3-237420 | 10/1991 | Japan . |
| 5-297275 | 11/1993 | Japan . |
| 6-109975 | 4/1994 | Japan . |

*Primary Examiner*—Georgia Epps
*Assistant Examiner*—Jordan M. Schwartz
*Attorney, Agent, or Firm*—Merchant, Gould, Smith, Edell, Welter & Schmidt

[57] ABSTRACT

A compact zoom lens comprising a small number of lenses, providing an aperture of about F1.4 and a zoom ration of about 14, with a full angle of view at the wide angle end of 64° or wider. The zoom lens of the present invention comprises, aligned respectively from the object side, a fixed first lens group, comprising a lens with a negative refracting power, a lens with a positive refracting power, and a meniscus lens with a positive refracting power; a movable second lens group to provide zooming effect, comprising a lens with a negative refracting power, a biconcave lens with a negative refracting power, and a lens with a positive refracting power, with at least one surface of these lenses aspheric; a fixed third lens group with a positive refracting power, with at least one surface of these lenses aspheric; a fourth lens group, movable for compensating the position of the focal plane, with a positive refracting power, with at least one surface of the lenses aspheric. The below mentioned formula (1) is satisfied, $$0.1 < (f_w \cdot \tan W)/(f_1 \cdot |f_2|)^{1/2} < 0.35 \tag{1}$$

where $f_w$ is a focal length of the zoom lens operating in a wide angle condition, $W$ is the half angle of view of the zoom lens operating in the wide angle condition, $f_1$ is a focal length of the first lens group, $f_2$ is a focal length of the second lens group.

68 Claims, 42 Drawing Sheets

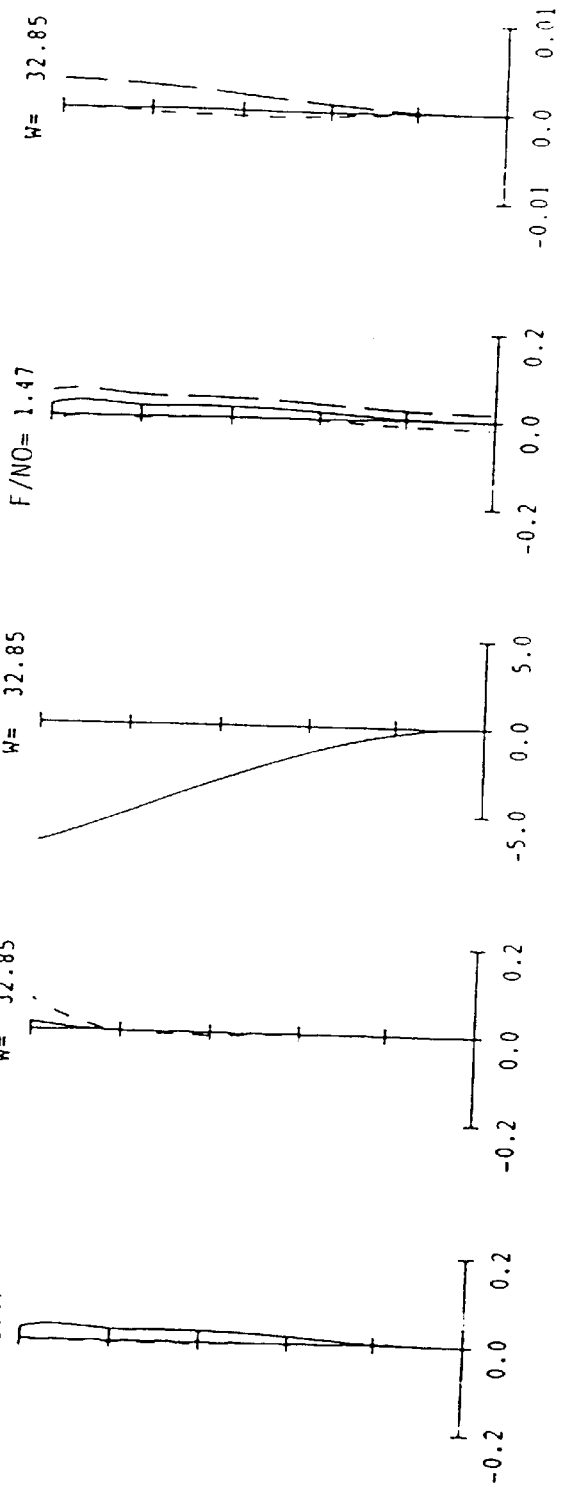
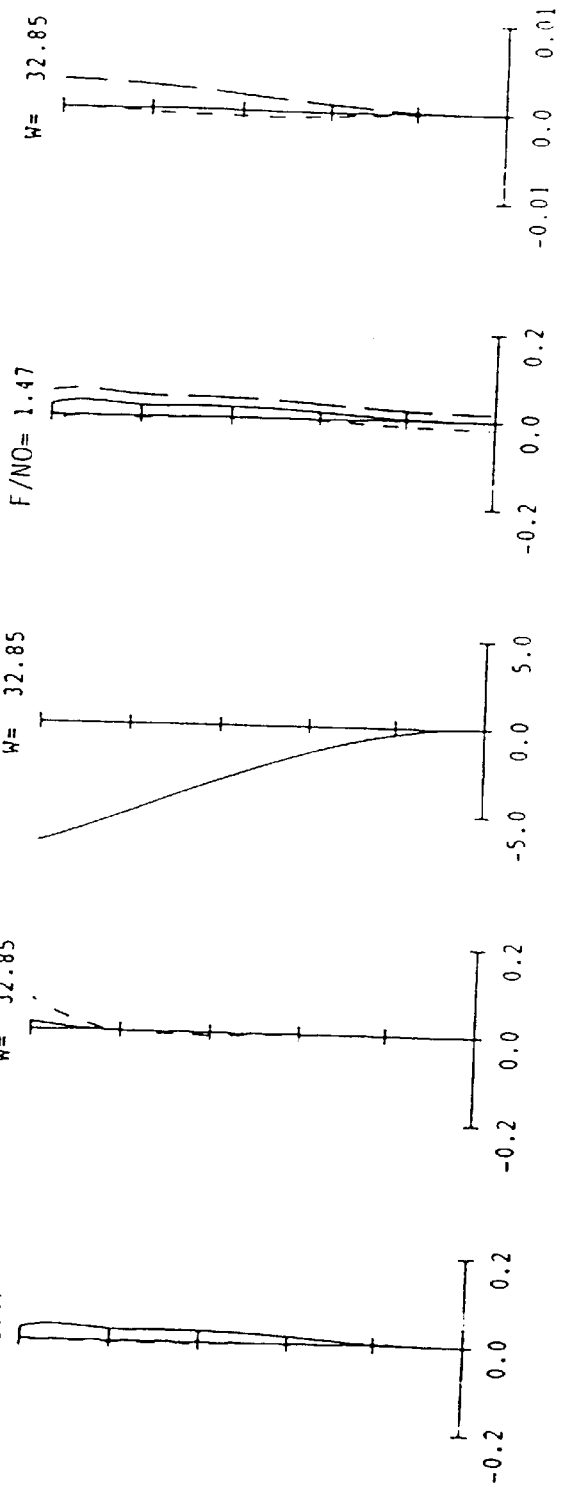
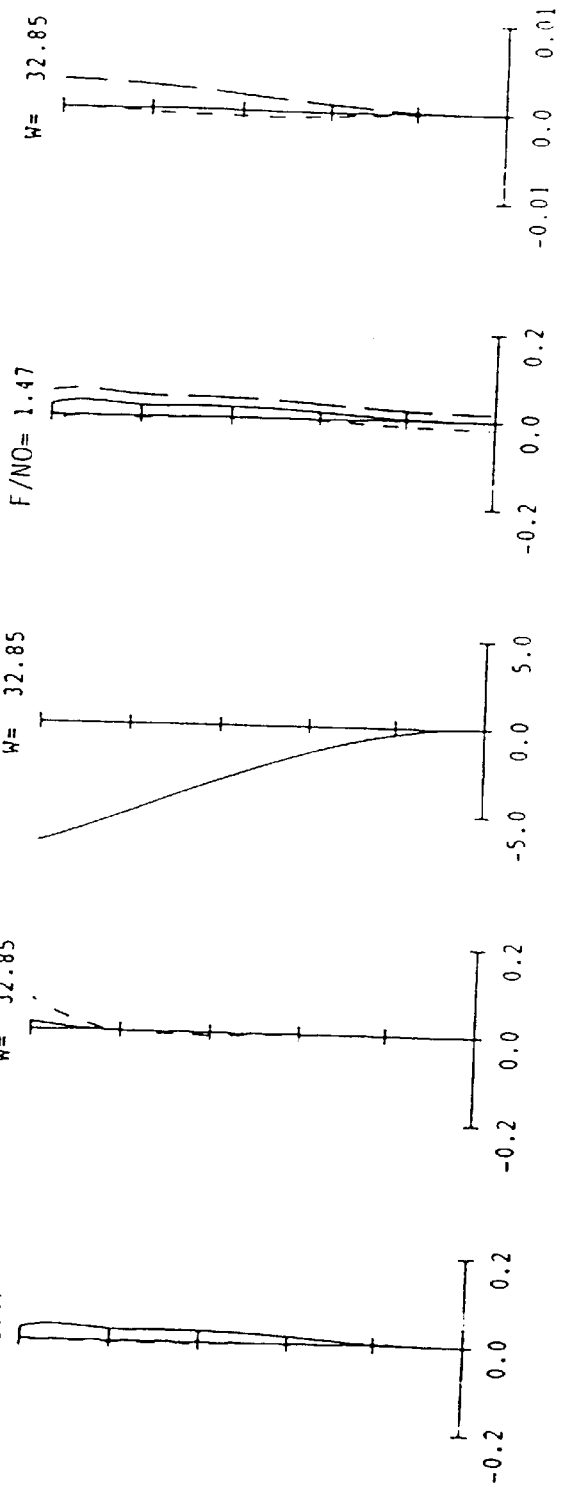
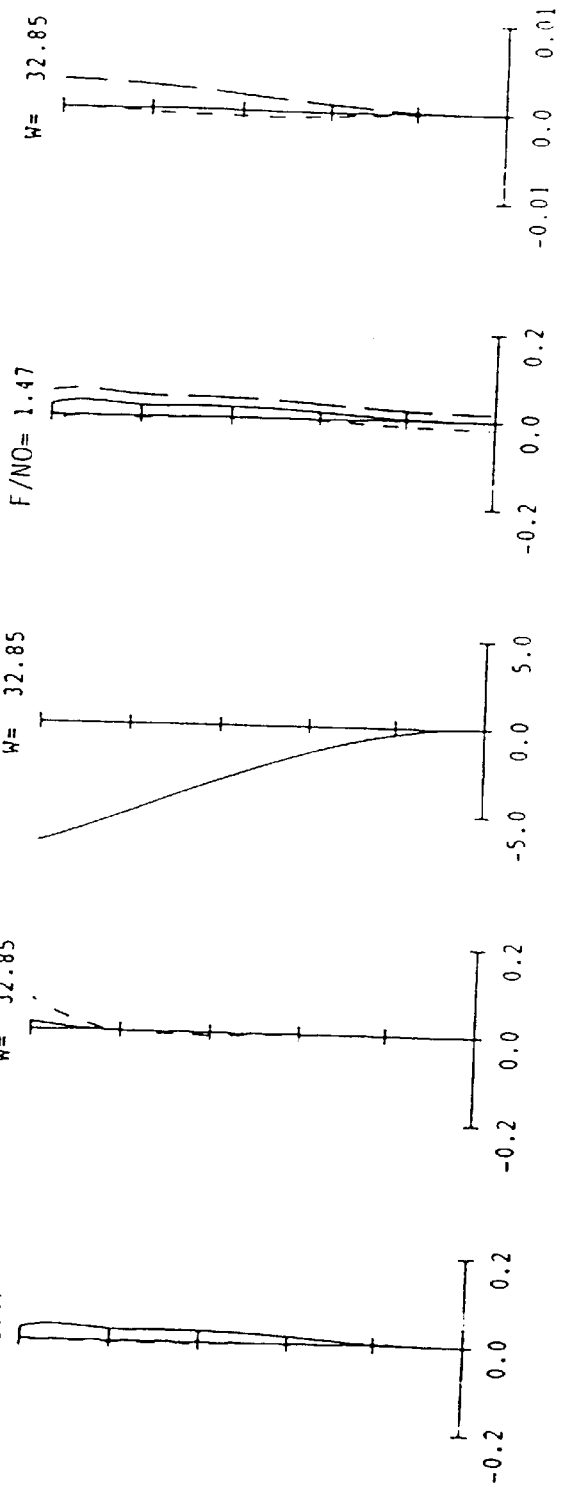
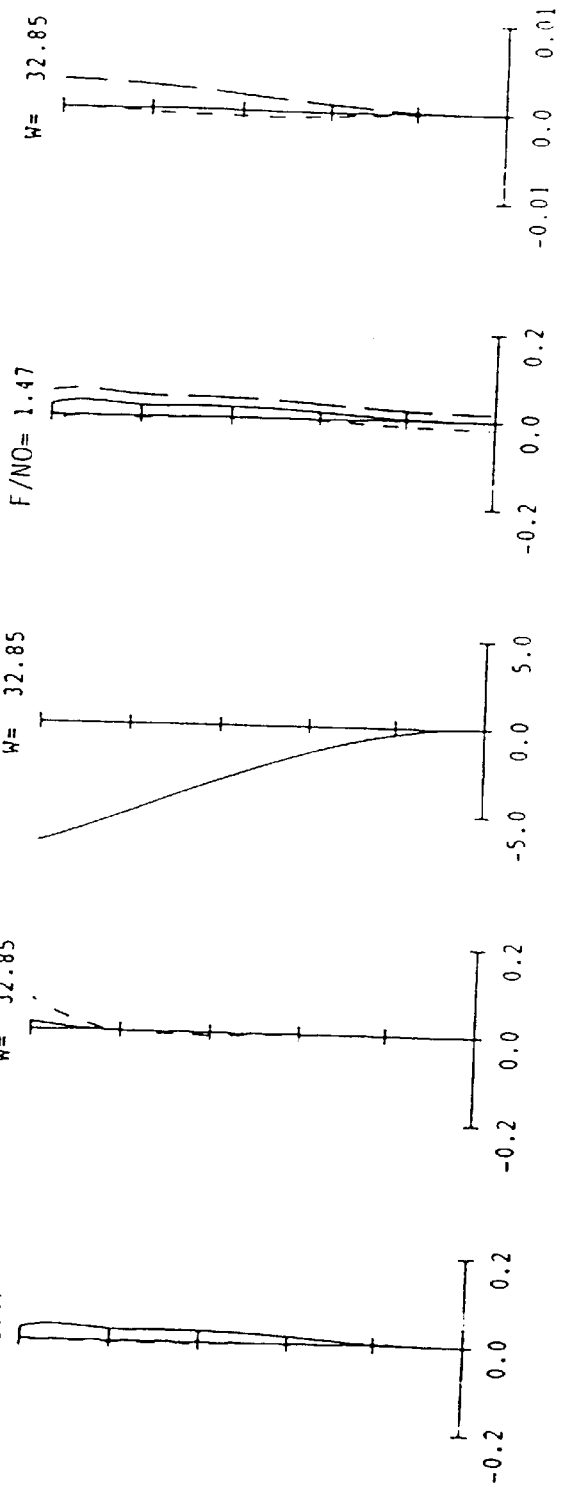

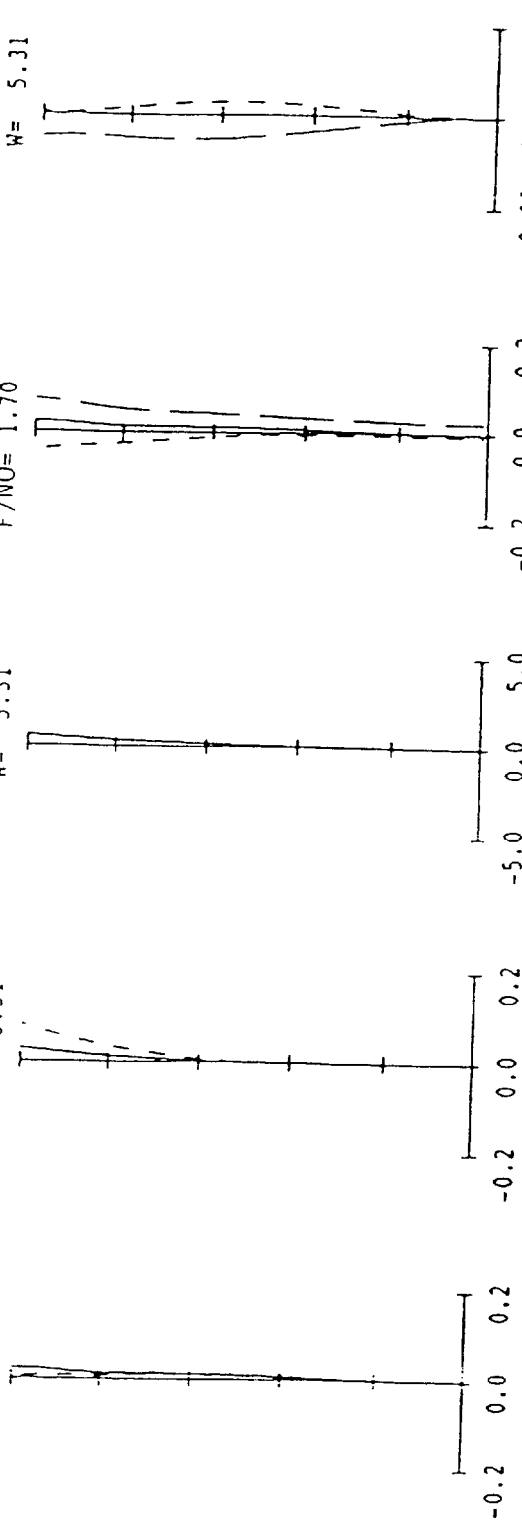

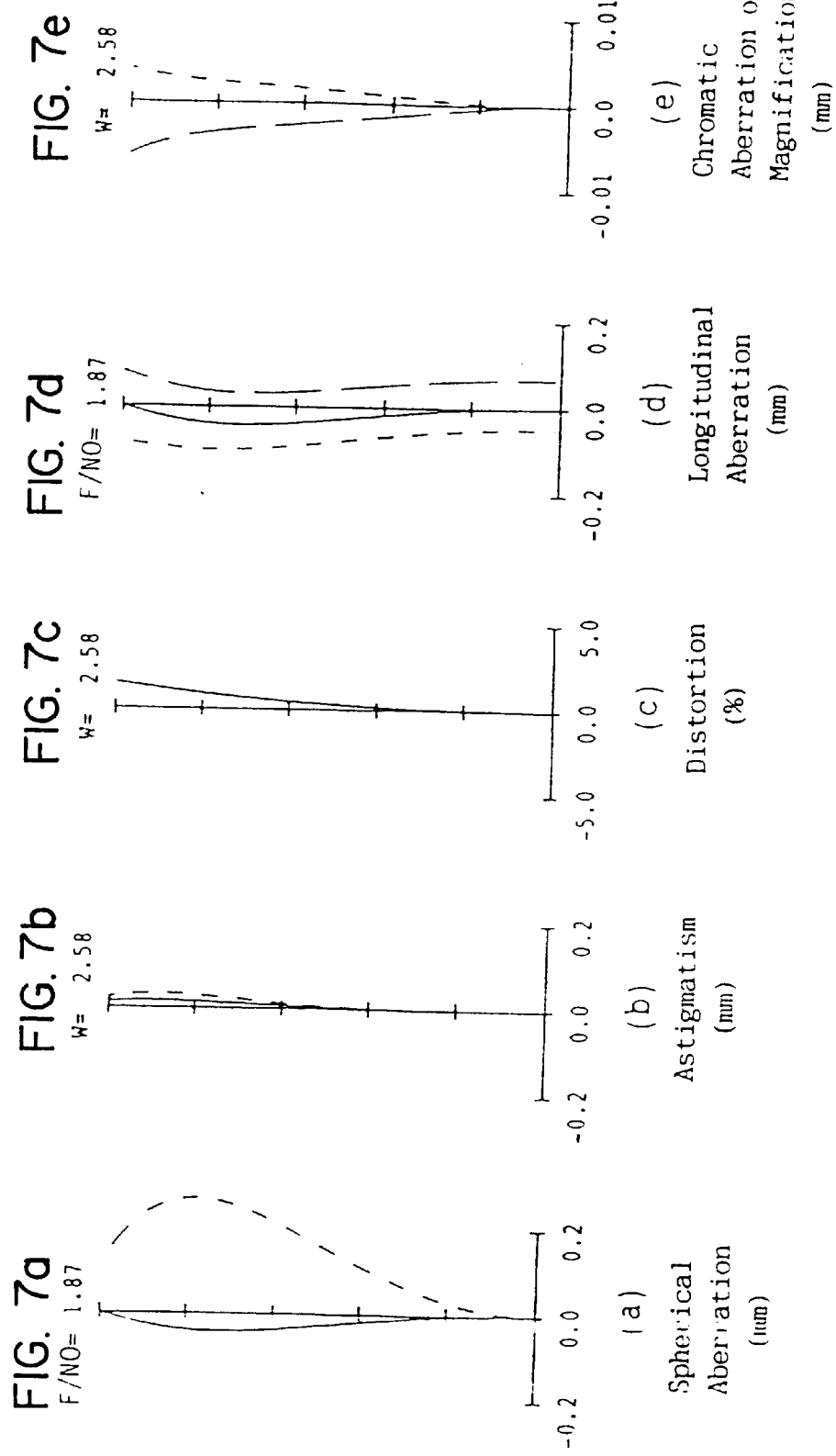

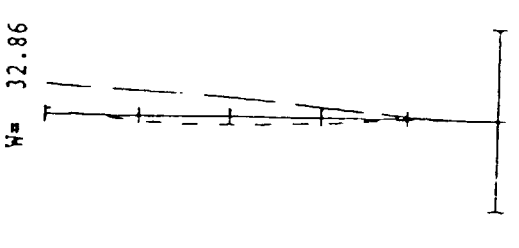
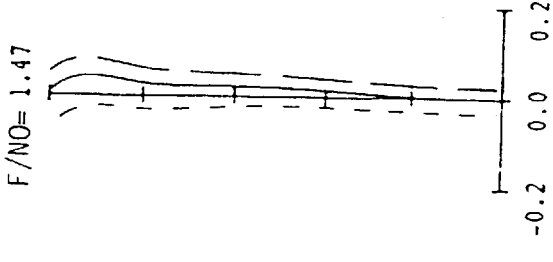
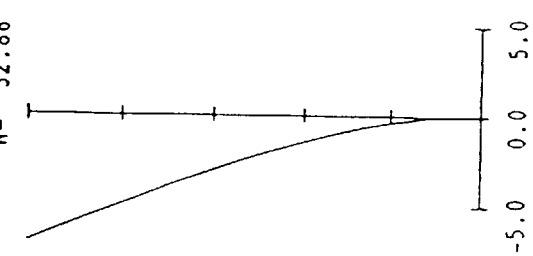
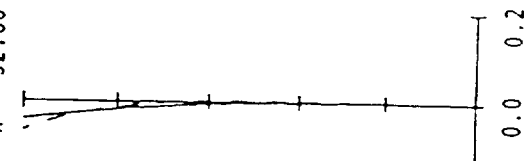
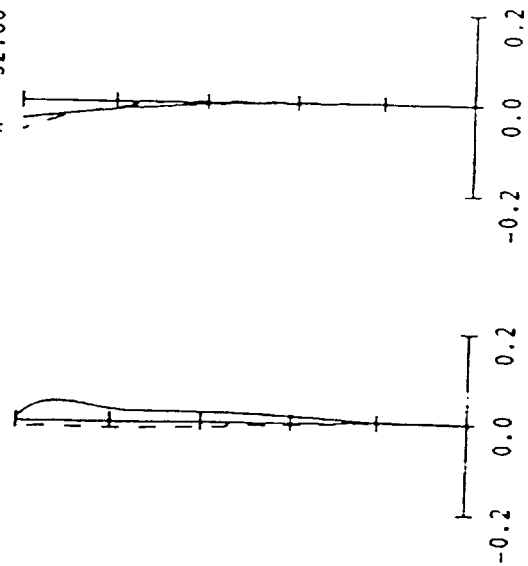

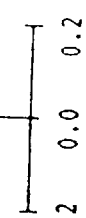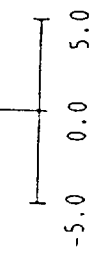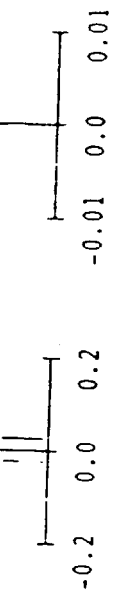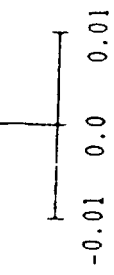
FIG. 9a  F/NO= 1.44 — Spherical Aberration (mm)
FIG. 9b  W= 5.52 — Astigmatism (mm)
FIG. 9c  W= 5.52 — Distortion (%)
FIG. 9d  F/NO= 1.44 — Longitudinal Aberration (mm)
FIG. 9e  W= 5.52 — Chromatic Aberration of Magnification (mm)

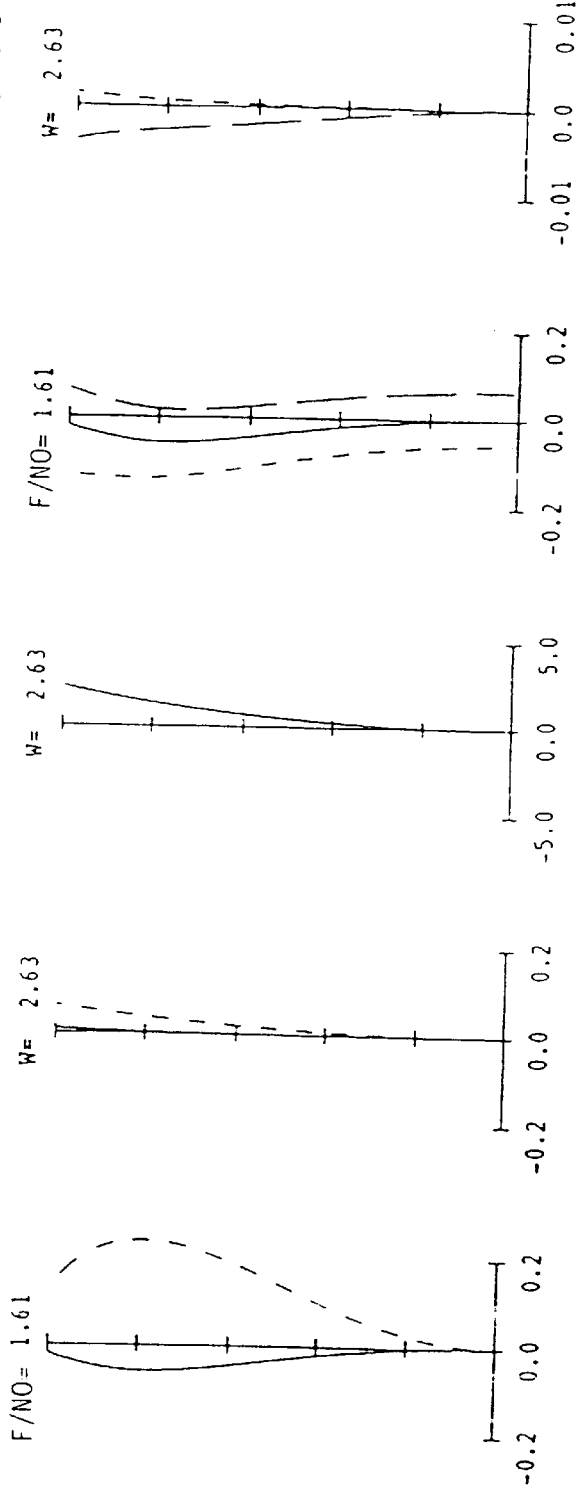

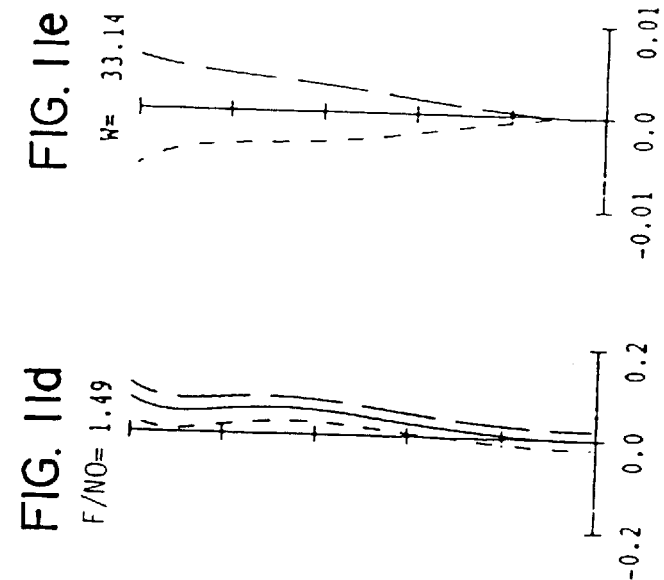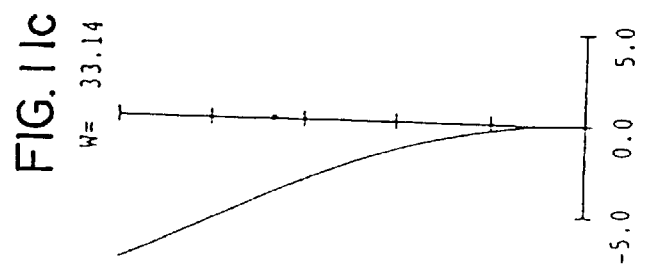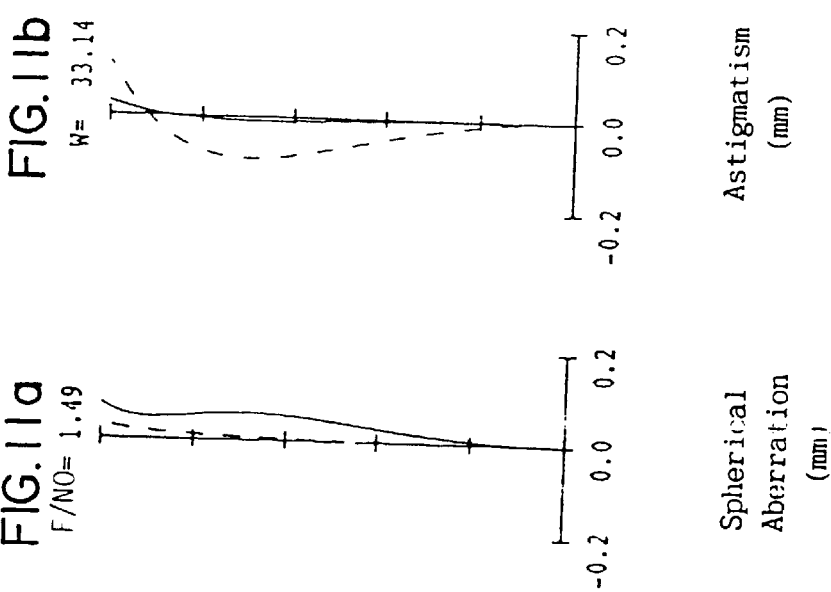

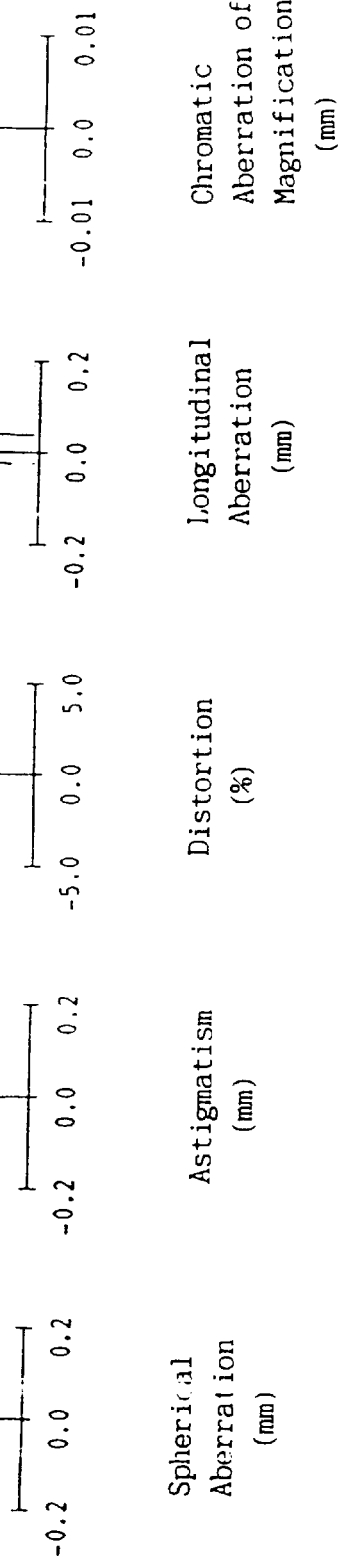

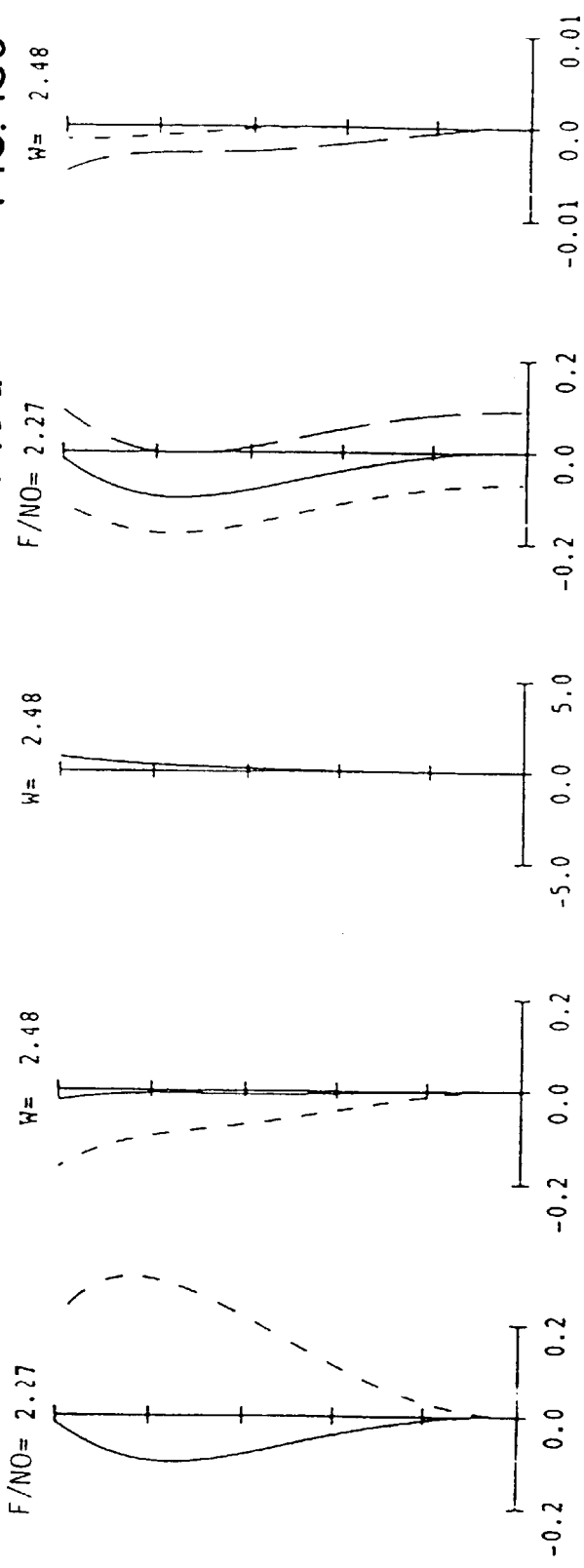

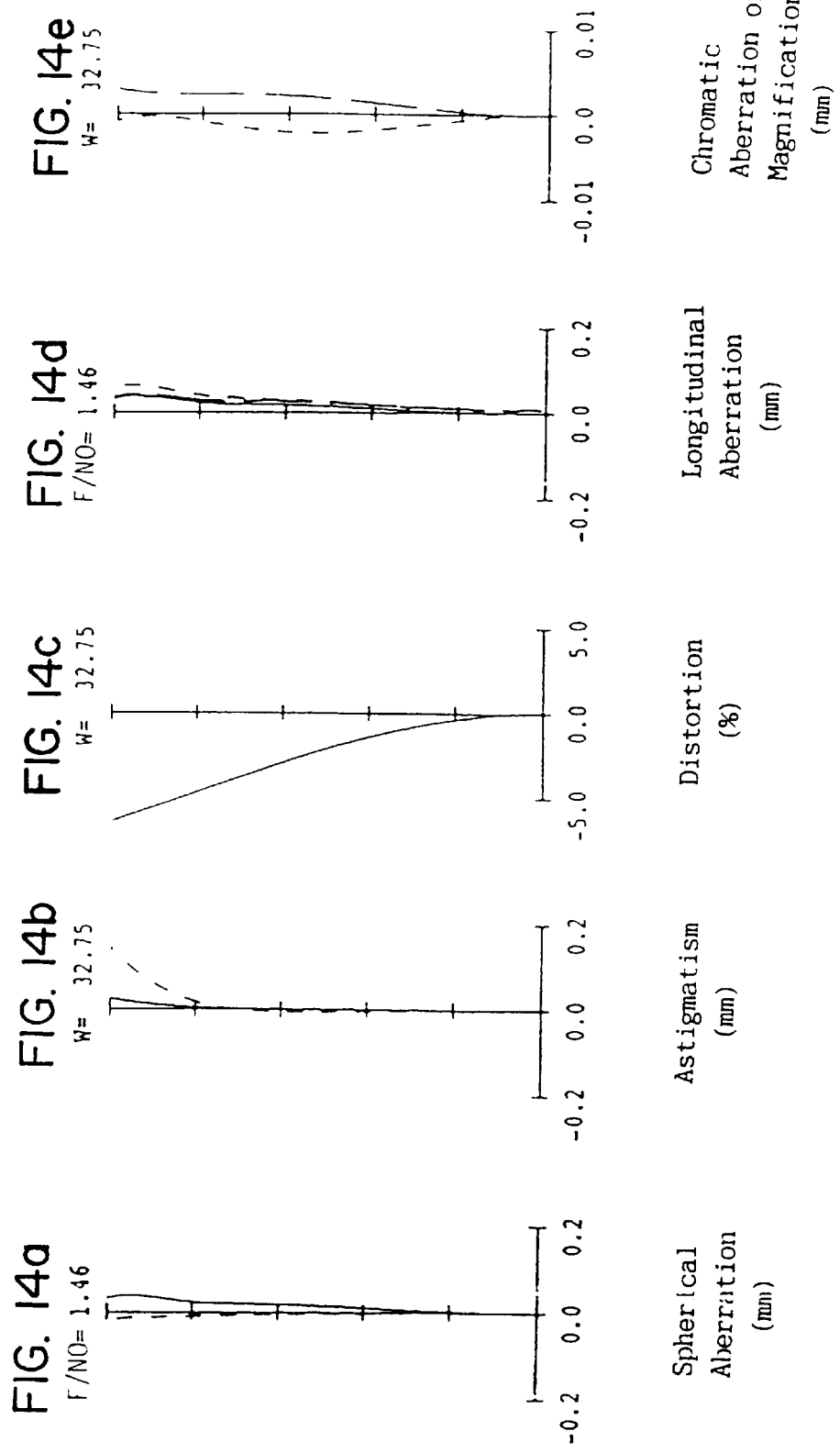

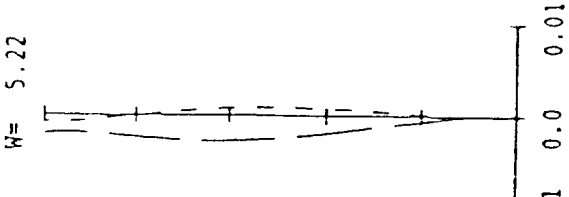
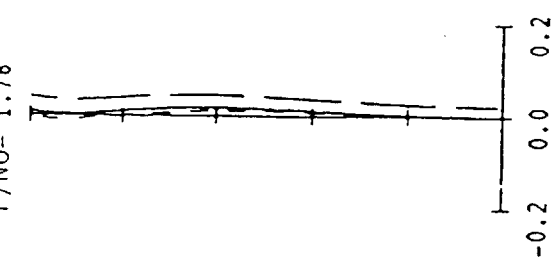
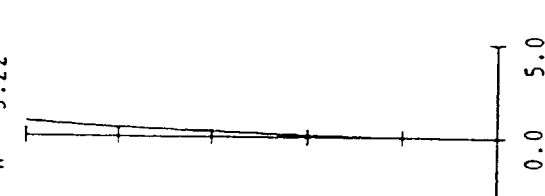
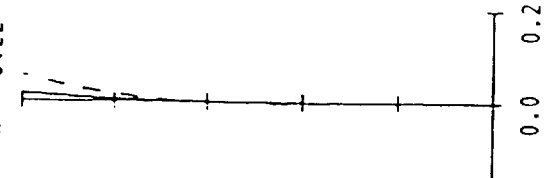
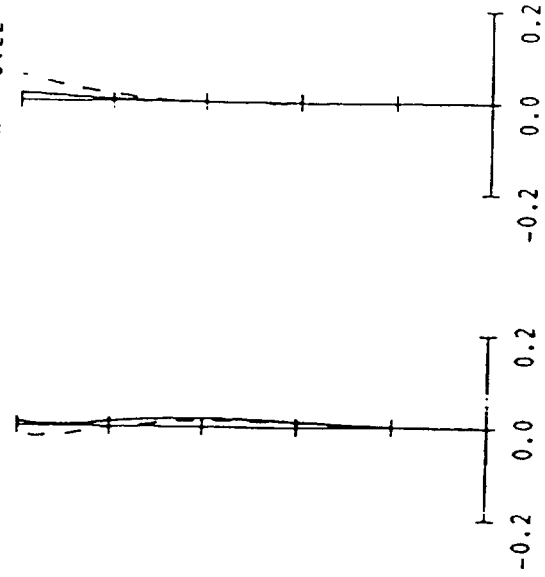

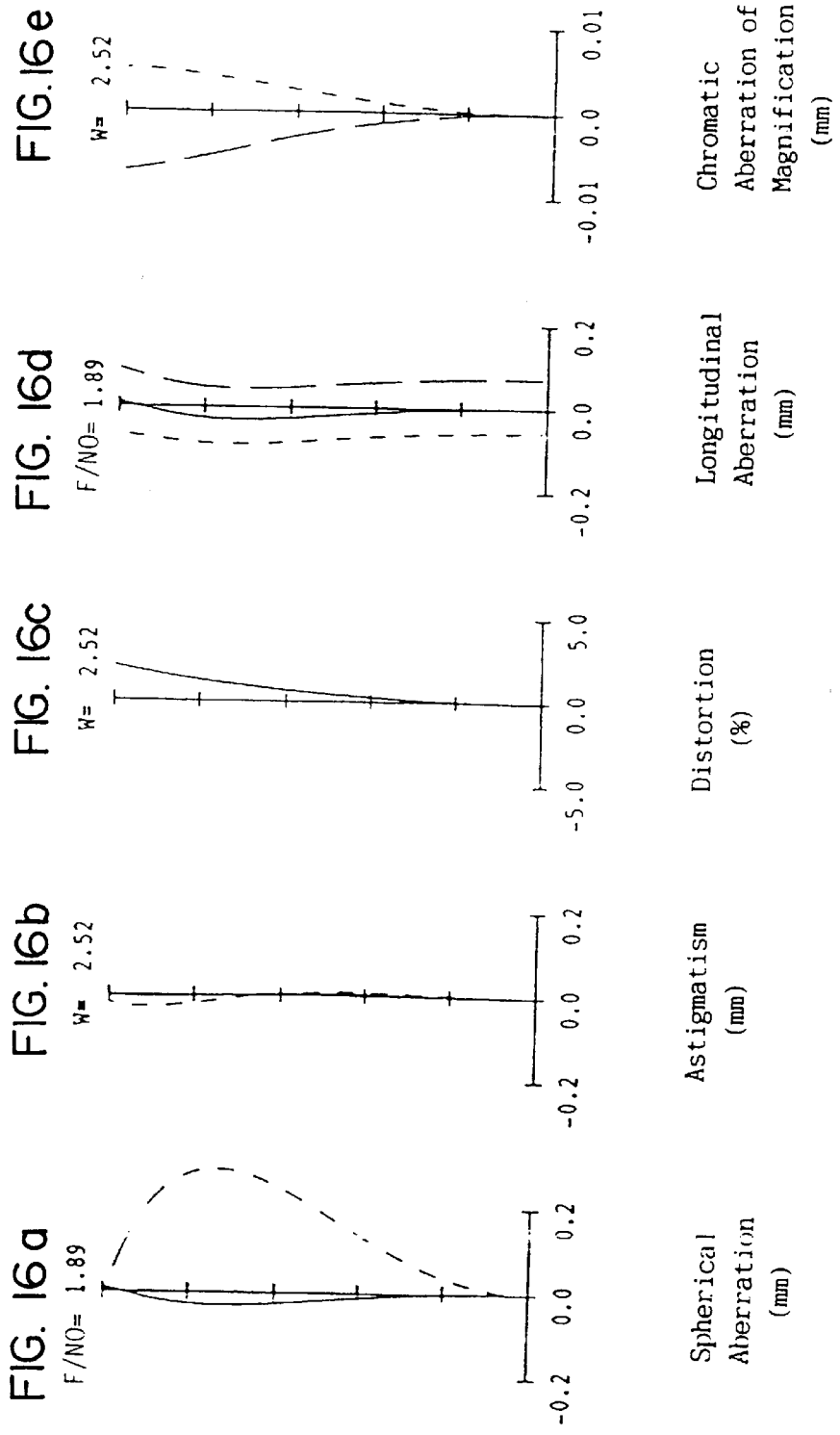

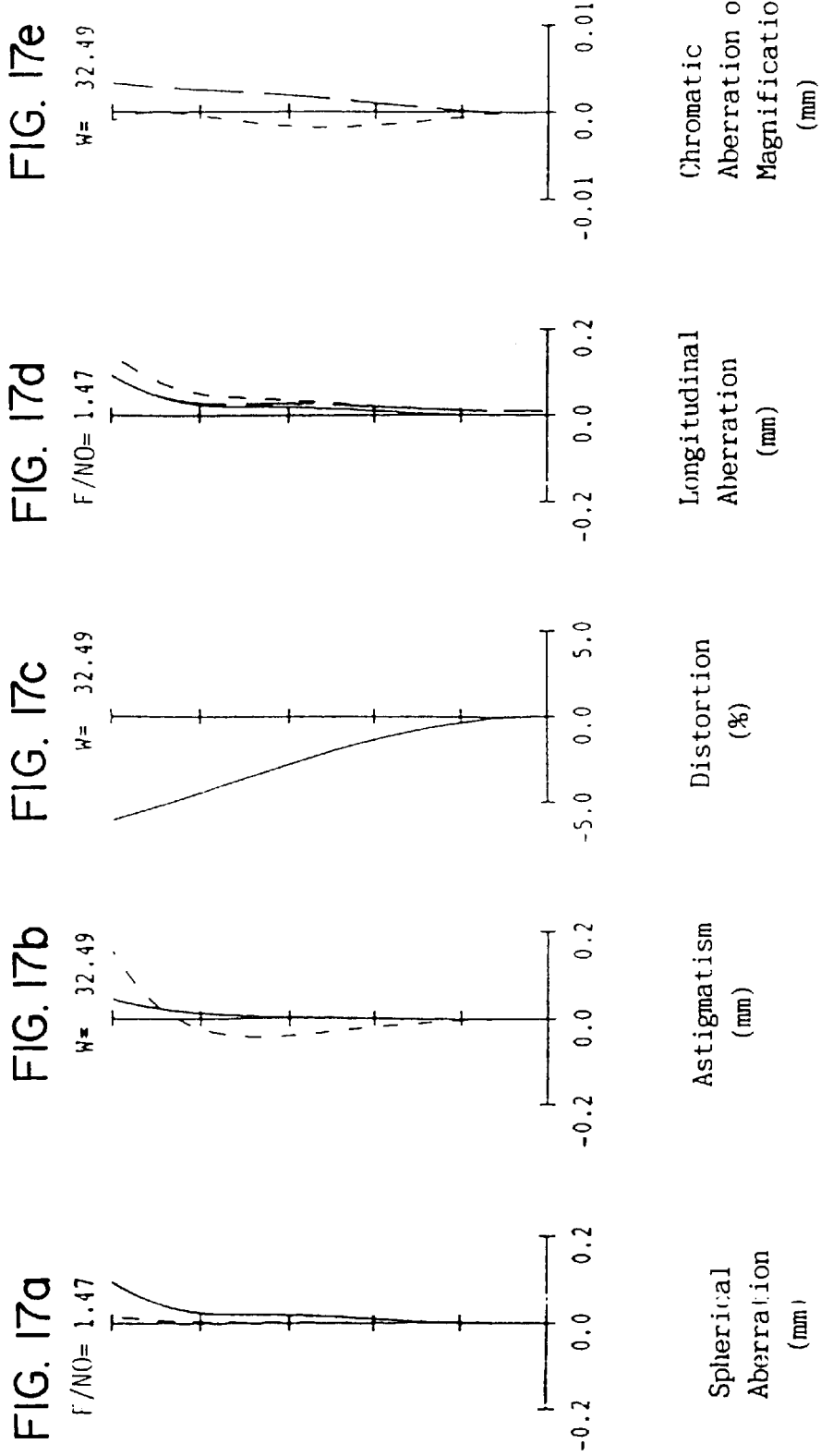

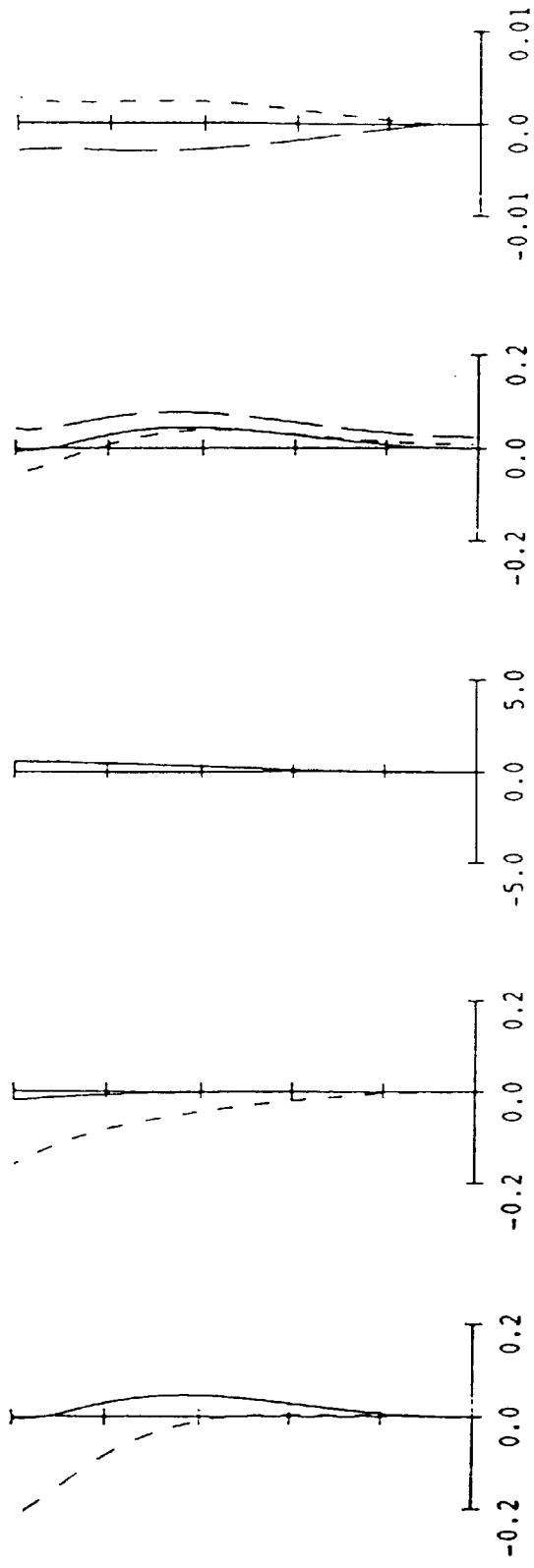

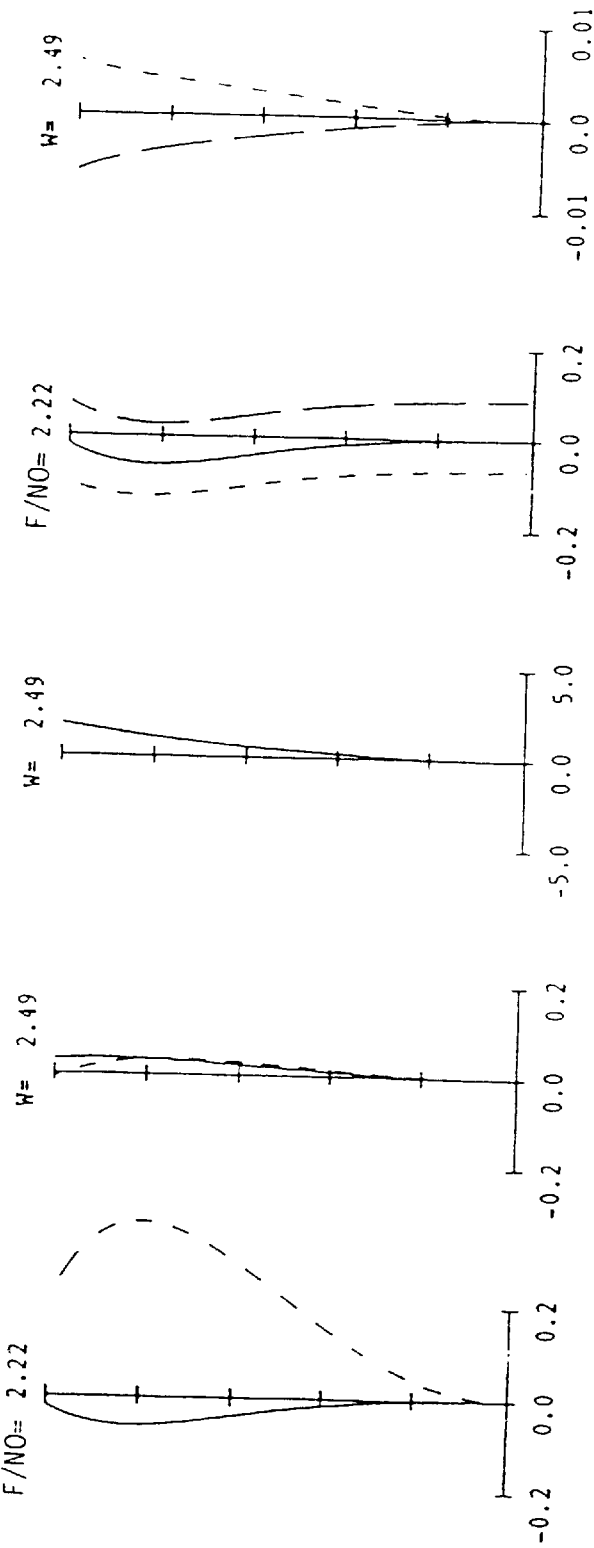

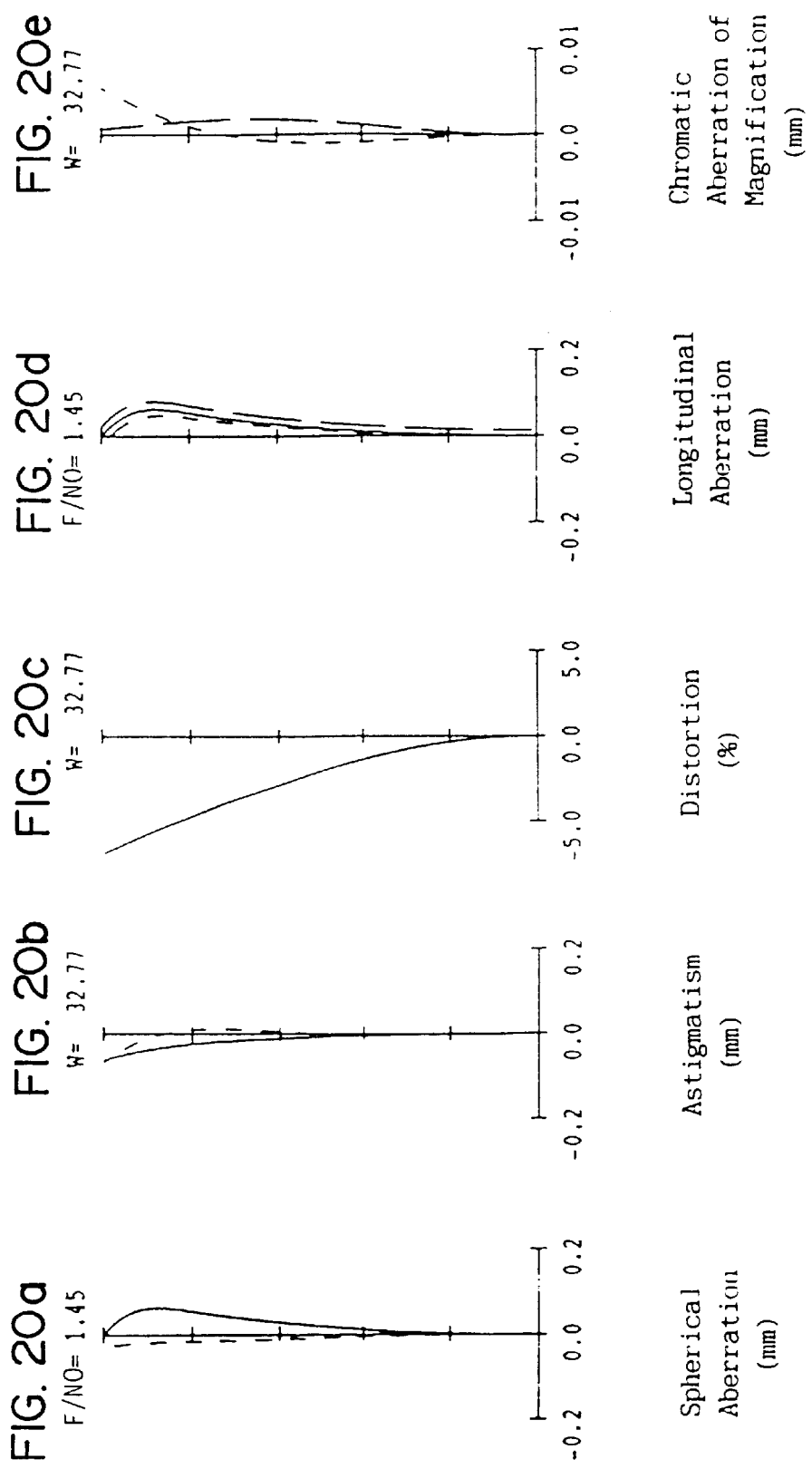

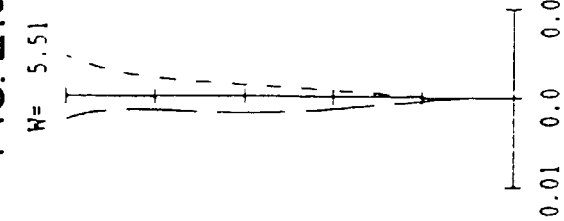
FIG. 21a  
Spherical Aberration (mm)
FIG. 21b  
Astigmatism (mm)
FIG. 21c  
Distortion (%)
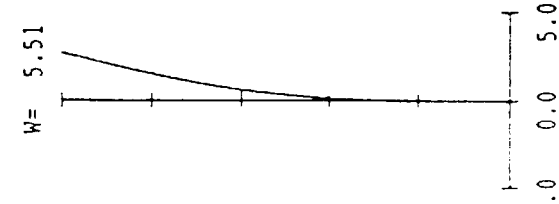
FIG. 21d  
Longitudinal Aberration (mm)
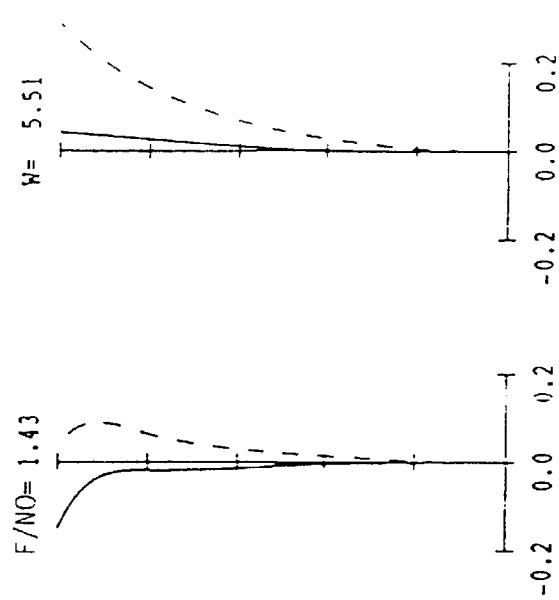
FIG. 21e  
Chromatic Aberration of Magnification (mm)

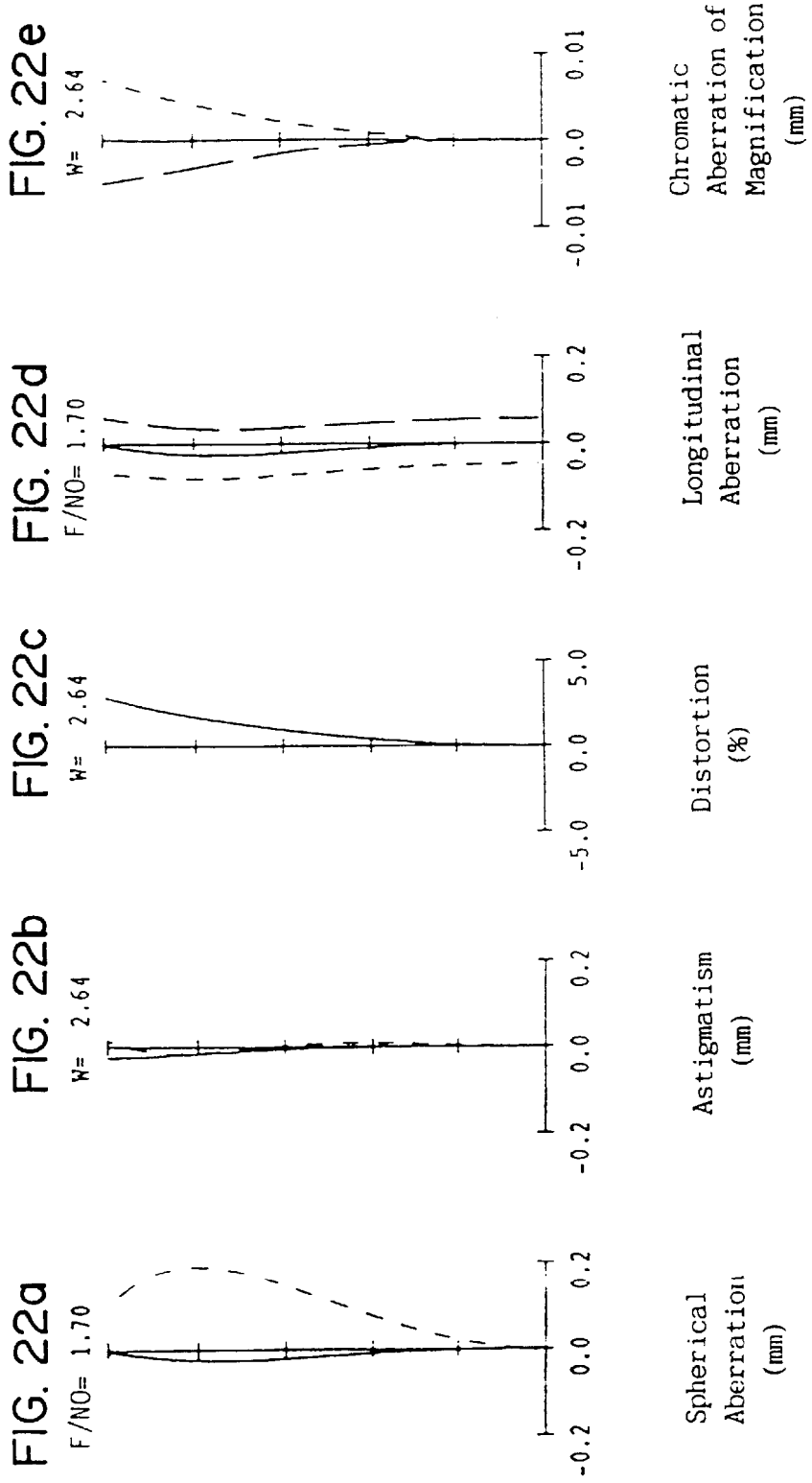

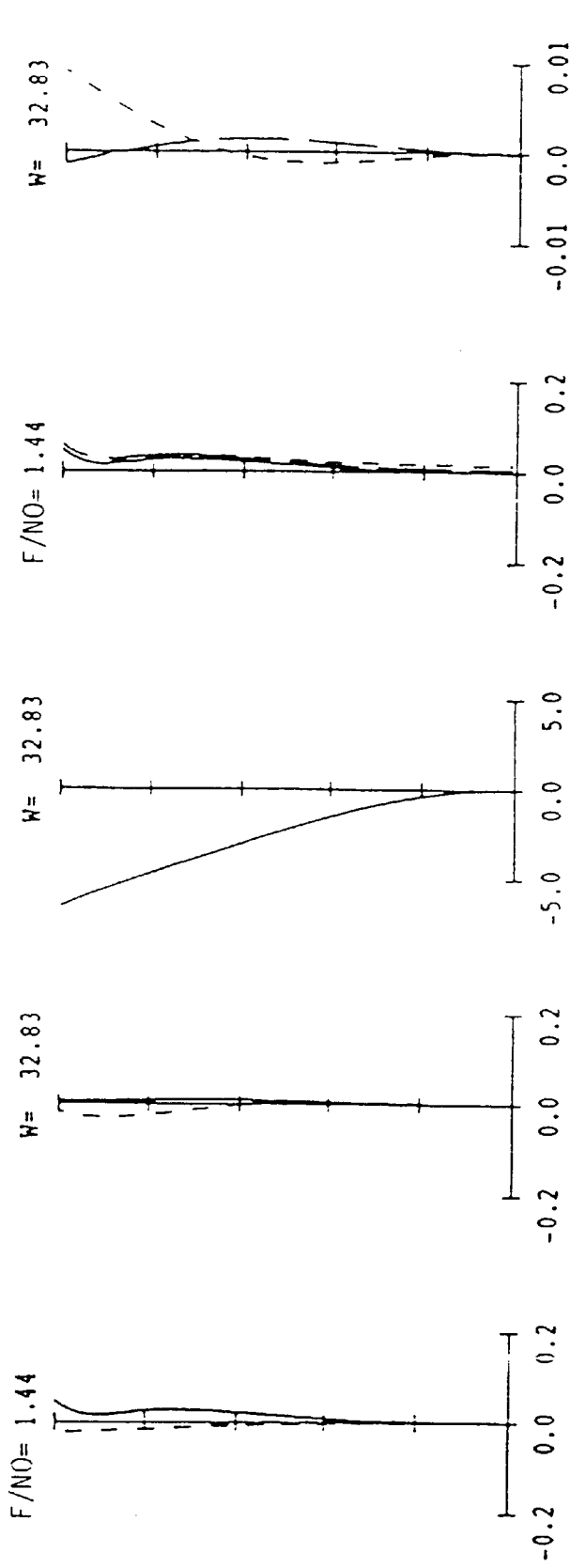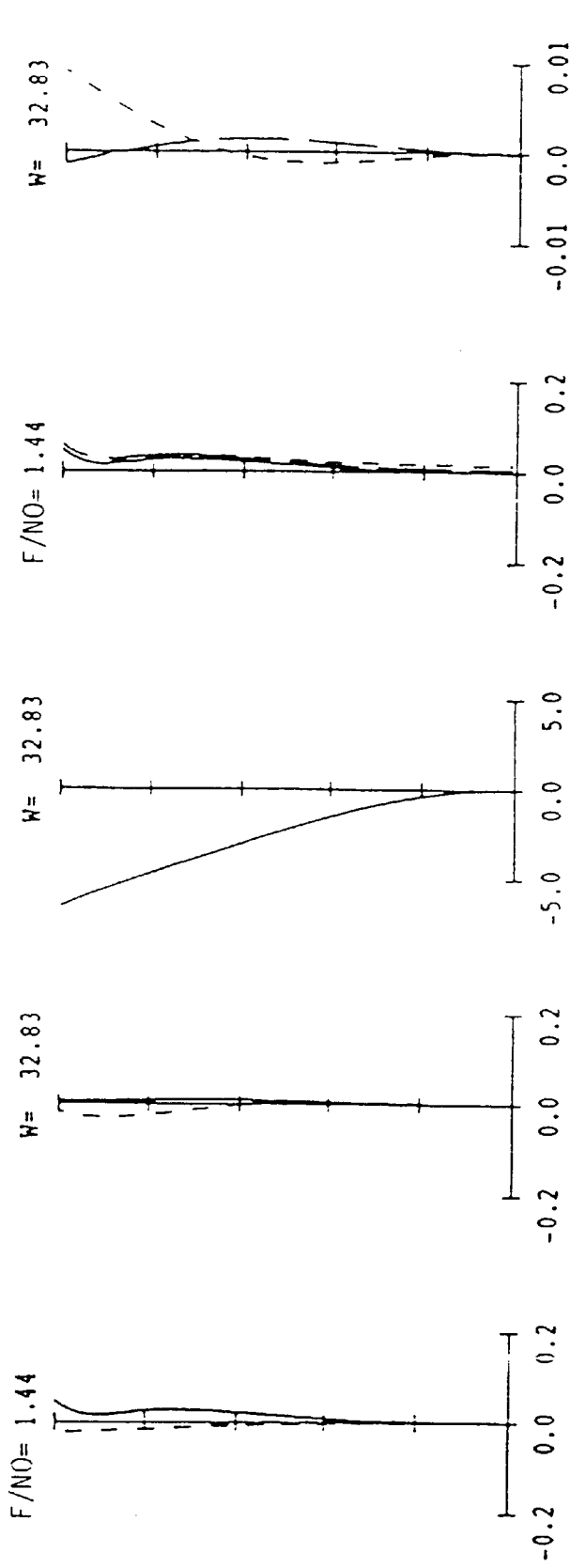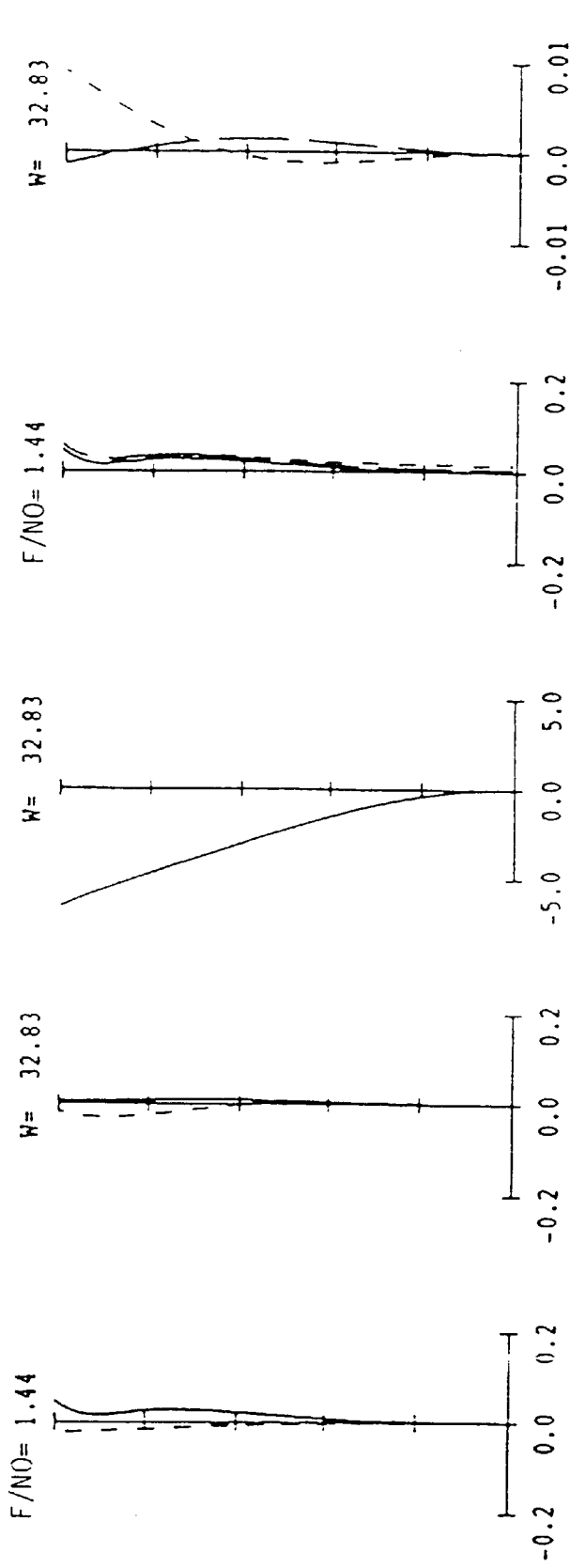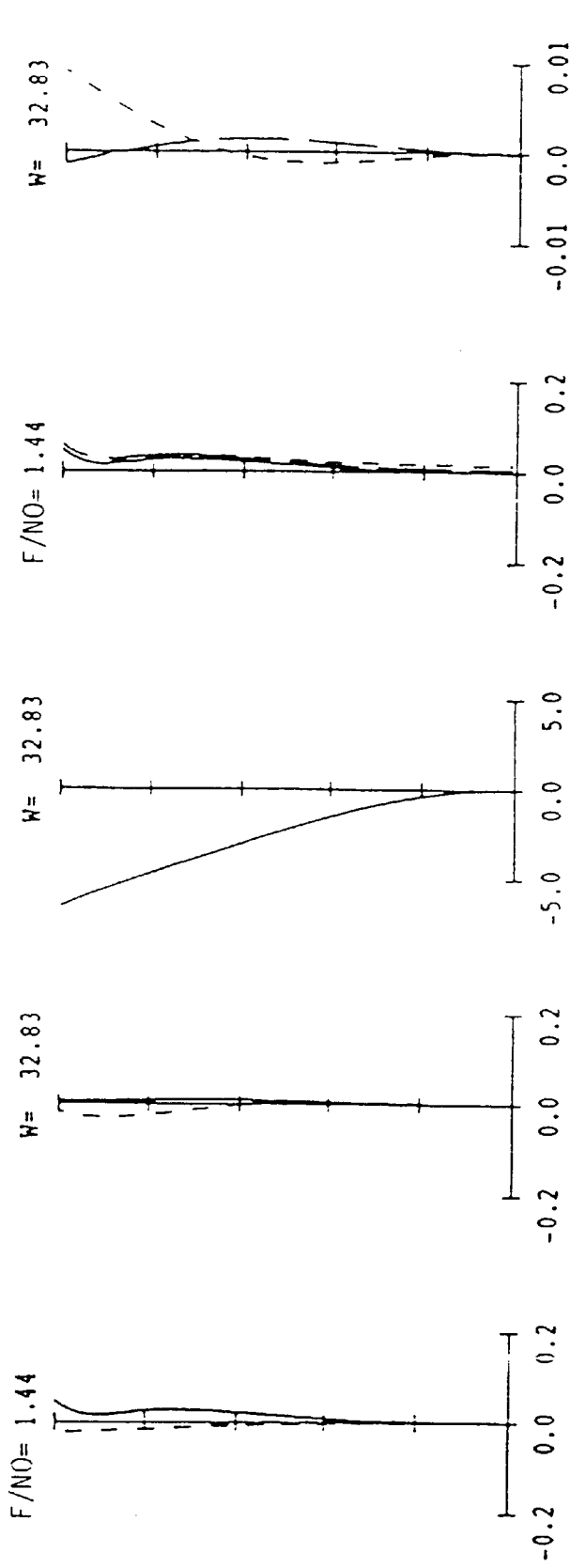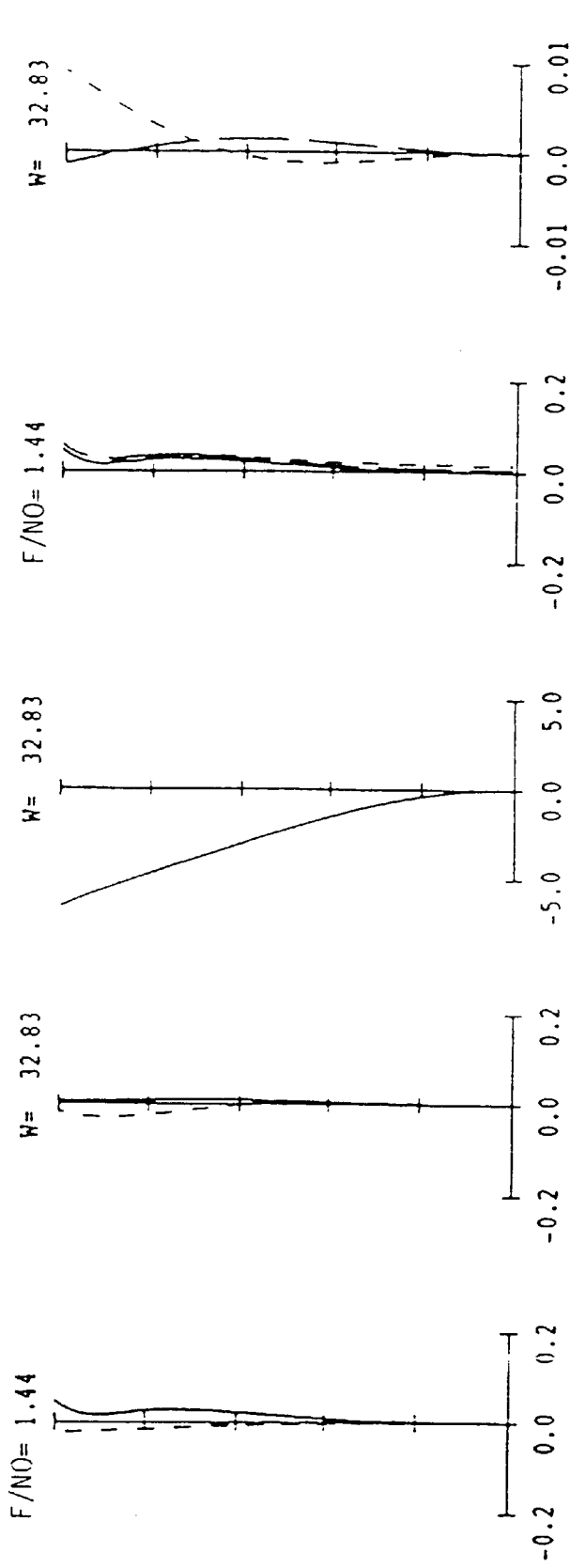

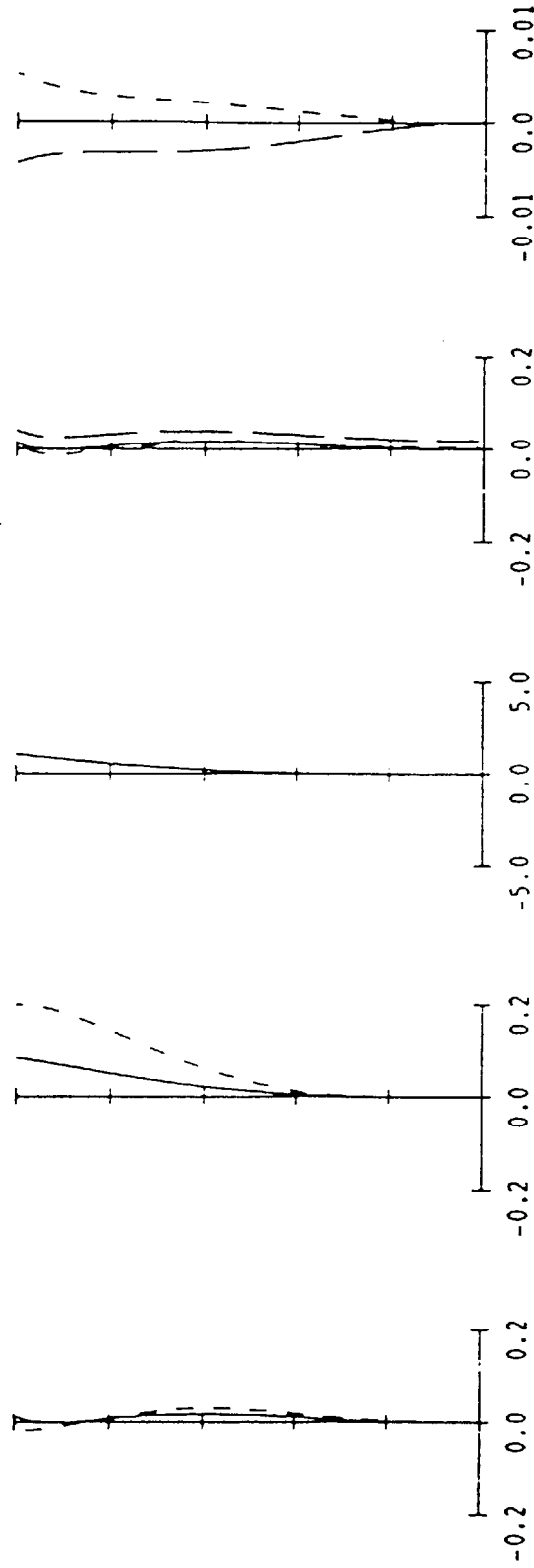
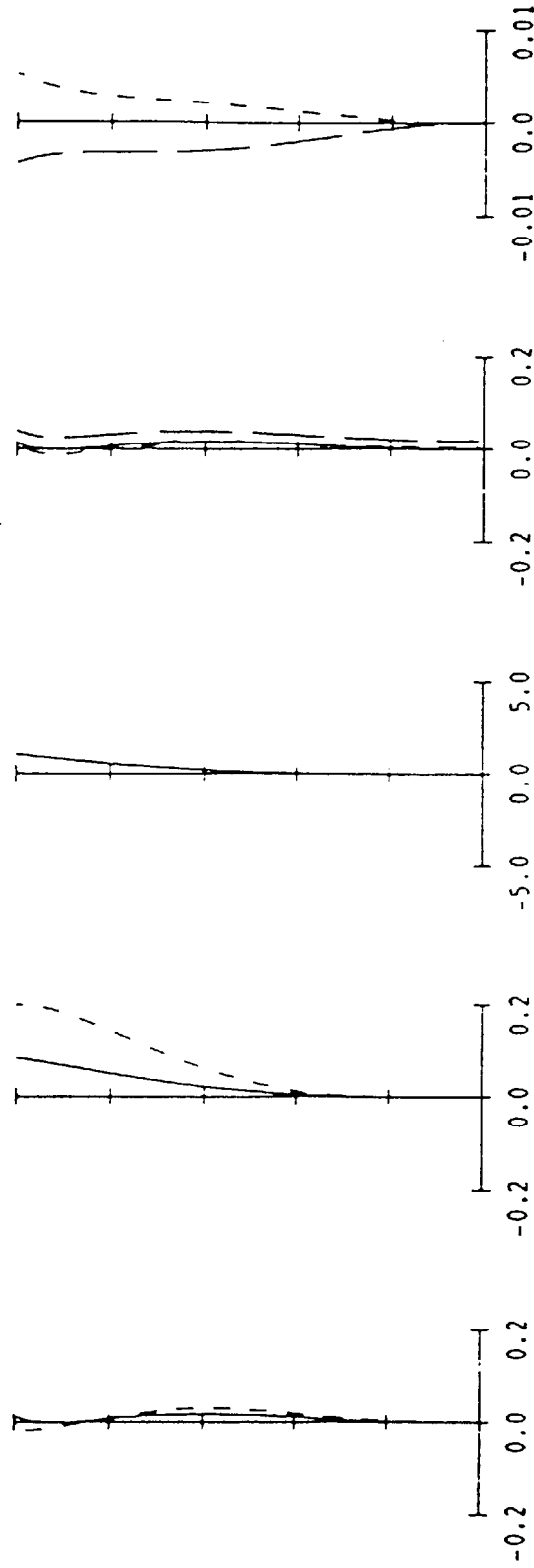
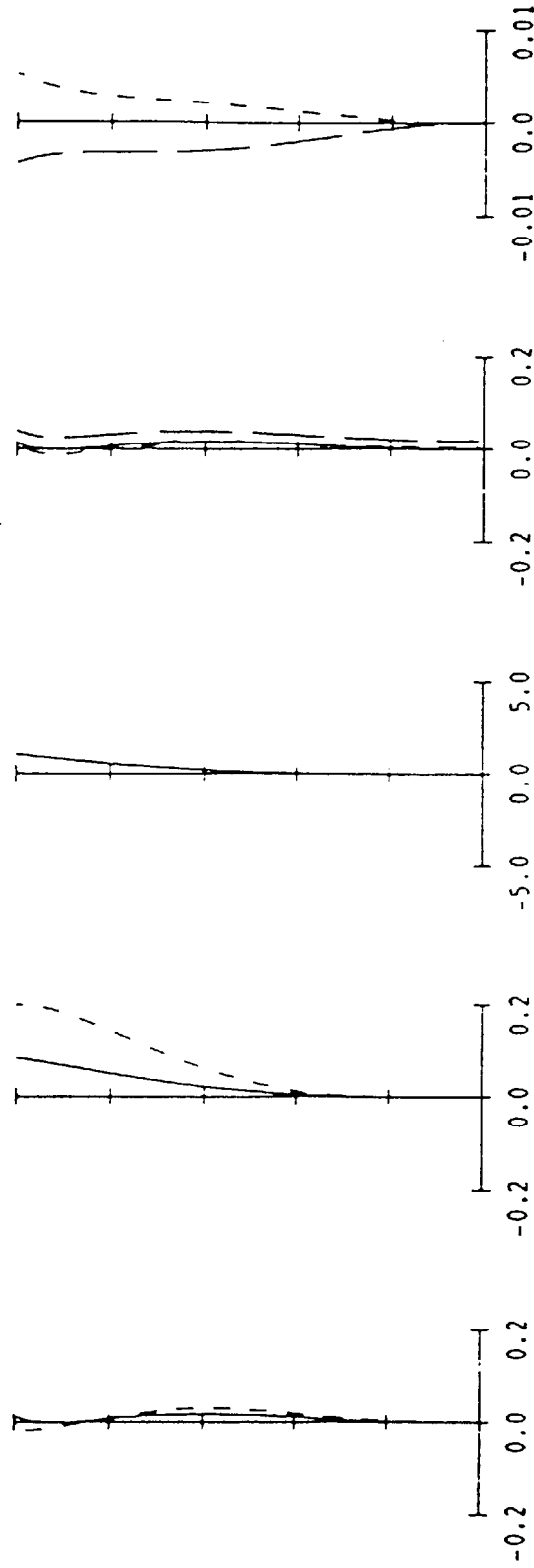
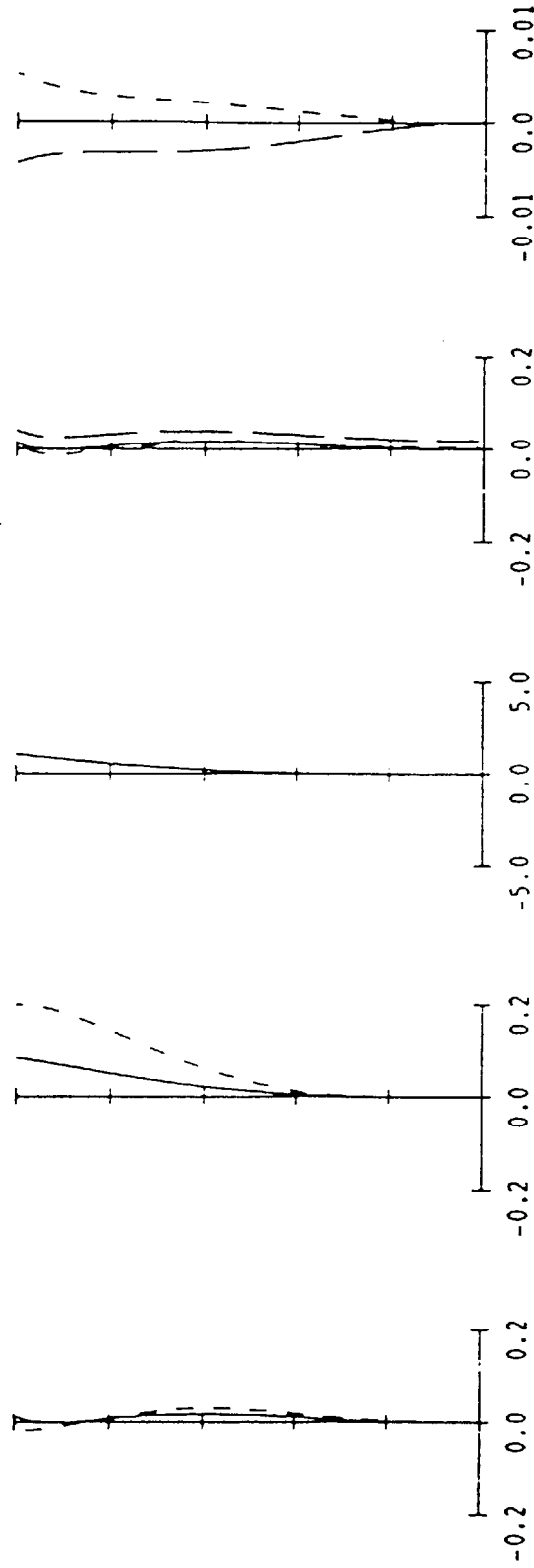
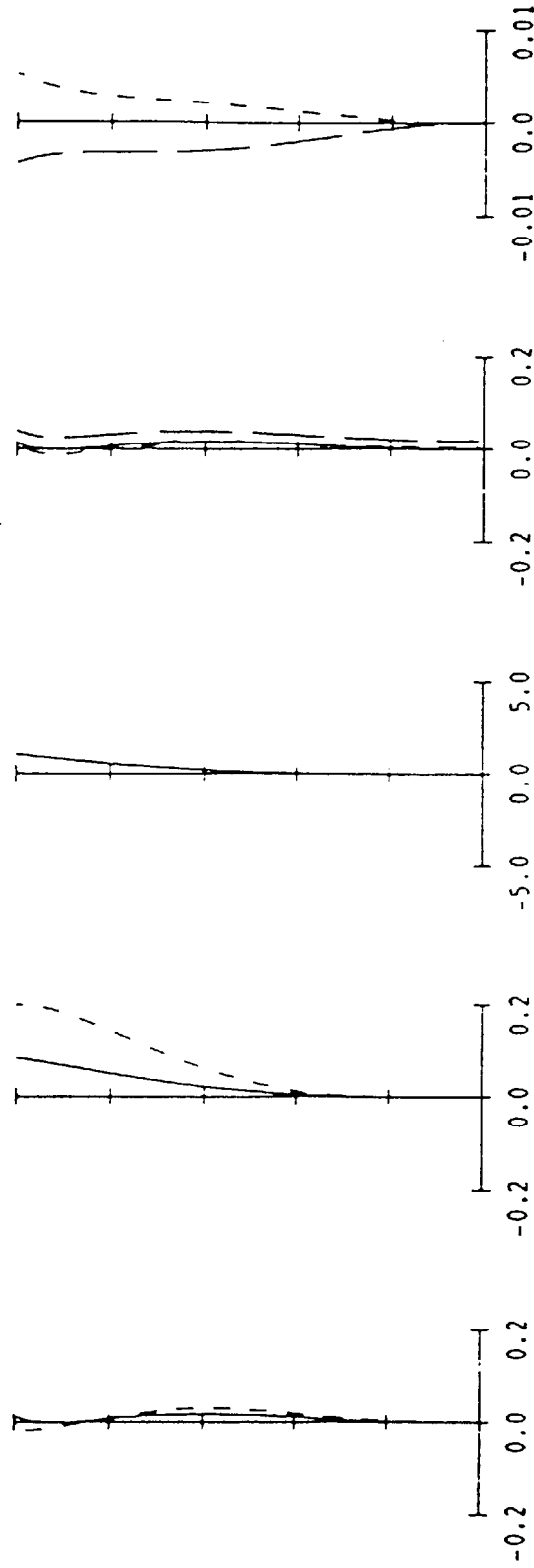

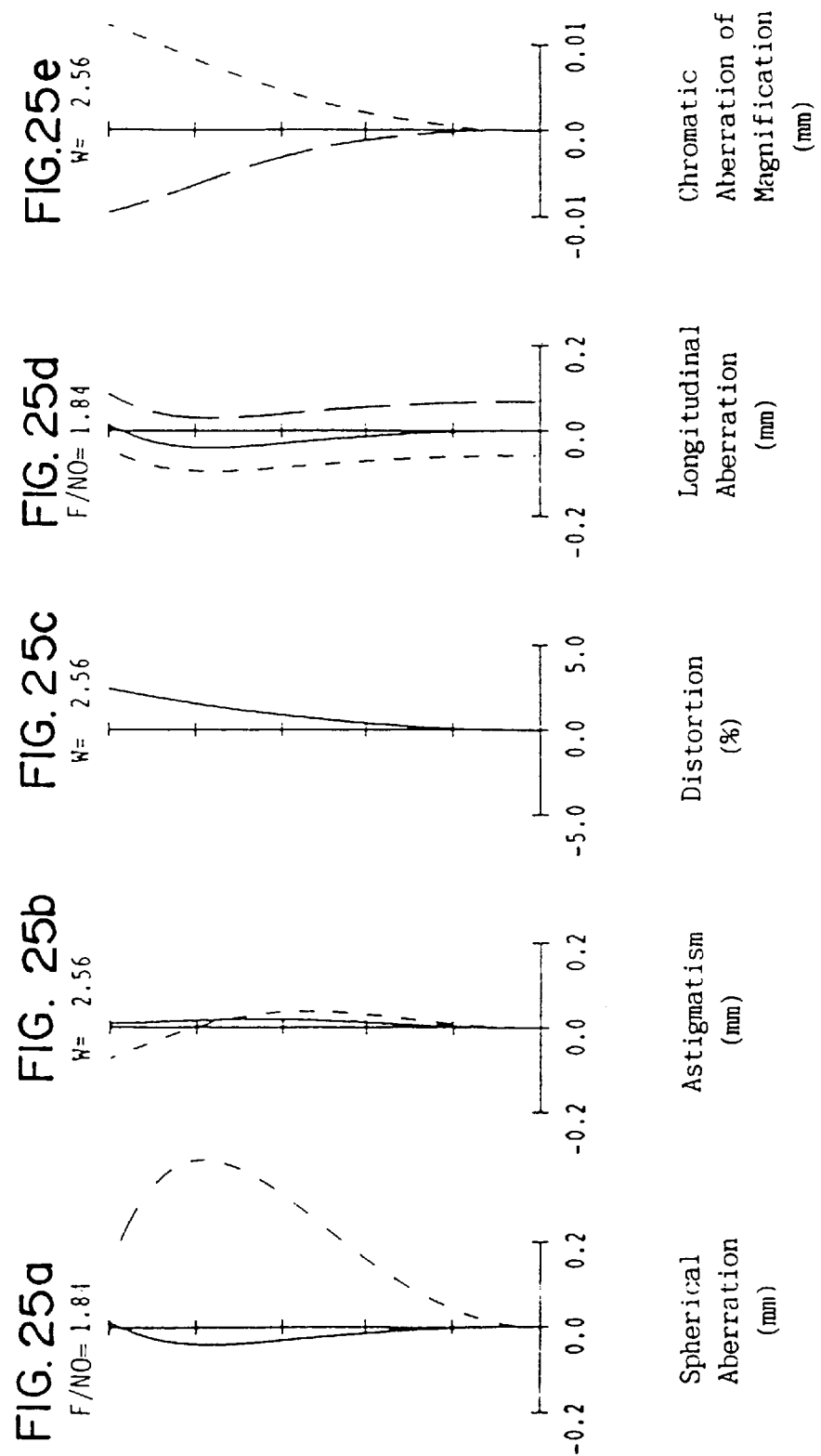

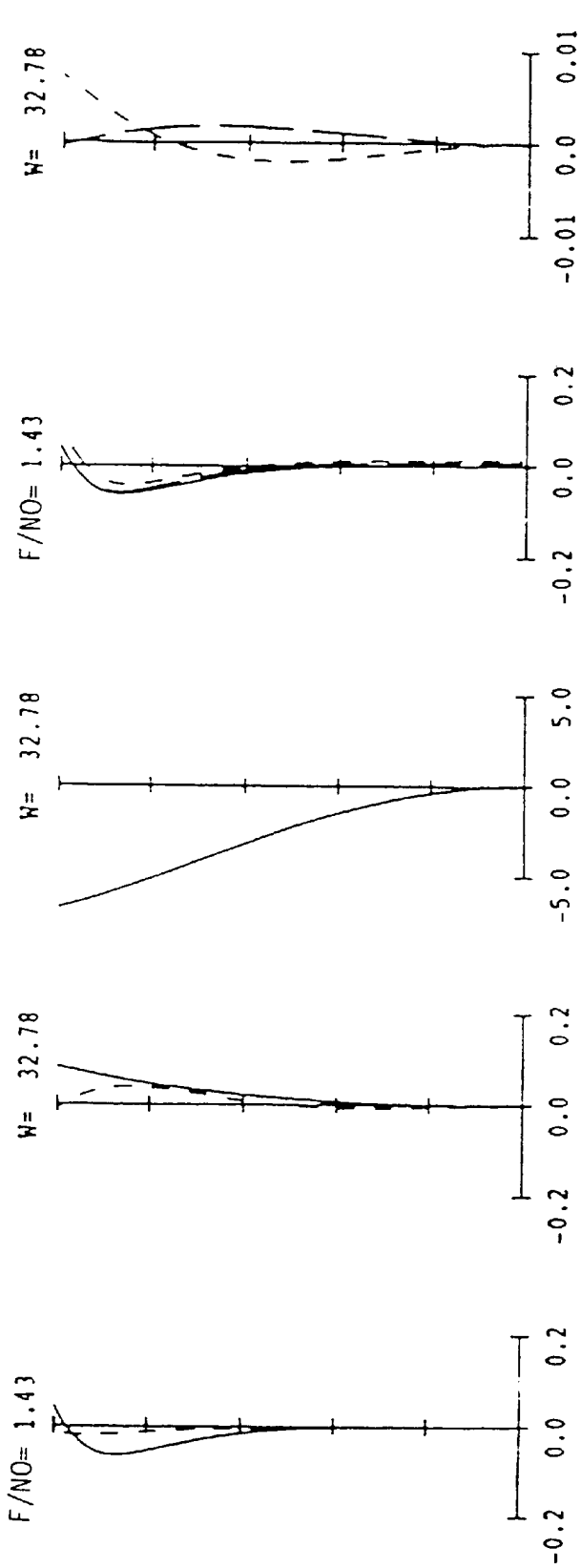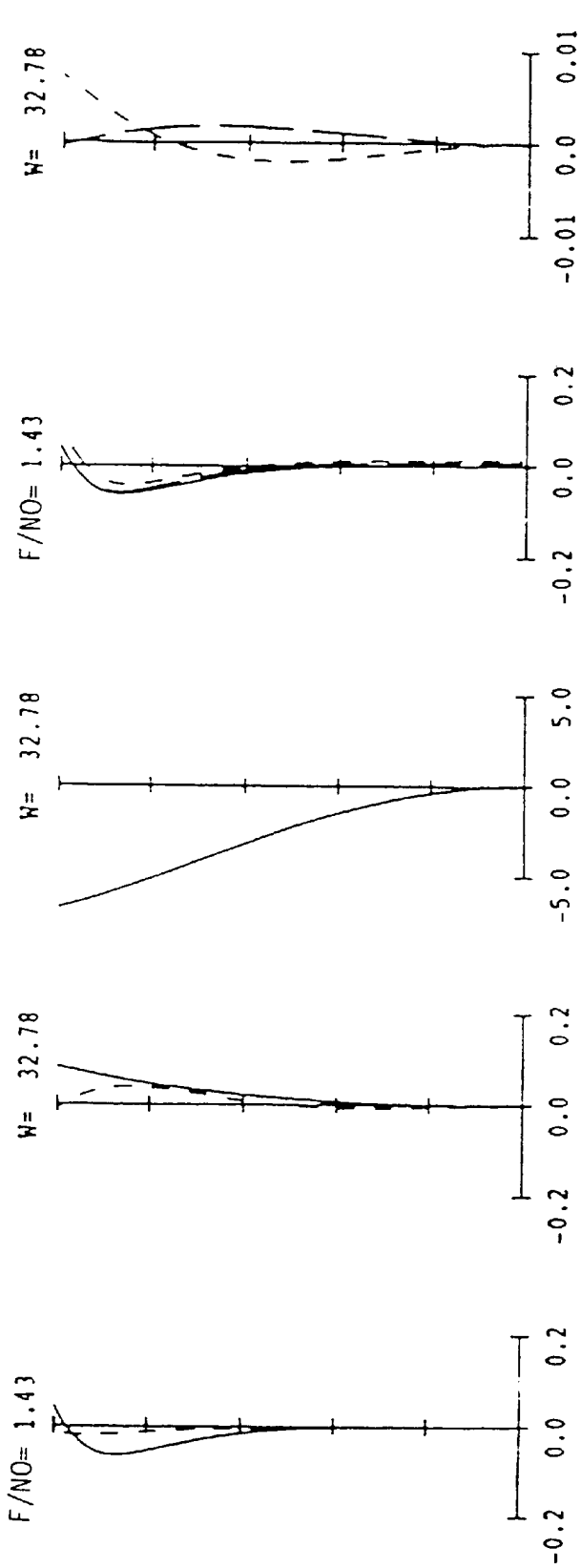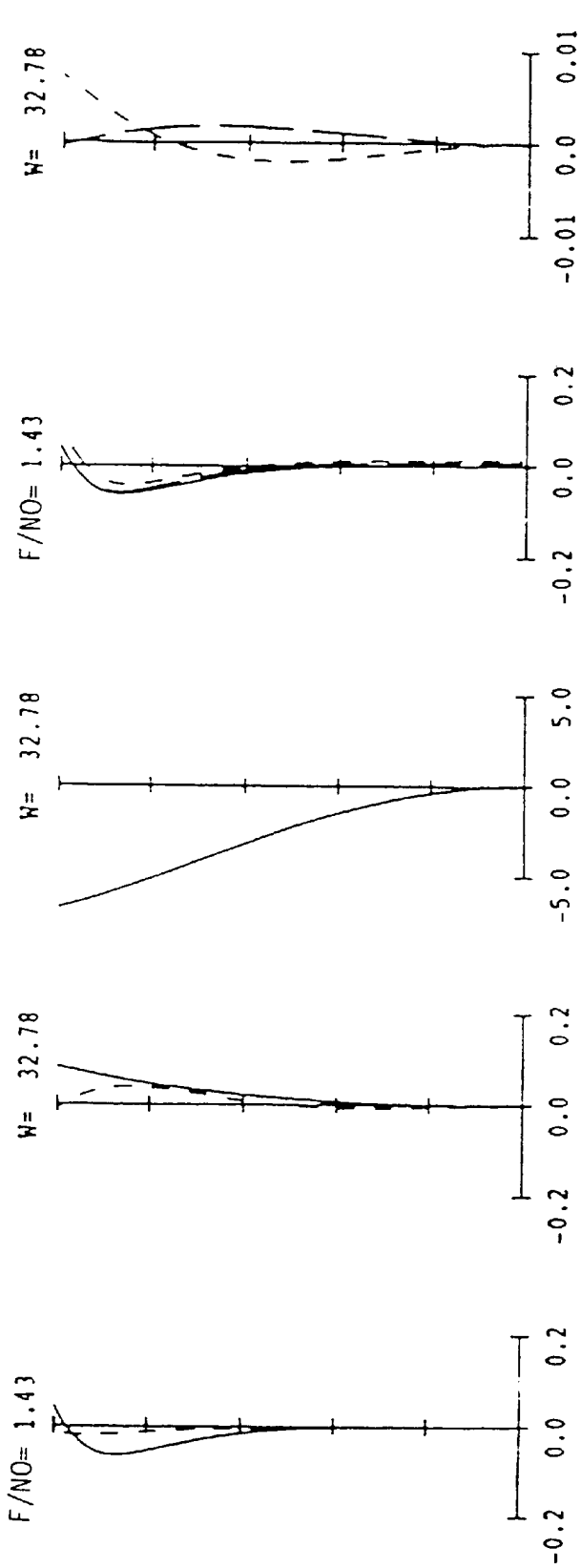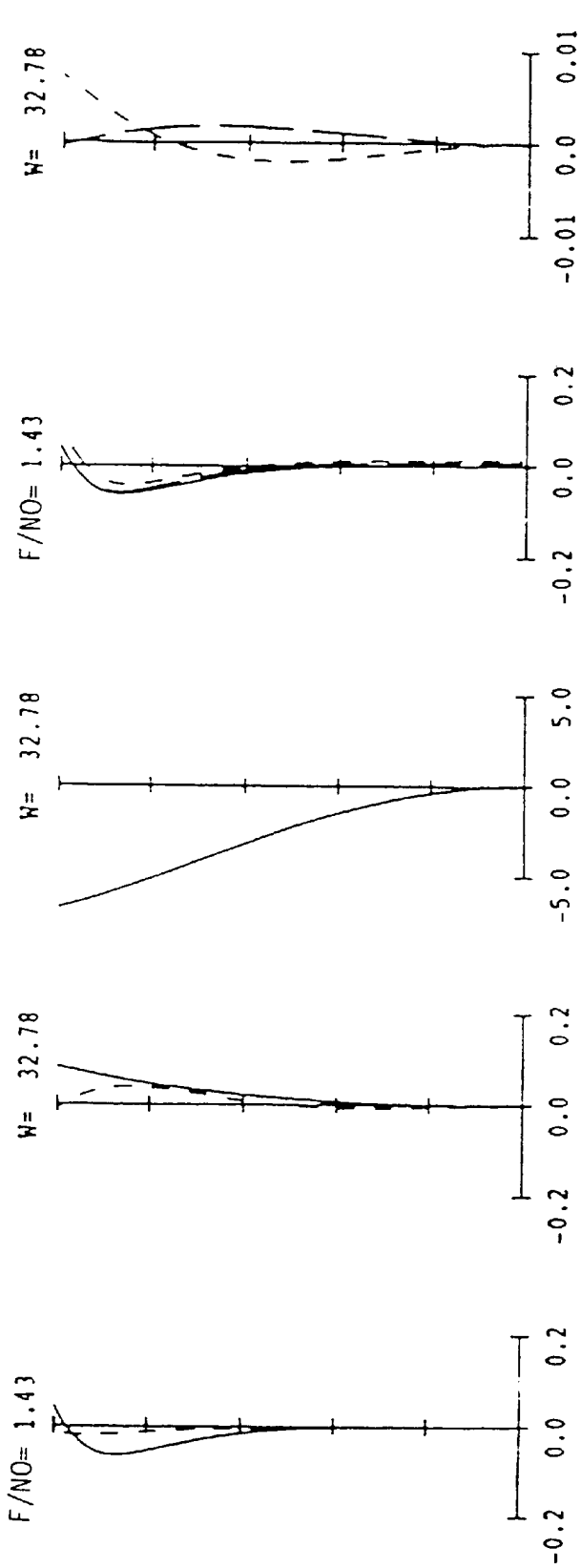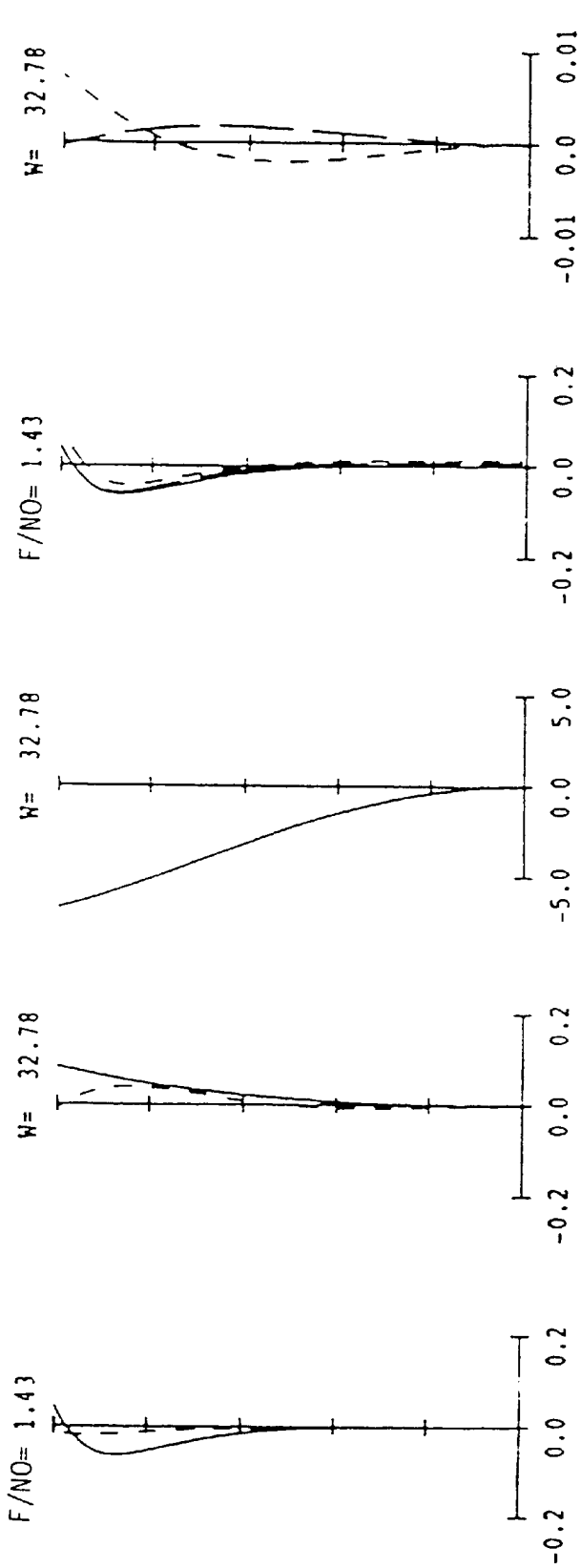

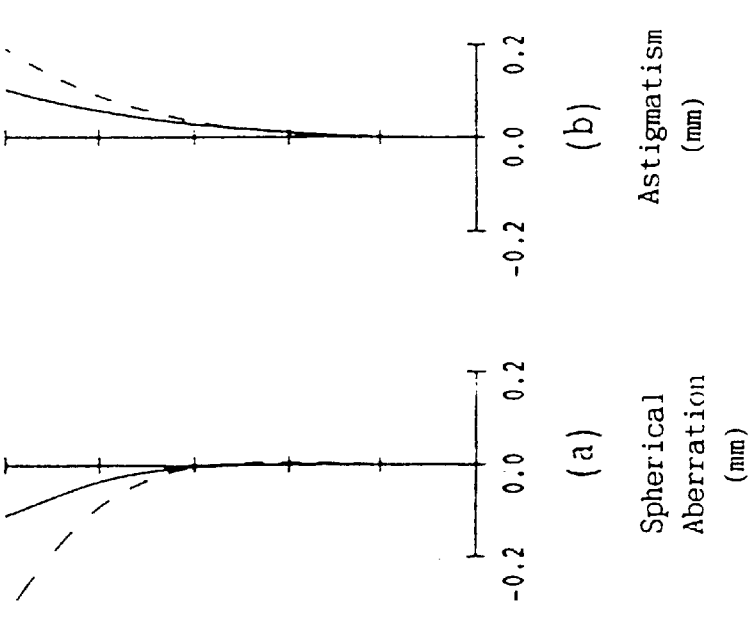

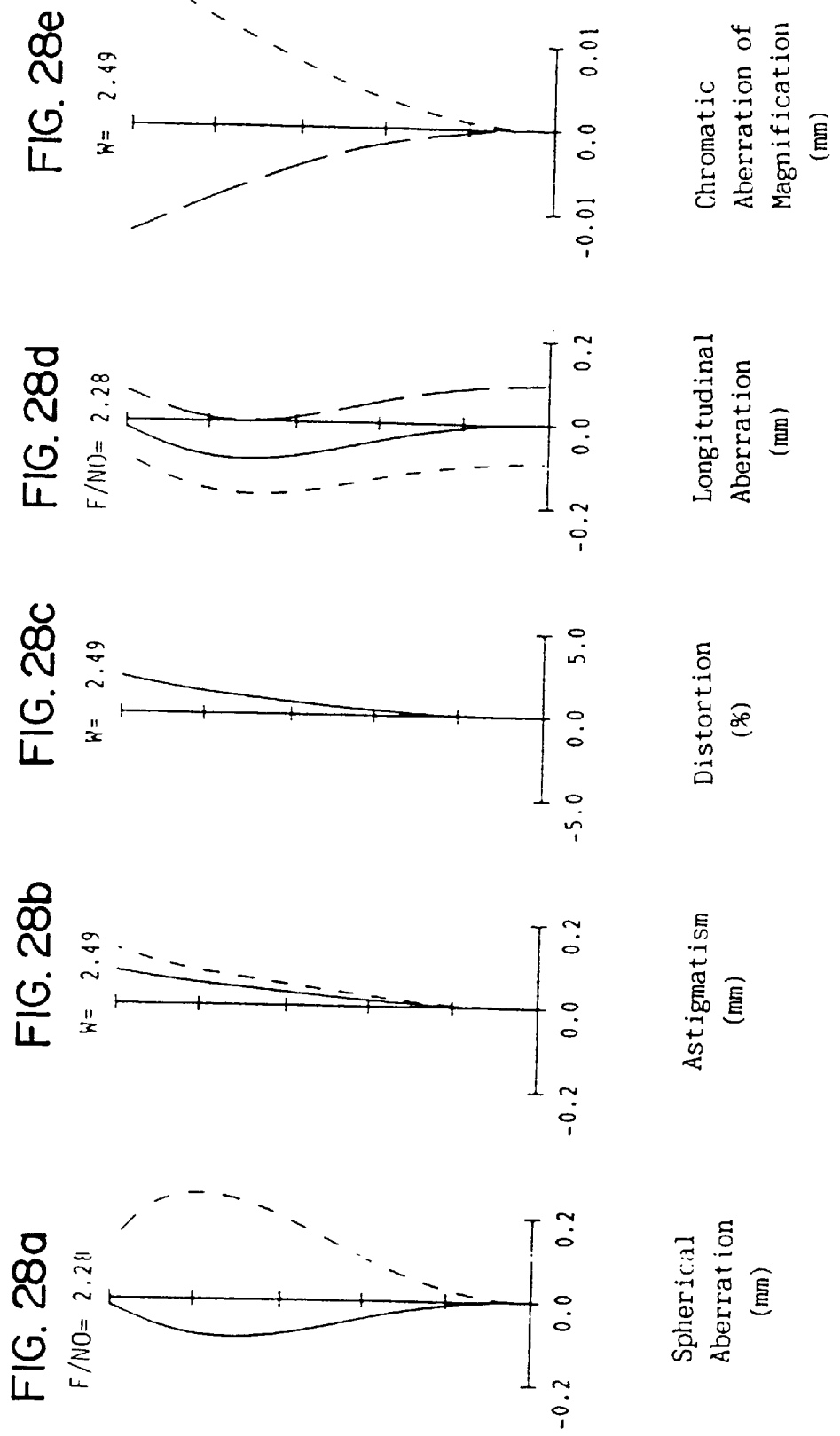

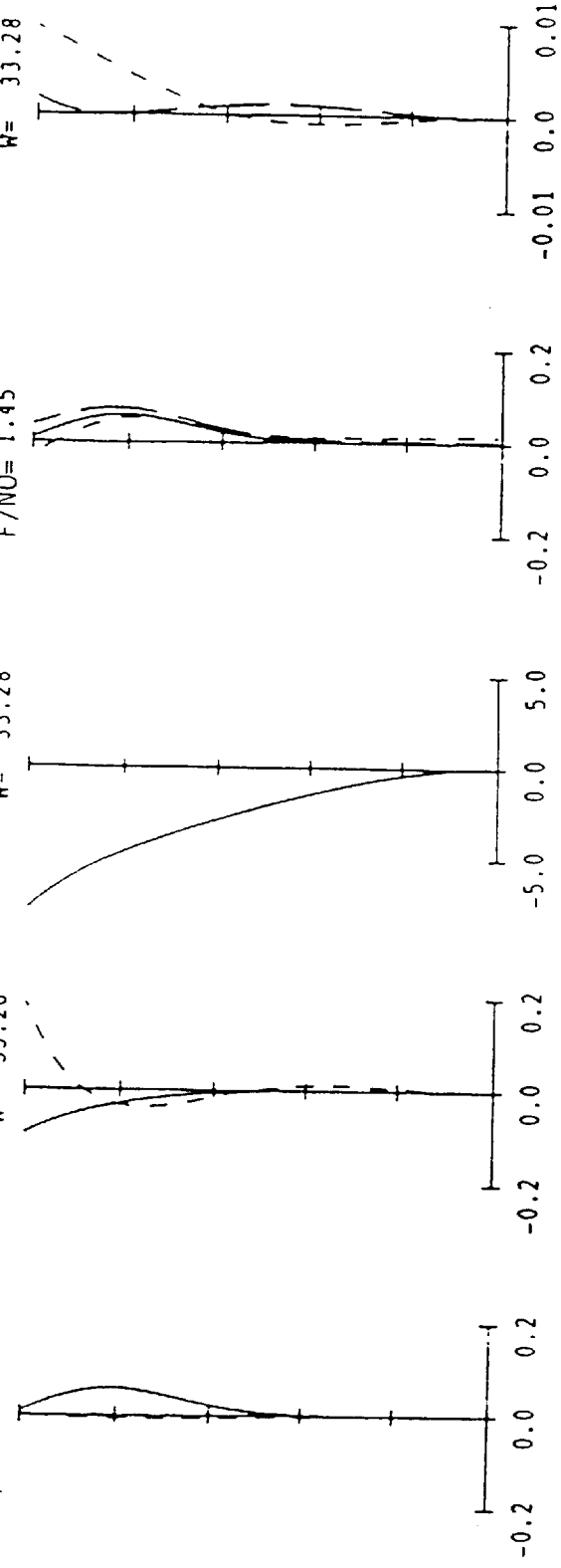

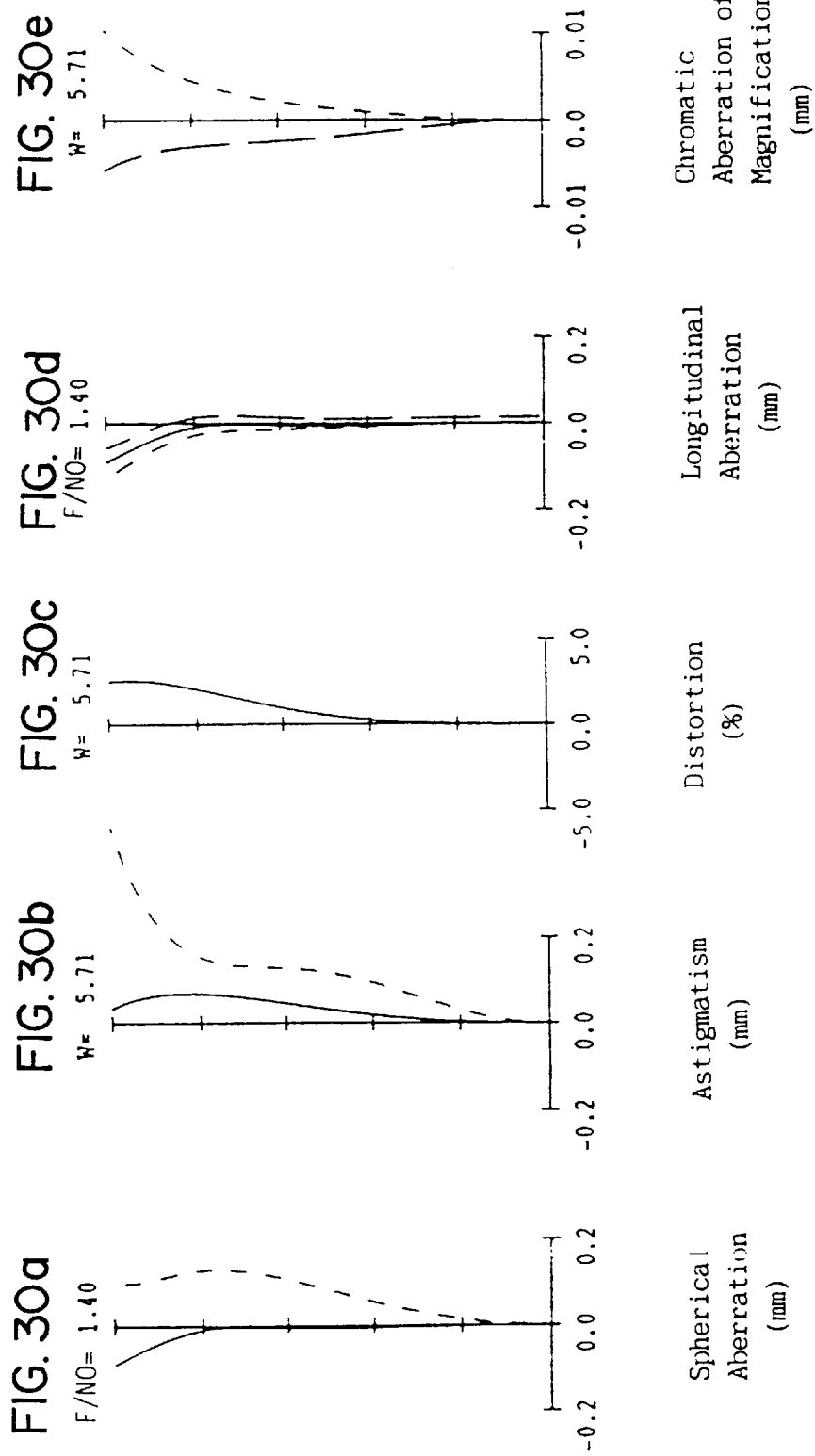

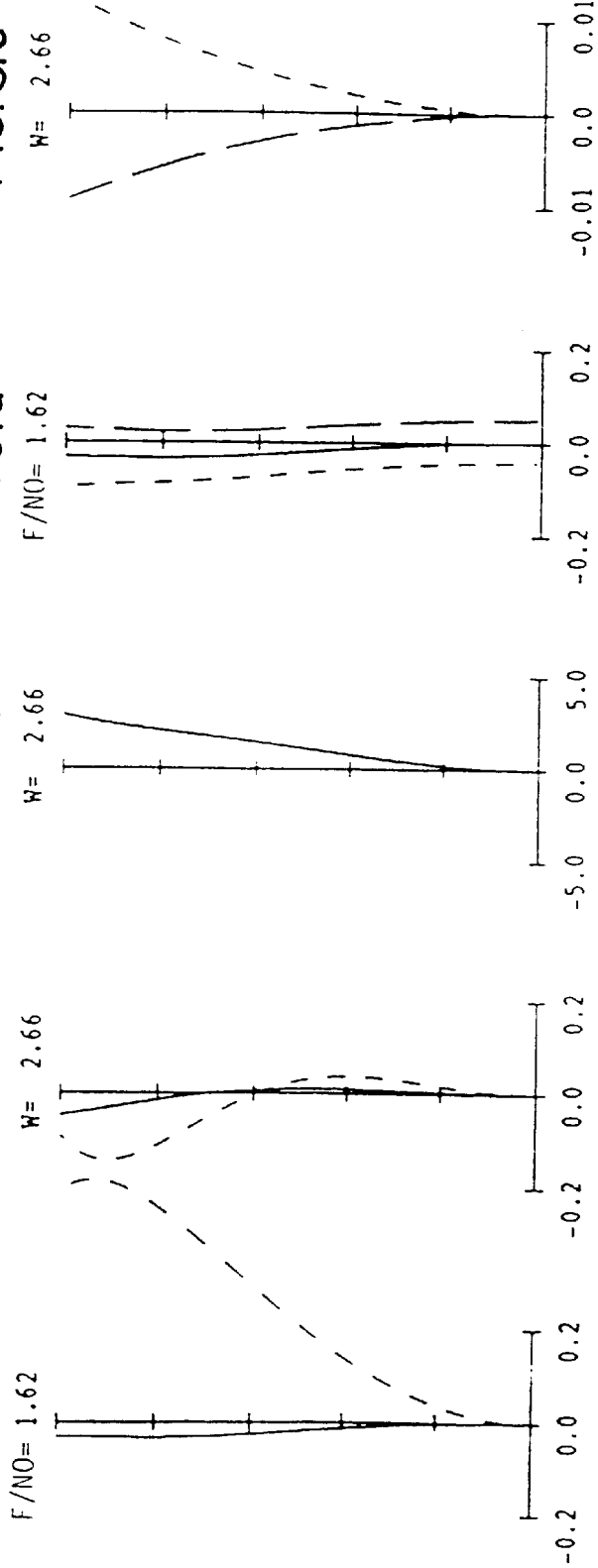

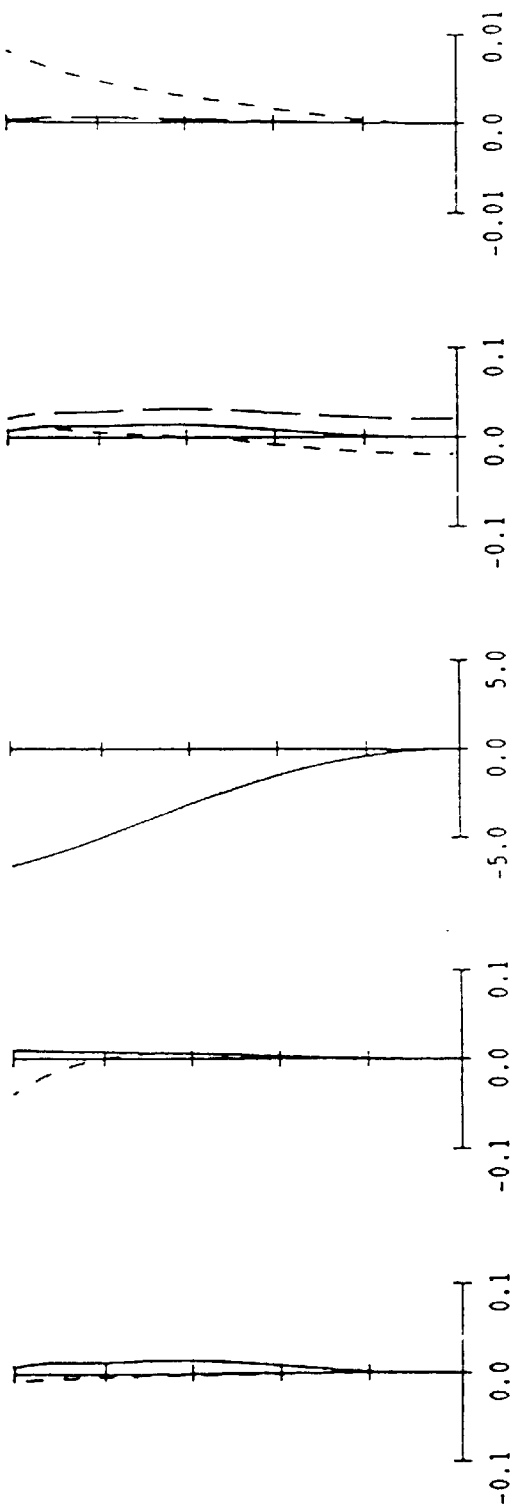

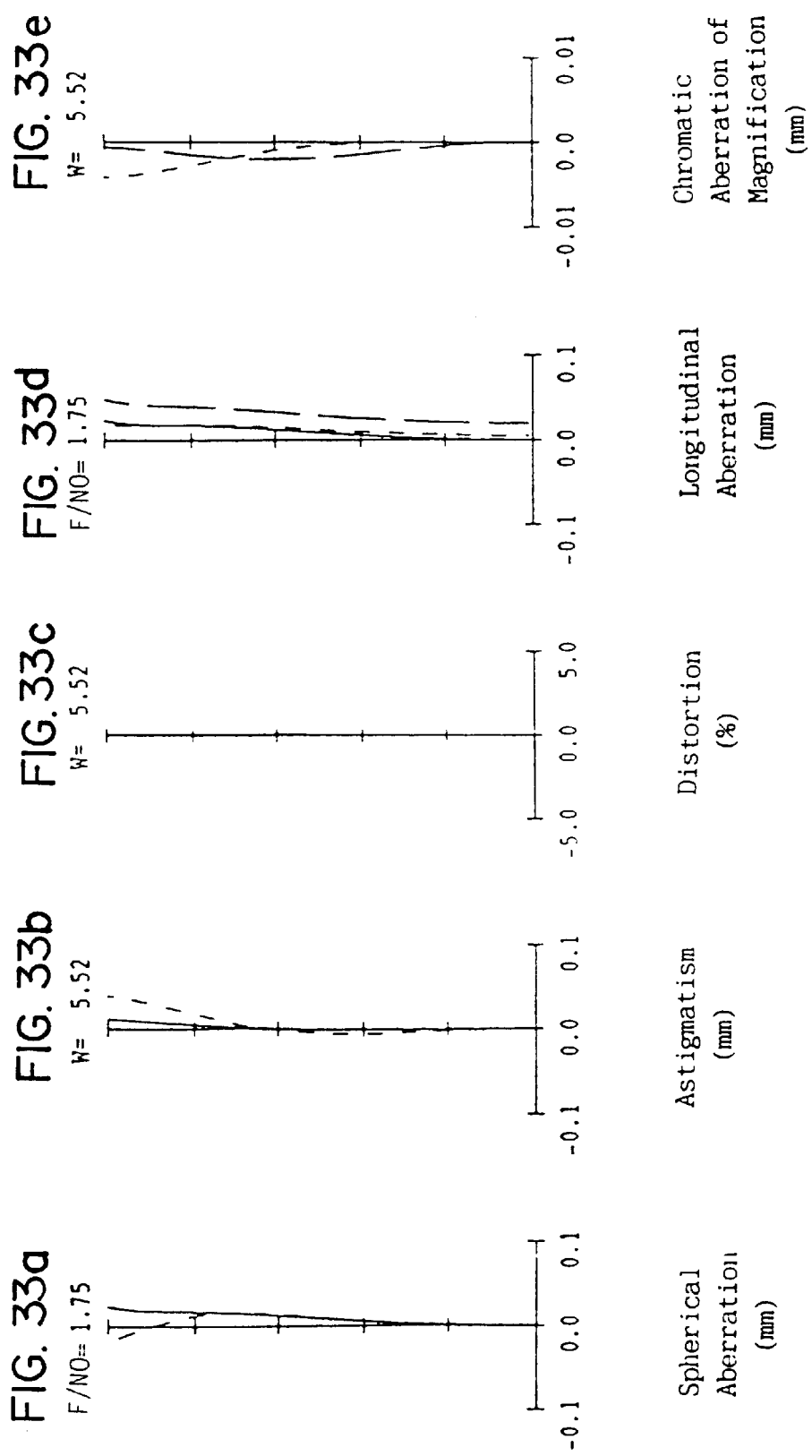

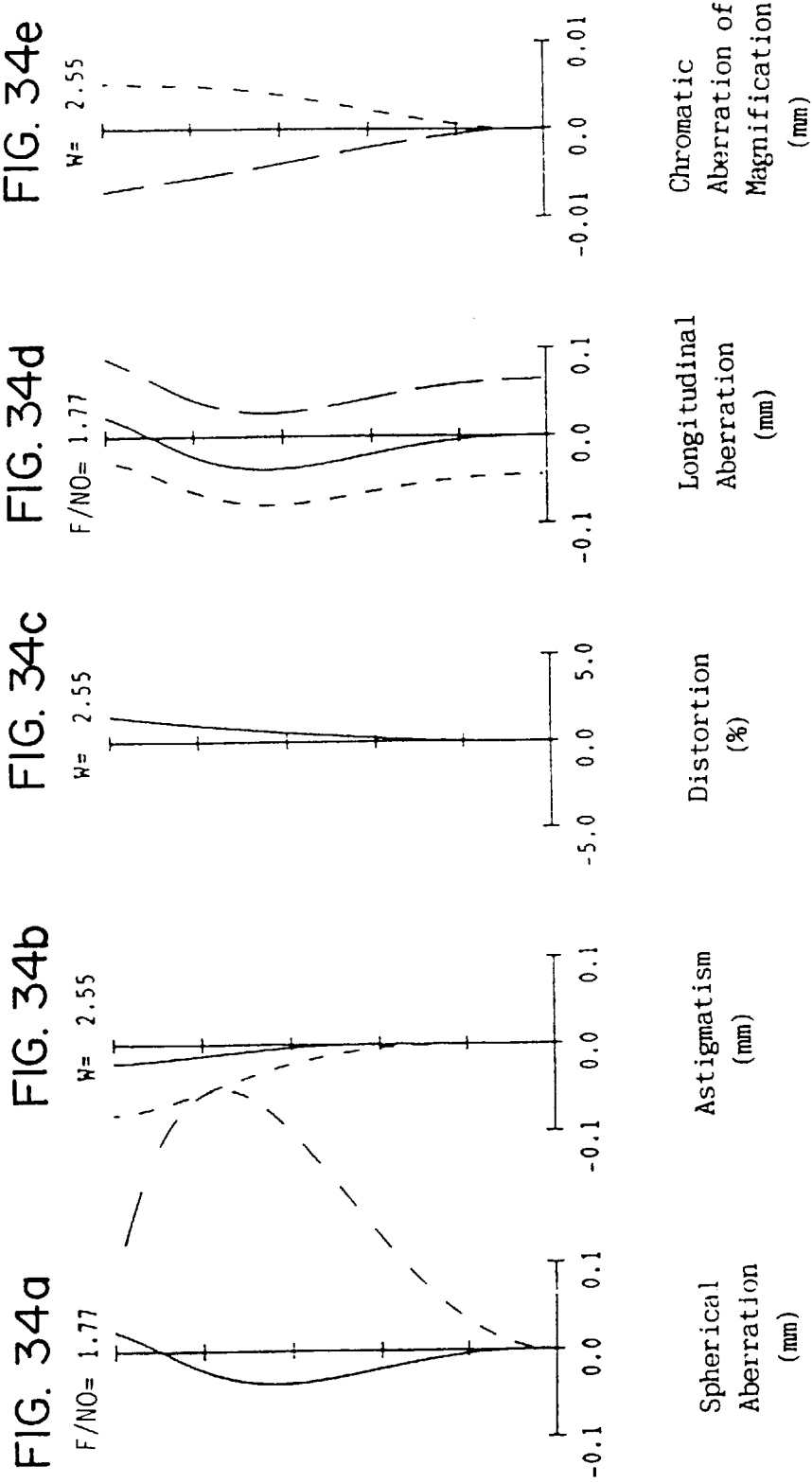

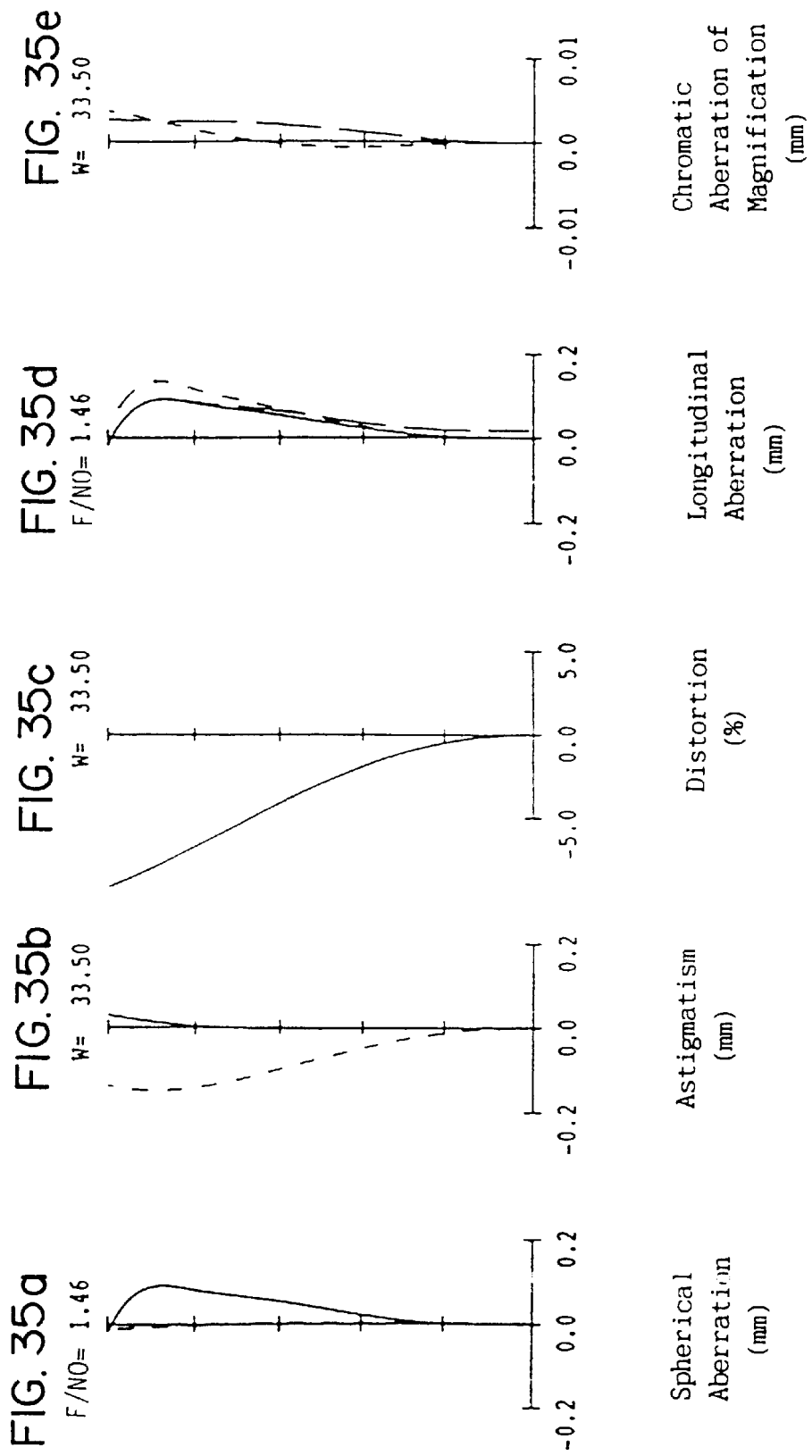

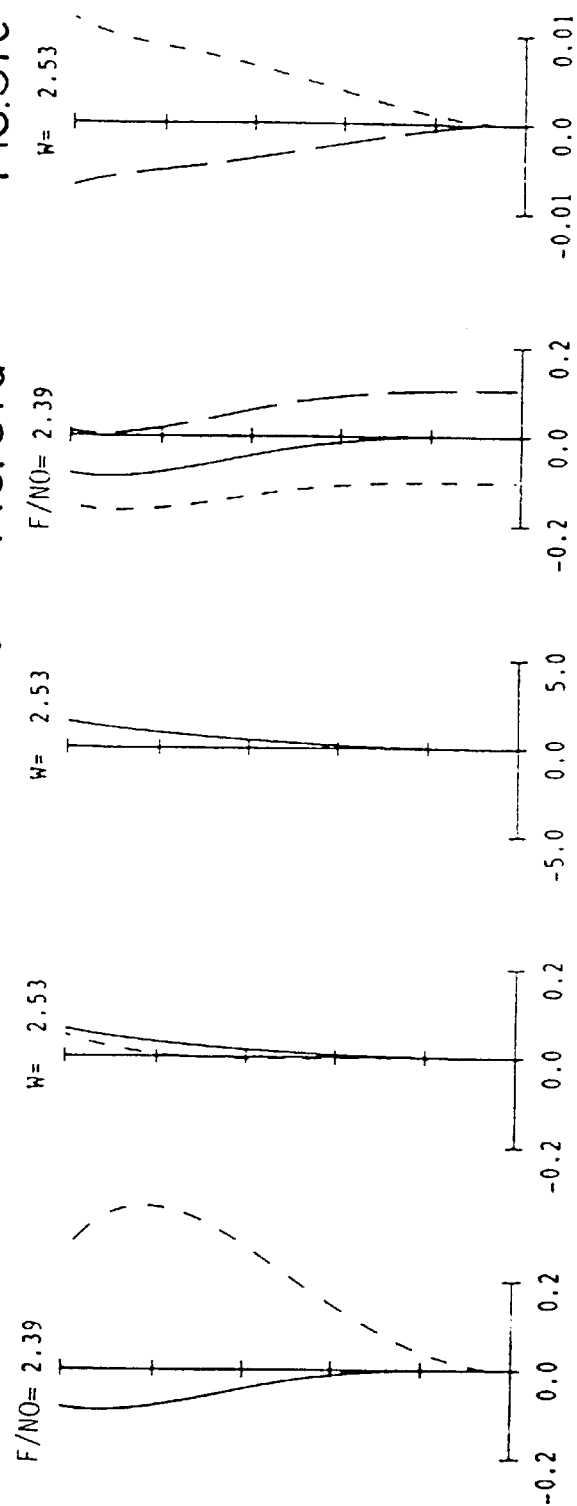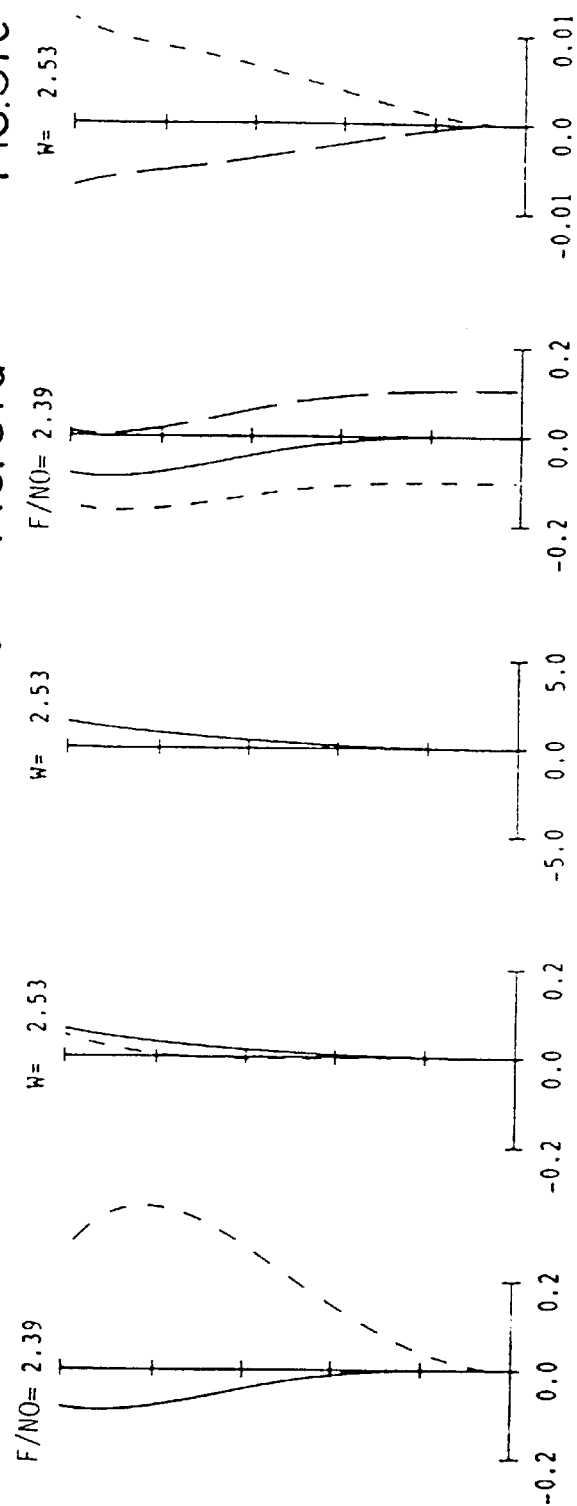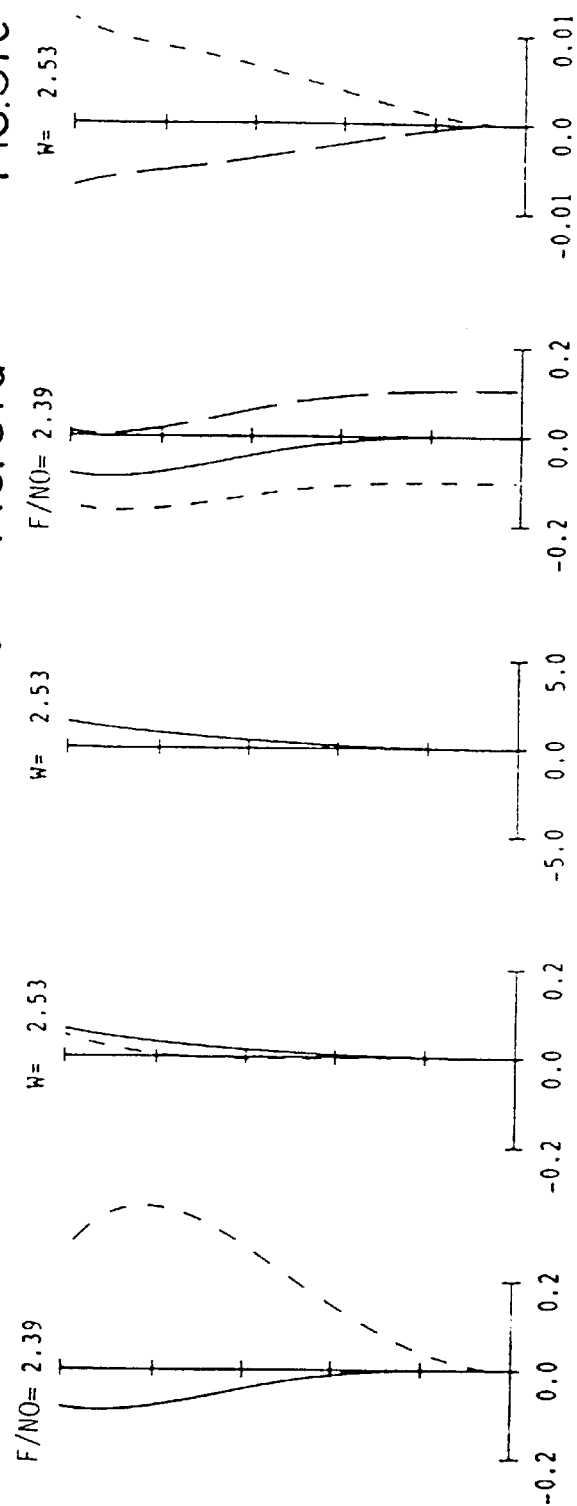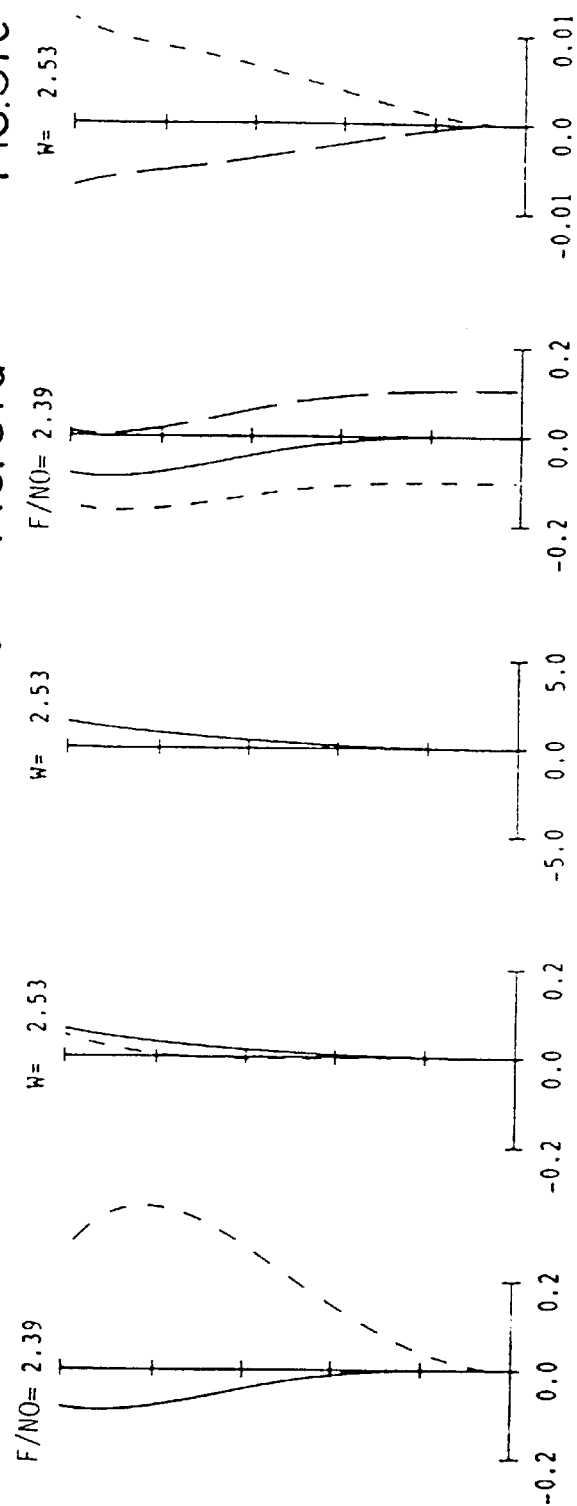

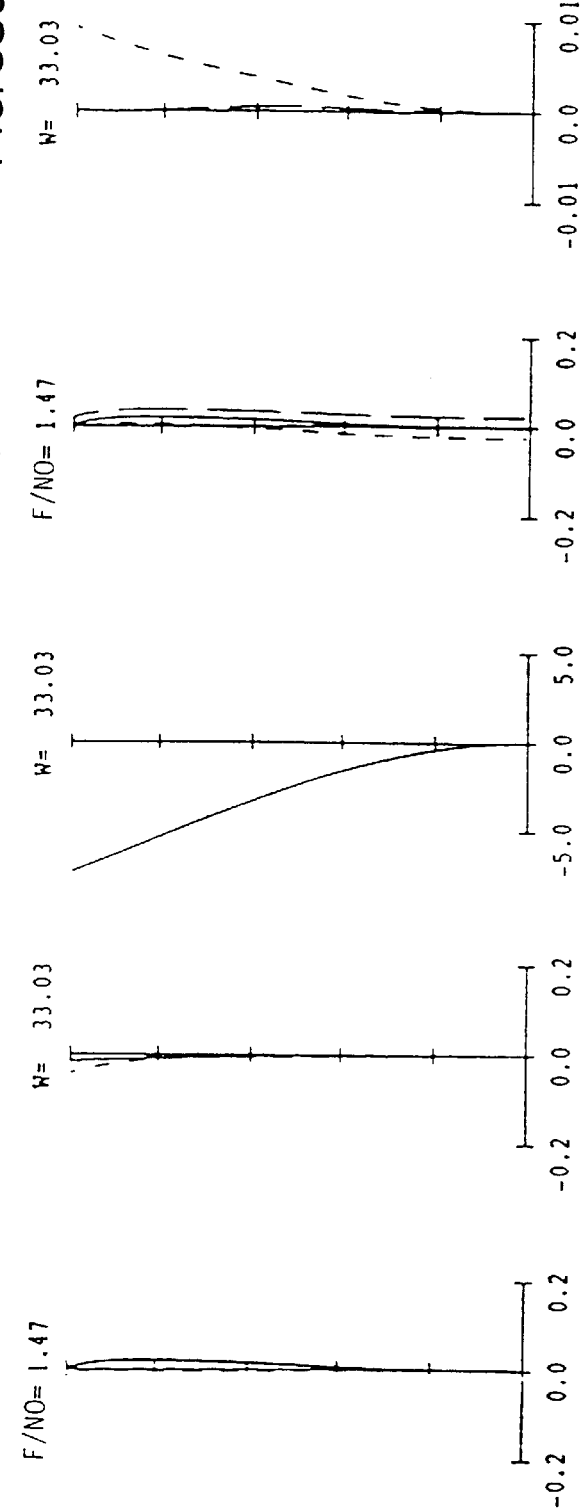

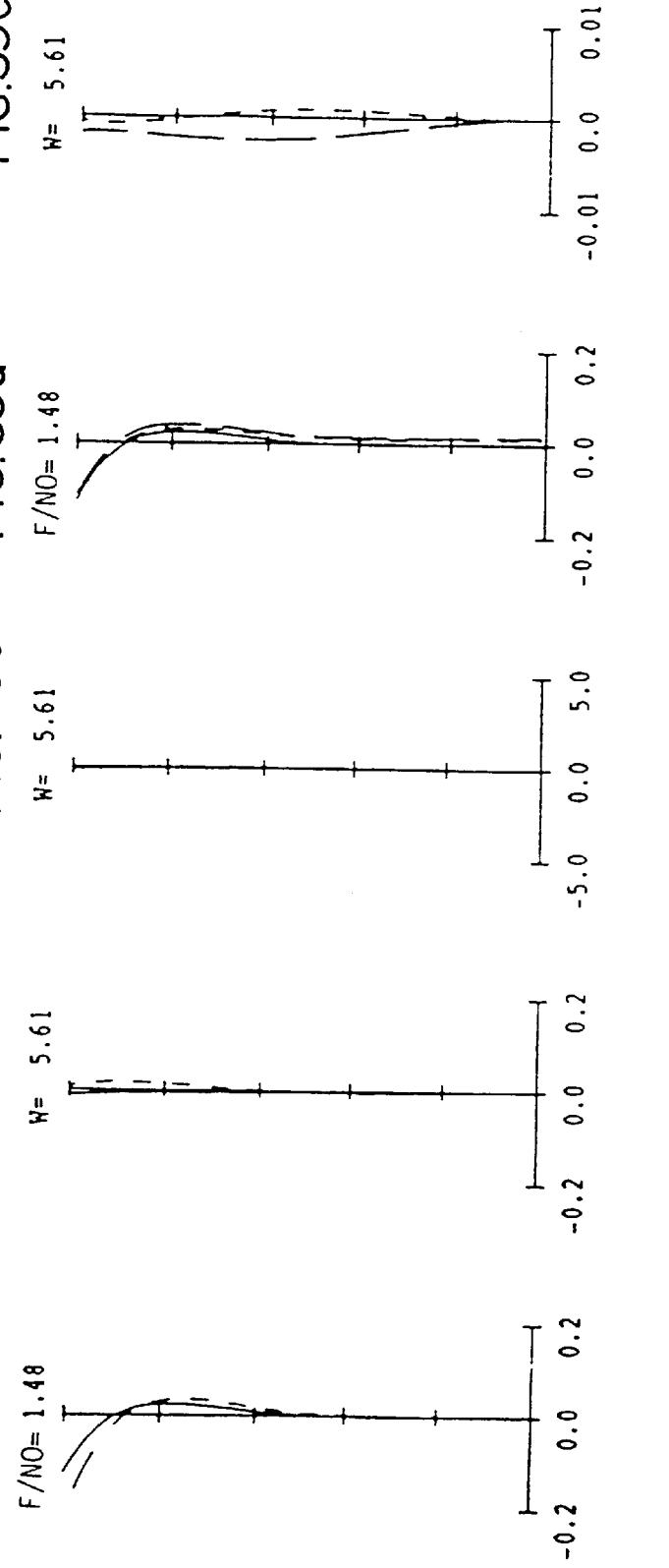

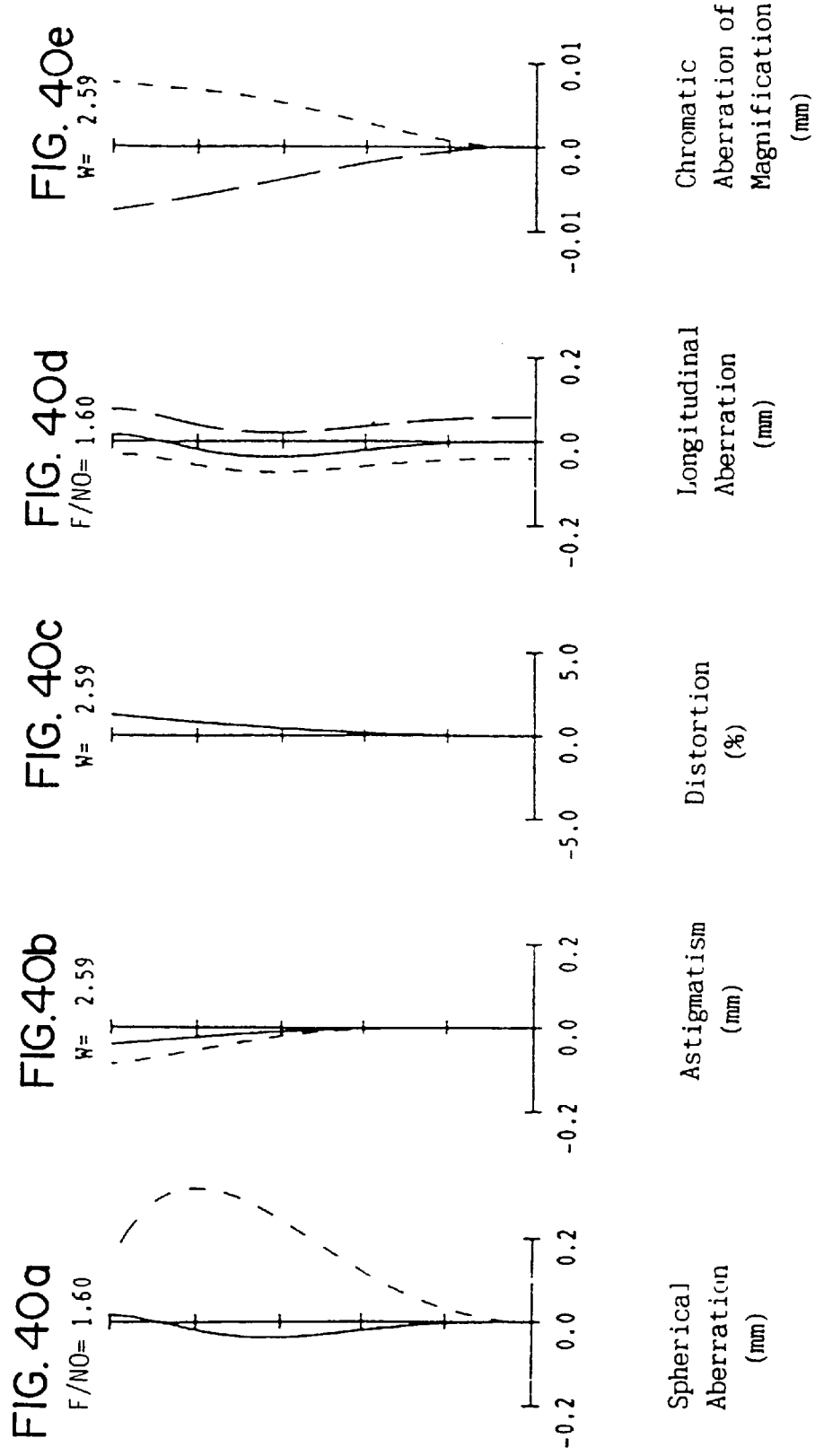

ZOOM LENS AND VIDEO CAMERA COMPRISING THE SAME

FIELD OF THE INVENTION

This invention relates to an aspheric zoom lens applied to a single CCD video camera, having an angle of view of 64° or wider, a high zoom ratio of 14, and a long back focus.

DESCRIPTION OF THE PRIOR ART

In order to achieve downsizing and the improvement of the image quality and function of video cameras, the downsizing of high performance, high function zoom lenses and image pick up devices is required. Consequently, a high zoom ratio obtained by reducing the wide angle focal length of the system and extending the telescopic focal length of the system, and a high image quality, attained by compensating aberrations, are necessitated. On the other hand, a lens system manufactured at low cost while maintaining high performance is called for in order to maintain economic competitiveness. Consequently, a zoom lens capable of providing a wide view angle, a high zoom ratio and a high resolution with a smaller F number of lenses is needed.

An example of conventional zoom lenses for video cameras disclosed in JP-A-6-109975 will be described with reference to FIG. 42. The conventional zoom lens for a video camera of FIG. 42 comprises a first lens group 421 as a converging part, a second lens group 422 as the zooming part, a third lens group 423 as a converging part, and a fourth lens group 424 as the focusing part. Further, the numeral 425 denotes the equivalent glass plate corresponding to a crystal filter or a faceplate of an image pick up device, and the numeral 426 denotes the focal plane.

The operation of the conventional zoom lens for a video camera with the above mentioned structure will be explained hereinafter. The first lens group 421 fixed with respect to the focal plane provides the focusing effect. The second lens group 422, movable along the optical axis, adjusts the focal length of the entire lens system by changing its position on the optical axis. The fixed third lens group 423 converges the light diverged by the second lens group. The fourth lens group 424, movable on the optical axis, focuses the light. The change of the focal plane position subsequent to the movement of the second lens group 422 at zooming can be compensated by moving the fourth lens group 424 to focus on a specific position to maintain a stable focal plane.

However, although the number of lenses is kept low at ten, a conventional zoom lens with the above mentioned structure can provide only an angle of view at the wide angle end of about 60° and a zoom ratio of merely about 12. Further, the f-number is 1.6 or greater. Therefore such a lens cannot meet the growing demand for zoom lenses of video cameras to provide a wide angle of view and a high zoom ratio. Further, a wide angle of view and a high zoom ratio cannot be realized in a conventional zoom lens design without enlarging a lens system entirely or complicating the lens structure.

SUMMARY OF THE INVENTION

This invention is to solve the above described problems in conventional lenses. That is, the object of the present invention is to provide an aspheric zoom lens having an f-number of about 1.4, a high zoom ratio of about 14, a full angle of view at the wide angle end of 64° or wider, and a video camera comprising the aspheric zoom lens with a simple lens structure by applying an optimum lens structure and an optimum aspheric shape.

In order to realize the above mentioned object, a zoom lens of the present invention comprises (aligned from the objective side) a first lens group with a positive refracting power fixed with respect to the focal plane, a second lens group with a negative refracting power movable along the optical axis to provide a zooming effect, a third lens group with a positive refracting power fixed with respect to the focal plane to provide a converging effect, and a fourth lens group with a positive refracting power movable along the optical axis to keep the focal plane at a certain distance from the reference plane (predetermined position) by compensating the position change of the focal plane subsequent to the movement of the second lens group or the movement of the objective to be picked up, wherein, the first lens group comprises (aligned from the objective side) a lens with a negative refracting power, a lens with a positive refracting power, and a meniscus lens with a positive refracting power having the convex surface at the objective side;

the second lens group comprises (aligned from the objective side) a lens with a negative refracting power, a biconcave lens, and a lens with a positive refracting power, with at least one surface of these lenses aspheric;

the third lens group comprises (aligned from the objective side) a lens with a positive refracting power, and a lens with a negative refracting power having the convex surface at the objective side, with at least one surface of these lenses aspheric;

the fourth lens group comprises two lenses, with at least one surface of these lenses aspheric; and the below mentioned formula (1) is satisfied, $$0.1 < (f_w \cdot \tan W)/(f_1 \cdot |f_2|)^{1/2} < 0.35 \tag{1}$$

wherein fw is the focal length of the system at the wide angle end;

W is the half angle of view at the wide angle end;

f1 is the focal length of the first lens group; and f2 is the focal length of the second lens group;

and an angle of view of 64° or more is obtained at the wide angle end.

In the above mentioned embodiment, it is preferable that the fourth lens group comprises (aligned from the objective side) a lens with a positive refracting power and a lens with a negative refracting power.

Alternatively, in the above mentioned embodiment, it is preferable that the fourth lens group comprises (aligned from the objective side) a lens with a positive refracting power and a lens with a negative refracting power, which are bonded together.

Alternatively, in the above mentioned embodiment, it is preferable that the fourth lens group comprises (aligned from the objective side) a lens with a negative refracting power having the convex surface at the objective side and a lens with a positive refracting power.

Alternatively, in the above mentioned embodiments, it is preferable that the fourth lens group comprises (aligned from the objective side) a lens with a negative refracting power and a lens with a positive refracting power, which are bonded together.

In each of the above mentioned embodiments, it is preferable that the second lens group comprises (aligned from the objective side) a lens with a negative refracting power having the convex surface at the objective side, a biconcave lens with a negative refracting power, and a lens with a positive refracting power having the convex surface at the objective side and bonded to the biconcave lens.

Further, in each of the above mentioned embodiments, it is preferable that the below mentioned formula (2) is satisfied, (1) $3.0 < f1/fw < 9.0$ (2) $0.5 < |f2|/fw < 1.6$ (3) $2.0 < f3/fw < 7.0$ (4) $2.0 < f4/fw < 5.0$ (5) $0.1 < fw/r13 < 0.2$     (2)

wherein fw is the focal length of the system at the wide angle end;

fi is the focal length of the (i)th lens group (i=1, 2, 3, 4); and r13 is the curvature of the objective side surface of the lens with a negative refracting power located at the focal plane side of the third lens group.

Further, in each of the above mentioned embodiments, it is preferable that both of the below mentioned formulae (3) and (4) are satisfied, (1) $6.4 < f1/fw < 8.6$ (2) $1.0 < |f2|/fw < 1.4$ (3) $3.7 < f3/fw < 5.2$ (4) $3.1 < f4/fw < 3.5$ (5) $0.13 < fw/r13 < 0.16$     (3)

$0.182 < (fw \cdot \tan W)/(f1 \cdot |f2|)^{1/2} < 0.248$     (4)

wherein fw is the focal length of the system at the wide angle end;

fi is the focal length of the (i)th lens group (i=1, 2, 3, 4);

r13 is the curvature of the objective side surface of the lens with a negative refracting power located at the focal plane side of the third lens group; and W is the half angle of view at the wide angle end.

Another zoom lens of the present invention comprises (aligned from the objective side) a first lens group with a positive refracting power fixed with respect to the focal plane, a second lens group with a negative refracting power movable on the optical axis to provide a zooming effect, a third lens group with a positive refracting power fixed with respect to the focal plane to provide a converging effect, and a fourth lens group with a positive refracting power movable along the optical axis to keep the focal plane at a certain distance from the reference plane by compensating the position change of the focal plane subsequent to the movement of the second lens group or the movement of the objective to be picked up, wherein, the first lens group comprises (aligned from the objective side) a lens with a negative refracting power, a lens with a positive refracting power and a meniscus lens with a positive refracting power having the convex surface at the objective side;

the second lens group comprises (aligned from the objective side) a lens with a negative refracting power, a biconcave lens with a negative refracting power and a lens with a positive refracting power, with at least one surface of these lenses aspheric;

the third lens group comprises (aligned from the objective side) a lens with a positive refracting power, a biconcave lens with a negative refracting power, with at least one surface of these lenses aspheric;

the fourth lens group comprises (aligned from the objective side) a lens with a positive refracting power and a lens with a negative refracting power, with at least one surface of these lenses aspheric; and the above mentioned formula (1) is satisfied, and an angle of view of 64° or more is obtained at the wide angle end.

In the above mentioned embodiment, it is preferable that the fourth lens group comprises (aligned from the objective side) a biconvex lens with a positive refracting power and a lens with a negative refracting power having the convex surface at the focal plane side.

Alternatively, in the above mentioned embodiment, it is preferable that the fourth lens group comprises (aligned from the objective side) a lens with a positive refracting power and a lens with a negative refracting power, which are bonded together.

In each of the above mentioned embodiments, it is preferable that the second lens group comprises (aligned from the objective side) a lens with a negative refracting power having the convex surface at the objective side, a biconcave lens having a negative refracting power, and a lens with a positive refracting power having the convex surface at the objective side and bonded to the biconcave lens.

In each of the above mentioned embodiments, it is preferable that the below mentioned formula (5) is satisfied, (6) $3.0 < f1/fw < 10.0$ (7) $0.5 < |f2|/fw < 1.8$ (8) $2.0 < f3/fw < 7.0$ (9) $2.0 < f4/fw < 5.0$

(10) $-0.2 < fw/r13 < -0.1$     (5)

wherein fw is the focal length of the system at the wide angle end;

fi is the focal length of the (i)th lens group (i=1, 2, 3, 4); and r13 is the curvature of the objective side surface of the lens with a negative refracting power located at the focal plane side of the third lens group.

Alternatively, in each of the above mentioned embodiments, it is preferable that both of the below mentioned formulae (6) and (7) are satisfied, (6) $6.6 < f1/fw < 9.3$ (7) $1.1 < |f2|/fw < 1.6$ (8) $4.1 < f3/fw < 4.6$ (9) $3.3 < f4/fw < 3.6$

(10) $-0.17 < fw/r13 < -0.15$     (6)

$0.168 < (fw \cdot \tan W)/(f1 \cdot |f2|)^{1/2} < 0.236$     (7)

wherein fw is the focal length at the system at the wide angle end;

fi is the focal length of the (i)th lens group (i=1, 2, 3, 4);

r13 is the curvature of the objective side surface of the lens with a negative refracting power located at the focal plane side of the third lens group; and W is the half angle of view at the wide angle end.

A further different zoom lens of the present invention comprises (aligned from the objective side) a first lens group with a positive refracting power fixed with respect to the focal plane, a second lens group with a negative refracting power movable on the optical axis to provide a zooming effect, a third lens group with a positive refracting power fixed with respect to the focal plane to provide a converging effect, and a fourth lens group with a positive refracting power movable along the optical axis to keep the focal plane at a certain distance from the reference plane by compensating the position change of the focal plane subsequent to the movement of the second lens group or the movement of the objective to be picked up, wherein, the first lens group comprises (aligned form the objective side) a lens with a negative refracting power, a lens with a positive refracting power and a meniscus lens with a positive refracting power having the convex surface at the objective side;

the second lens group comprises (aligned from the objective side) a lens with a negative refracting power, a biconcave lens and a lens with a positive refracting power, with at least one surface of these lenses aspheric;

the third lens group comprises (aligned from the objective side) a lens with a positive refracting power, a biconcave lens with a negative refracting pwoer, with at least one surface of these lenses aspheric;

the fourth lens group comprises (aligned from the objective side) a lens with a negative refracting power and a lens with a positive refracting power, with at least one surface of these lenses aspheric; and the above mentioned formula (1) is satisfied, and an angle of view of 64° or more is possessed at the wide angle end.

In the above mentioned embodiment, it is preferable that the fourth lens group comprises (aligned from the objective side) a lens with a negative refracting power having the convex surface at the objective side and a lens with a positive refracting power.

Alternatively, in the above mentioned embodiment, it is preferable that the fourth lens group comprises (aligned from the objective side) a lens with a negative refracting power and a lens with a positive refracting power, which are bonded together.

In each of the above mentioned embodiments, it is preferable that the second lens group comprises (aligned from the objective side) a lens with a negative refracting power having the convex surface at the objective side, a biconcave lens with a negative refracting power, and a lens with a positive refracting power having the convex surface at the objective side and bonded to the biconcave lens.

In each of the above mentioned embodiments, it is preferable that the below mentioned formula (8) is satisfied,

(11) $3.0 < f1/fw < 12.0$

(12) $0.5 < |f2|/fw < 1.8$

(13) $2.0 < f3/fw < 7.0$

(14) $2.0 < f4/fw < 5.0$

(15) $0.1 < fw/r13 < 0.2$ \hfill (8)

wherein fw is the focal length of the system at the wide angle end;

fi is the focal length of the (i)th lens group (i=1, 2, 3, 4); and r13 is the curvature of the objective side surface of the lens with a negative refracting power located at the focal plane side of the third lens group.

Alternatively, in each of the above mentioned embodiments, it is preferable that both of the below mentioned formulae (9) and (10) are satisfied,

(11) $6.5 < f1/fw < 9.7$

(12) $1.0 < |f2|/fw < 1.6$

(13) $4.1 < f3/fw < 4.4$

(14) $3.0 < f4/fw < 3.2$

(15) $0.1 < fw/r13 < 0.2$ \hfill (9)

$0.167 < (fw \cdot \tan W)/(f1 \cdot |f2|)^{1/2} < 0.246$ \hfill (10)

wherein fw is the focal length of the system at the wide angle end;

fi is the focal length of the (i)th lens group (i=1, 2, 3, 4);

r13 is the curvature of the objective side surface of the lens with a negative refracting power located at the focal plane side of the third lens group; and W is the half angle of view at the wide angle end.

A further different zoom lens of the present invention comprises (aligned from the objective side) a first lens group with a positive refracting power fixed with respect to the focal plane, a second lens group with a negative refracting power movable along the optical axis to provide a zooming effect, a third lens group with a positive refracting power fixed with respect to the focal plane to provide a converging effect, and a fourth lens group with a positive refracting power movable along the optical axis to keep the focal plane at a certain distance from the reference plane by compensating the position change of the focal plane subsequent to the movement of the second lens group or the movement of the objective to be picked up, wherein, the first lens group comprises (aligned form the objective side) a lens with a negative refracting power, a lens with a positive refracting power and a meniscus lens with a positive refracting power having the convex surface at the objective side;

the second lens group comprises (aligned from the objective side) a lens with a negative refracting power, a biconcave lens and a lens with a positive refracting power, with at least one surface of these lenses aspheric;

the third lens group comprises a lens with a biconvex lens with a positive refracting power, with at least one surface of the lens aspheric;

the fourth lens group comprises three lenses, with at least one surface of the lenses aspheric; and the above mentioned formula (1) is satisfied, and an angle of view of 64° or more is achieved at the wide angle end.

In the above mentioned embodiment, it is preferable that the fourth lens group comprises (aligned from the objective side) a lens with a negative refracting power, a lens with a positive refracting power and a lens with a positive refracting power.

In each of the above mentioned embodiments, it is preferable that the second lens group comprises (aligned from the objective side) a lens with a negative refracting power having the convex surface at the objective side, a biconcave lens with a negative refracting power, and a biconvex lens with a positive refracting power and bonded to the biconcave lens.

Alternatively, in the above mentioned embodiments, it is preferable that the second lens group comprises (aligned from the objective side) a lens with a negative refracting power having the convex surface at the objective side, a biconcave lens with a negative refracting power, and a lens with a positive refracting power having the convex surface at the objective side and bonded to the biconcave lens.

In each of the above mentioned embodiments, it is preferable that the below mentioned formula (11) is satisfied,

(16) $3.0<f1/fw<12.0$

(17) $0.5<|f2|/fw<1.8$

18) $2.0<f3/fw<7.0$

(19) $2.0<f4/fw<5.0$

(20) $-0.8<(f1\cdot f2)/(f3\cdot f4)<-0.1$     (11)

wherein fw is the focal length of the system at the wide angle end; and fi is the focal length of the (i)th lens group (i=1, 2, 3, 4).

Alternatively, in each of the above mentioned embodiments, it is preferable that both of the below mentioned formulae (12) and (13) are satisfied,

(16) $6.0<f1/fw<8.6$

(17) $1.0<|f2|/fw<1.5$

(18) $4.8<f3/fw<5.3$

(19) $3.8<f4/fw<4.0$

(20) $-0.7<(f1\cdot f2)/(f3\cdot f4)<-0.3$     (12)

$0.181<(fw\cdot \tan W)/(f1\cdot |f2|)^{1/2}<0.267$     (13)

wherein fw is the focal length of the system at the wide angle end;

fi is the focal length of the (i)th lens group (i=1, 2, 3, 4);

r13 is the curvature of the objective side surface of the lens with a negative refracting power located at the focal plane side of the fourth lens group; and W is the half angle of view at the wide angle end.

A video camera of the present invention comprises a zoom lens having any of the above described embodiments.

According to the zoom lens of the present invention with the above mentioned structure, by comprising a concave lens with a negative refracting power having the convex surface at the objective side, a biconvex lens with a positive refracting power and a lens with a positive refracting power having the convex surface at the objective side, an entire first lens group achieves a positive refracing power. By comprising a lens with a negative refracting power, a biconcave lens with a negative refracting power and a lens with a positive refracting power, with at least one surface of the lenses aspheric, an entire second lens group achieves a negative refracting power and also compensates for spherical aberration. In the case a third lens group is configured as doublet, by comprising a biconvex lens with a positive refracting power and a concave lens with a negative refracting power having the convex surface at the objective side or a biconcave lens having a negative refracting power, with at least one surface of the lenses aspheric, an entire third lens group achieves a positive refracting power and also compensates for aberration. By comprising (aligned from the objective side) a lens with a negative refracting power and a biconvex lens with a positive refracting power bonded together, with at least one surface of the lenses being aspheric, an entire fourth lens group achieves a positive refracting power and also compensates for spherical aberration. In the case a third lens group has single lens, by comprising a biconvex lens with a positive refracting power, with at least one surface of the lens aspheric, a third lens group achieves a positive refracting power and also compensates for aberration. Further, by comprising a bonded lens including a concave lens with a negative refracting power having the convex surface at the objective side and a biconvex lens with a positive refracting power bonded together, and a biconvex lens with a positive refracting power, with at least one surface of the lenses being aspheric, an entire fourth lens group achieves a positive refracting power and also compensates for spherical aberration.

The above mentioned formulae (1), (4), (7), (10) and (13) relate to the back focus and the angle of view. When a figure is smaller than the lower limit, although the angle of view becomes wider, a sufficient back focus cannot be realized. On the other hand, when a figure is greater than the upper limit, although a sufficient back focus can be realized, a wide angle of view can not be attained. However, since a condition described in any of the above mentioned formulae is designed to be satisfied in this invention, a sufficient back focus and a wide view of angle can be obtained.

The above mentioned formulae (2), (3), (5), (6), (8), (9), (11) and (12) are conditional formulae stipulating the refraction power of each lens group. By satisfying the conditional formulae, and by selecting a lens of an optimum type and surface shape in each lens group, a strong refracting power can be achieved for realizing a compact zoom lens and good aberration properties can be obtained.

By the interaction among the lens groups, aberration can be sufficiently compensated, and a zoom lens having a wide angle of view of 64° at the wide angle end and a high zoom ratio of about 14 times can be obtained with a simple structure.

By comprising a wide angle high ratio aspheric zoom lens of the present invention, a compact and lightweight single CCD video camera having a wide angle, high ratio and high image quality can be realized.

BRIEF DESCRIPTION OF THE DRAWINGS

FIGS. 5 (*a*) to 5 (*e*) are graphs illustrating the aberration properties of the zoom lens operating at the wide angle portion with the concrete numerical example 1 of the first embodiment.

FIGS. 6 (*a*) to 6 (*e*) are graphs illustrating the aberration properties of the same zoom lens as used in FIGS. 5 (*a*) to 5 (*e*), operating at the standard position.

FIGS. 7 (*a*) to 7 (*e*) are graphs illustrating the aberration properties of the same zoom lens used in FIGS. 5 (*a*) to 5 (*e*), operating at the telescopic position.

FIGS. 8 (*a*) to 8 (*e*) are graphs illustrating the aberration properties of the zoom lens with the concrete numerical example 2 of the first embodiment, operating at the wide angle position.

FIGS. 9 (*a*) to 9 (*e*) are graphs illustrating the aberration properties of the same zoom lens used in FIGS. 8 (*a*) to 8 (*e*), operating at the standard position.

FIGS. 10 (a) to 10 (e) are graphs illustrating the aberration properties of the same zoom lens used in FIGS. 8 (a) to 8 (e), operating at the telescopic position.

FIGS. 11 (a) to 11 (e) are graphs illustrating the aberration properties of the zoom lens with the concrete numerical example 3 of the first embodiment, operating at the wide angle position.

FIGS. 12 (a) to 12 (e) are graphs illustrating the aberration properties of the same zoom lens used in FIGS. 11 (a) to 11 (e), operating at the standard position.

FIGS. 13 (a) to 13 (e) are graphs illustrating the aberration properties of the same zoom lens used in FIGS. 11 (a) to 11 (e), operating at the telescopic position.

FIGS. 14 (a) to 14 (e) are graphs illustrating the aberration properties of the second embodiment of the zoom lens operating at the wide angle position, for numerical example 4.

FIGS. 15 (a) to 15 (e) are graphs illustrating the aberration properties of the same zoom lens used in FIGS. 14 (a) to 14 (e), operating at the standard position.

FIGS. 16 (a) to 16 (e) are graphs illustrating the aberration properties of the same zoom lens used in FIGS. 14 (a) to 14 (e), operating at the telescopic position.

FIGS. 17 (a) to 17 (e) are graphs illustrating the aberration properties of the second embodiment of the zoom lens operating at the wide angle position, for numerical example 5.

FIGS. 18 (a) to 18 (e) are graphs illustrating the aberration properties of the same zoom lens used in FIGS. 17 (a) to 17 (e), operating at the standard position.

FIGS. 19 (a) to 19 (e) are graphs illustrating the aberration properties of the same zoom lens used in FIGS. 17 (a) to 17 (e), operating at the telescopic position.

FIGS. 20 (a) to 20 (e) are graphs illustrating the aberration properties of the second embodiment of the zoom lens operating at the wide angle position, for numerical example 6.

FIGS. 21 (a) to 21 (e) are graphs illustrating the aberration properties of the same zoom lens used in FIGS. 20 (a) to 20 (e), operating at the standard position.

FIGS. 22 (a) to 22 (e) are graphs illustrating the aberration properties of the same zoom lens used in FIGS. 20 (a) to 20 (e), operating at the telescopic position.

FIGS. 23 (a) to 23 (e) are graphs illustrating the aberration properties of the third embodiment of the zoom lens operating at the wide angle position, for numerical example 7.

FIGS. 24 (a) to 24 (e) are graphs illustrating the aberration properties of the same zoom lens used in FIGS. 23 (a) to 23 (e), operating at the standard position.

FIGS. 25 (a) to 25 (e) are graphs illustrating the aberration properties of the same zoom lens used in FIGS. 23 (a) to 23 (e), operating at the telescopic position.

FIGS. 26 (a) to 26 (e) are graphs illustrating the aberration properties of the third embodiment of the zoom lens operating at the wide angle position, for numerical example 8.

FIGS. 27 (a) to 27 (e) are graphs illustrating the aberration properties of the same zoom lens used in FIGS. 26 (a) to 26 (e), operating at the standard position.

FIGS. 28 (a) to 28 (e) are graphs illustrating the aberration property at the telescopic end of the zoom lens same as FIGS. 26 (a) to 26 (e).

FIGS. 29 (a) to 29 (e) are graphs illustrating the aberration properties of the third embodiment of the zoom lens operating at the wide angle position, for numerical example 9.

FIGS. 30 (a) to 30 (e) are graphs illustrating the aberration properties of the same zoom lens used in FIGS. 29 (a) to 29 (e), operating at the standard position.

FIGS. 31 (a) to 31 (e) are graphs illustrating the aberration properties of the same zoom lens used in FIGS. 29 (a) to 29 (e), operating at the telescopic position.

FIGS. 32 (a) to 32 (e) are graphs illustrating the aberration properties of the fourth embodiment of the zoom lens operating at the wide angle position, for numerical example 10.

FIGS. 33 (a) to 33 (e) are graphs illustrating the aberration properties of the same zoom lens used in FIGS. 32 (a) to 32 (e), operating at the standard position.

FIGS. 34 (a) to 34 (e) are graphs illustrating the aberration properties of the same zoom lens used in FIGS. 32 (a) to 32 (e), operating at the telescopic position.

FIGS. 35 (a) to 35 (e) are graphs illustrating the aberration properties of the fourth embodiment of the zoom lens operating at the wide angle position, for numerical example 11.

FIGS. 36 (a) to 36 (e) are graphs illustrating the aberration properties of the same zoom lens used in FIGS. 35 (a) to 35 (e), operating at the standard position.

FIGS. 37 (a) to 37 (e) are graphs illustrating the aberration properties of the same zoom lens used in FIGS. 35 (a) to 35 (e), operating at the telescopic position.

FIGS. 38 (a) to 38 (e) are graphs illustrating the aberration properties of the fourth embodiment of the zoom lens operating at the wide angle position, for numerical example 12.

FIGS. 39 (a) to 39 (e) are graphs illustrating the aberration properties of the same zoom lens used in FIGS. 38 (a) to 38 (e), operating at the standard position.

FIGS. 40 (a) to 40 (e) are graphs illustrating the aberration properties of the same zoom lens used in FIGS. 38 (a) to 38 (e), operating at the telescopic position.

Figure 1:
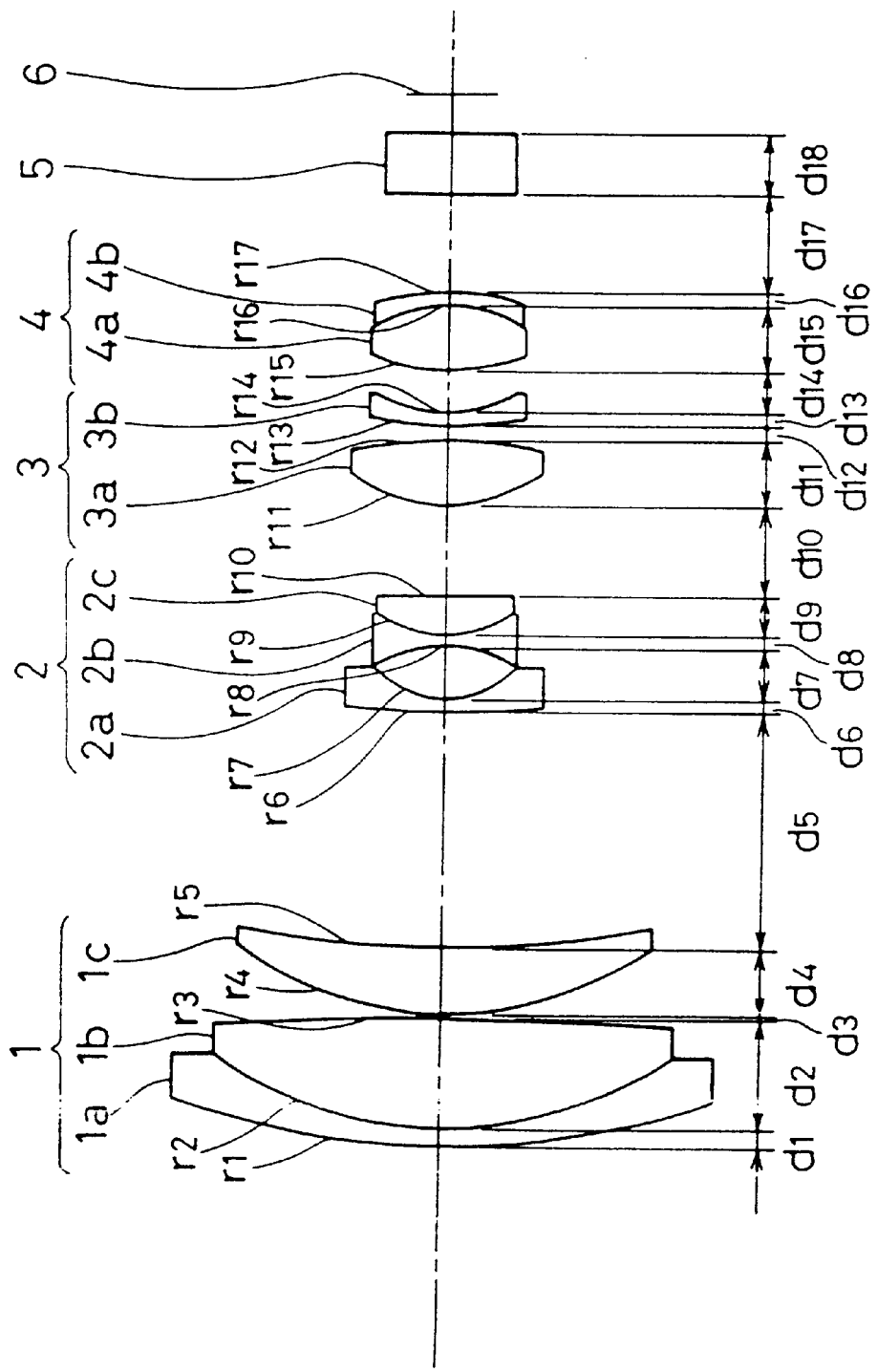
FIG. 1 is a diagram of the zoom lens of the first embodiment of the present invention.

DETAILED DESCRIPTION OF THE INVENTION (First embodiment)

A first embodiment of a zoom lens of the present invention will be described in detail with reference to FIG. 1, a diagram of the zoom lens of the first embodiment. The zoom lens of FIG. 1 comprises (aligned from the objective side) a first lens group 1 with a positive refracting power fixed with respect to the focal plane 6, a second lens group 2 with a negative refracting power movable along the optical axis to provide a zooming effect, a third lens group 3 with a positive refracting power fixed with respect to the focal plane 6 to provide a converging effect, and a fourth lens group 4 with a positive refracting power movable along the optical axis to keep the focal plane 6 at a certain distance from the reference plane by compensating the position change of the focal plane 6 subsequent to the movement of the second lens group 2 or the movement of the object. Further, a plate 5 equivalent to an optical low-pass filter or a faceplate of an image pick-up device is located between the fourth lens group 4 and the focal plane 6.

The first lens group 1 comprises (aligned from the objective side) a lens 1a with a negative refracting power, a lens 1b with a positive refracting power, and a meniscus lens 1c with a positive refracting power having the convex surface at the objective side. The second lens group 2 comprises (aligned from the objective side) a lens 2a with a negative refracting power, a biconcave lens 2b, and a lens 2c with a positive refracting power, with at least one surface of these lenses aspheric. The third lens group 3 comprises (aligned from the objective side) a lens 3a with a positive refracting power with both surfaces aspheric, and a lens 3b with a negative refracting power having the convex surface at the objective side. This structure of the third lens group 3 is indispensable for compensating flare and coma aberrations associated with the telescopic end at a position in the middle of the wide angle end and the standard angle. In particular, the biconvex lens with aspheric shapes on both sides, located closest to the objective side in the third lens group 3, significantly contributes to the compensation of spherical aberration. A fourth lens group 4 comprises (aligned from the objective side) a biconvex lens 4a with a positive refracting power with both surfaces aspheric, and a lens 4b with a negative refracting power having a convex surface at the focal plane side, which are bonded together. This structure provides sufficient back focus and at the same time sufficient compensation of an aberration using only two lenses.

In FIG. 1, ri (i=1 to 17) denotes the curvature of a lens surface, dk (k=1 to 18) the thickness of a lens or a space distance between lenses. It is designed to satisfy the above mentioned formula (1), when fw is defined to be the focal length of the system at the wide angle end, f1 the focal length of the first lens group 1, f2 the focal length of the second lens group 2, and W the angle of view at the wide angle end. The formula (1) relates to the back focus (the length between the rear end of a lens and the focal plane) and the angle of view. In the case a figure is smaller than the lower limit, although the angle of view becomes wider, a sufficient back focus cannot be obtained. On the other hand, if a figure is greater than the upper limit, although a sufficient back focus can be achieved, a wide angle of view can not be obtained. Further, a focal length fi (i=1 to 4) of the first to fourth lens groups is designed according to the conditions (1) to (4) of the above mentioned formula (2) with fw being the focal length at the wide angle end. The conditions (1), (2), (3), (4) are conditional formulae stipulating the refracting power of each lens group to show the range to provide a strong refracting power to achieve a compact zoom lens and a good aberration property by designing an optimum type of lens and a surface shape of the each lens group.

In the case a figure is smaller than the lower limit of the condition (1), which concerns the refracting power of the first lens group 1, then the refracting power of the first lens group 1 becomes too large, it is difficult to compensate the spherical aberration at the long focus end and the off-axis coma aberration. On the other hand, if a figure is greater than the upper limit, then the lens length becomes too large, and a compact zoom lens can not be realized.

In the case a figure is smaller than the lower limit of the condition (2), which concerns the refracting power of the second lens group 2, although a compact zoom lens can be achieved, curvature of field cannot be compensated by merely selecting the glass material since the Petzval sum of the entire system becomes significantly negative. On the other hand, if a figure is greater than the upper limit, then the zooming system becomes too long and downsizing of the entire system cannot be achieved although aberration can be compensated easily.

In the case a figure is smaller than the lower limit of the condition (3), which concerns the refracting power of the third lens group 3, the refracting power of the third lens group 3 becomes too large, a back focus to locate a crystal or the like cannot be obtained, and the compensation of spherical aberration becomes difficult. On the other hand, if a figure is greater than the upper limit, then the combination of the first lens group, the second lens group, and the third lens group changes to a diverging system from a complex system, the outside diameter of the lens of the fourth lens group should be larger and, further, the Petzval sum of the entire system cannot be small.

In the case a figure is smaller than the lower limit of the condition (4), which concerns the refracting power of the fourth lens group 4, then the image circle becomes too small and thus the lens system of the first lens group 1 needs to be larger and so a compact and lightweight system cannot be achieved. On the other hand, if a figure is greater than the upper limit, although it is easy to compensate aberration, the moving distance of the fourth lens group 4 in short range operation becomes long and thus a compact system cannot be realized. Additionally, it becomes difficult to compensate the imbalance of off-axis aberration for both short range operation and long range operation.

Further, the curvature r13 of the objective side of the lens at the focal plane side of the abovementioned third lens group 3 is determined by condition (5) of the above mentioned formula (2). In the case a figure is smaller than the lower limit of the condition (5) (when a curvature becomes greater), where condition 5 concerns concerning the lens with a negative refracting power located at the objective side having the convex surface at the objective side comprising the third lens group 3, although the flare at the middle of the wide angle end and the standard angle becomes smaller, a great coma aberration is generated. On the other hand, if a figure is greater than the upper limit, although coma aberration can be decreased, a great flare is generated at the middle of the wide angle end and the standard angle.

Although the case with a fourth lens group 4 structure comprising (aligned from the objective side) a biconvex lens 4a with a positive refracting power, a lens 4b with a negative refracting power having the convex surface at the focal plane side bonded together was explained in the above mentioned first embodiment, it is apparent that the same effect can be achieved with a bonded lens comprising (aligned from the objective side) a lens with a negative refracting power having the convex surface at the objective side and a biconvex lens with a positive refracting power. Further, although the case having an aspheric lens surface located closest to the objective side of the fourth lens group is explained in the first embodiment, the same effect can be achieved by locating an aspheric lens surface at the focal plane side of the lens with a negative refracting power having the convex surface at the focal plane side.

(Second embodiment)

A second embodiment of a zoom lens of the present invention is described in detail with reference to FIG. 2, a diagram of the zoom lens of the second embodiment. The zoom lens of FIG. 2 comprises (aligned from the objective side) a first lens group 7 with a positive refracting power fixed with respect to the focal plane 12, a second lens group 8 with a negative refracting power, movable along the optical axis to provide a zooming effect, a third lens group 9 with a positive refracting power fixed with respect to the focal plane 12 to provide a converging effect, a fourth lens group 10 with a positive refracting power movable along the optical axis to keep the focal plane 12 at a certain distance from the reference plane by compensating the position change of the focal plane 12 subsequent to the movement of the second lens group 8 or the movement of the object. Further, a plate 11 equivalent to an optical low-pass filter or a faceplate of an image pick-up device is located between the fourth lens group 10 and the focal plane 12.

The first lens group 7 comprises (aligned from the objective side) a lens 7a with a negative refracting power, a lens 7b with a positive refracting power, and a meniscus lens 7c with a positive refracting power having the convex surface at the objective side. The second lens group 8 comprises (aligned from the objective side) a lens 8a with a negative refracting power, a biconcave lens 8b, and a lens 8c with a positive refracting power, with at least one surface of these lenses aspheric. The third lens group 9 comprises (aligned from the objective side) a biconvex lens 9a with a positive refracting power with both surfaces aspheric, and a biconcave lens 9b with a positive refracting power. This structure of the third lens group 9 is indispensable for compensating flare and coma aberrations associated with the telescopic end at a position in the middle of the wide angle end and the standard angle. In particular, the biconvex lens with aspheric shapes on both sides, located closest to the objective side in the third lens group 9, significantly contributes to the compensation of spherical aberration. A fourth lens group 10 comprises (aligned from the objective side) a biconvex lens 10a with a positive refracting power with both surfaces aspheric, and a lens 10b with a negative refracting power having a convex surface at the focal plane side, which are bonded together. This structure provides sufficient back focus and at the same time sufficient compensation of aberration using only two lenses.

Figure 2:
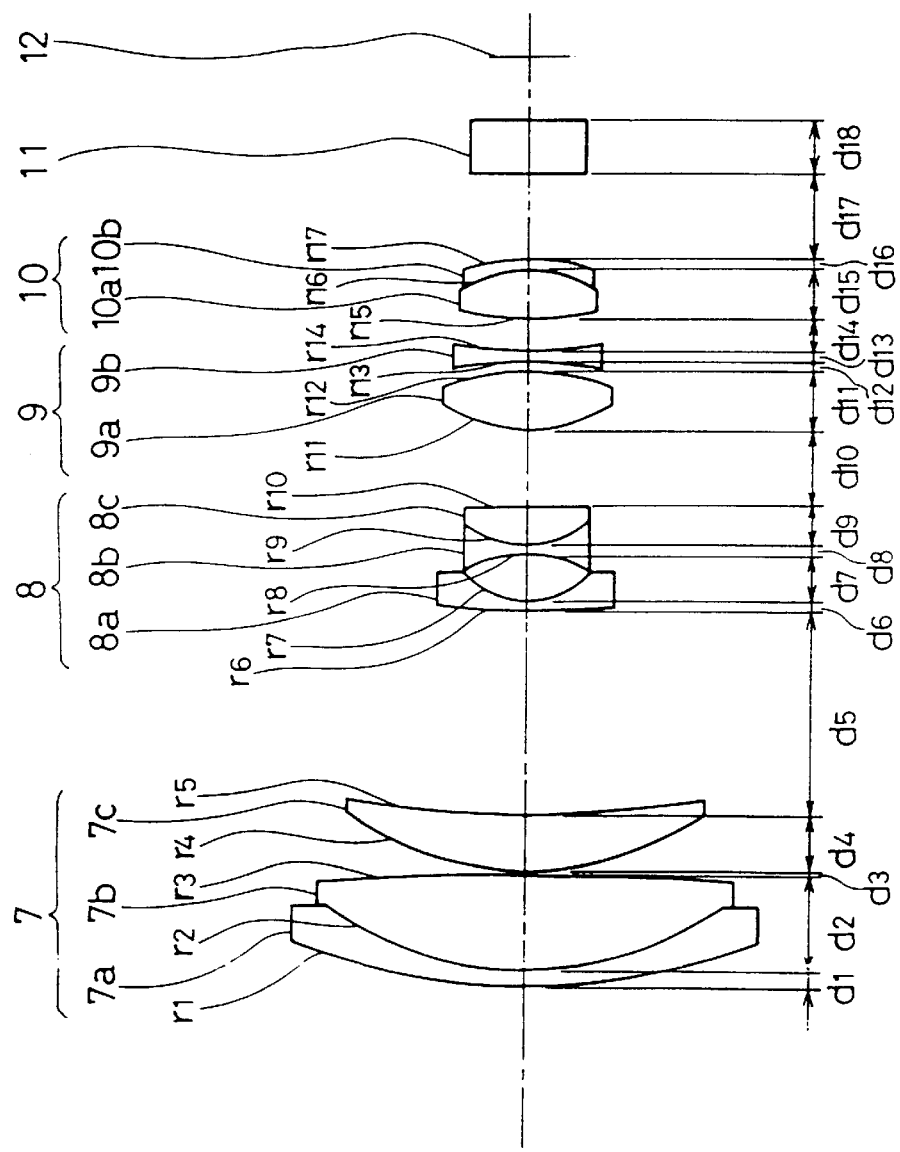
FIG. 2 is a diagram of the zoom lens of the second embodiment of the present invention.

In FIG. 2, ri (i=1 to 17) denotes the curvature of a lens surface, dk (k=1 to 18) the thickness of a lens or a space distance between lenses. It is designed to satisfy the above mentioned formula (1), when fw is defined to be the focal length of the system at the wide angle end, f1 the focal length of the first lens group 7, f2 the focal length of the second lens group 8, and W the angle of view at the wide angle end. The formula (1) relates to the back focus and the angle of view. In the case a figure is smaller than the lower limit, although the angle of view becomes wider, a sufficient back focus cannot be obtained. On the other hand, if a figure is greater than the upper limit, although a sufficient back focus can be achieved, a wide angle of view cannot be obtained. Further, a focal length fi (i=1 to 4) of the first to fourth lens groups is designed according to the conditions (6) to (9) of the above mentioned formula (5) with fw being the focal length at the wide angle end. The conditions (6), (7), (8), (9) are conditional formulae stipulating the refracting power of each lens group to show the range to provide a strong refracting power to achieve a compact zoom lens and a good aberration property by designing an optimum type of lens and a surface shape of the each lens group.

In the case a figure is smaller than the lower limit of the condition (6), which concerns the refracting power of the first lens group 7, then the refracting power of the first lens group 7 becomes too large, it is difficult to compensate the spherical aberration at the long focus end and the off-axis coma aberration. On the other hand, if a figure is greater than the upper limit, then the lens length becomes too long, and a compact zoom lens can not be realized.

In the case a figure is smaller than the lower limit of the condition (7), which concerns the refracting power of the second lens group 8, although a compact zoom lens can be achieved, curvature of field cannot be compensated by merely selecting the glass material since the Petzval sum of the entire system becomes significantly negative. On the other hand, if a figure is greater than the upper limit, then the zooming system becomes too long, and downsizing of the entire system cannot be achieved although aberration can be compensated easily.

In the case a figure is smaller than the lower limit of the condition (8), which concerns the refracting power of the third lens group 9, the refracting power of the third lens group 9 becomes too large, a back focus to locate a crystal or the like cannot be obtained, and the compensation of spherical aberration becomes difficult. On the other hand, if a figure is greater than the upper limit, then the first lens group, the second lens group, and the third lens group changes to a diverging system from a complex system, the outside diameter of the lens of the fourth lens group should be larger and, further, the Petzval sum of the entire system cannot be small.

In the case a figure is smaller than the lower limit of the condition (9), which concerns the refracting power of the fourth lens group 10, then the image circle becomes too small and thus the lens system of the first lens group 7 needs to be larger and so a compact and lightweight system cannot be achieved. On the other hand, if a figure is greater than the upper limit, although it is easy to compensate aberration, the moving distance of the fourth lens group 10 in short range operation becomes long and thus a compact system cannot be realized. Additionally it becomes difficult to compensate the imbalance of off-axis aberration for both short range operation and long range operation.

Further, the curvature r13 of the objective side of the lens at the focal plane side of the abovementioned third lens group 9 is determined by condition (10) of the above mentioned formula (5). In the case a figure is smaller than the lower limit of the condition (10) (when a curvature becomes greater), where condition (5) concerns the lens with a negative refracting power located at the objective side having the convex surface at the objective side comprising the third lens group 9, although the flare at the middle of the wide angle end and the standard angle becomes smaller, a large coma aberration is generated. On the other hand, if a figure is greater than the upper limit, although coma aberration can be decreased, a large flare is generated at the middle of the wide angle end and the standard angle.

(Third embodiment)

A third embodiment of a zoom lens of the present invention will be described in detail with reference to FIG. 3, a diagram of the zoom lens of the third embodiment. The zoom lens of FIG. 3 comprises (aligned from the objective side) a first lens group 13 with a positive refracting power fixed with respect to the focal plane 18, a second lens group 14 with a negative refracting power movable along the optical axis to provide a zooming effect, a third lens group 15 with a positive refracting power fixed with respect to the focal plane 18 to provide a converging effect, a fourth lens group 16 with a positive refracting power movable along the optical axis to keep the focal plane 18 at a certain distance from the reference plane by compensating the position change of the focal plane 18 subsequent to the movement of the second lens group 14 or the movement of the object. Further, a plate 17 equivalent to an optical low-pass filter or a faceplate of an image pick-up device is located between the fourth lens group 16 and the focal plane 18.

The first lens group 13 comprises (aligned from the objective side) a lens 13a with a negative refracting power, a lens 13b with a positive refracting power, and a meniscus lens 13c with a positive refracting power having the convex surface at the objective side. The second lens group 14 comprises (aligned from the objective side) a lens 14a with a negative refracting power, a biconcave lens 14b, and a lens 14c with a positive refracting power, with at least one surface of these lenses aspheric. The third lens group 15 comprises (aligned from the objective side) a biconvex lens 15a with a positive refracting power with both surfaces aspheric, and a biconcave lens 15b with a positive refracting power. This structure of the third lens group 15 is indispensable for compensating flare and coma aberrations associated with the telescopic end at a position in the middle of the wide angle end and the standard angle. In particular, the biconvex lens with aspheric shapes on both sides, located closest to the objective side in the third lens group 15, significantly contributes to the compensation of spherical aberration. A fourth lens group 16 comprises (aligned from the objective side) a lens 16a with a negative refracting power with both surfaces aspheric, and a biconvex lens 16b with a positive refracting power, which are bonded together. This structure provides sufficient back focus and at the same time sufficient compensation of an aberration using only two lenses.

Figure 3:
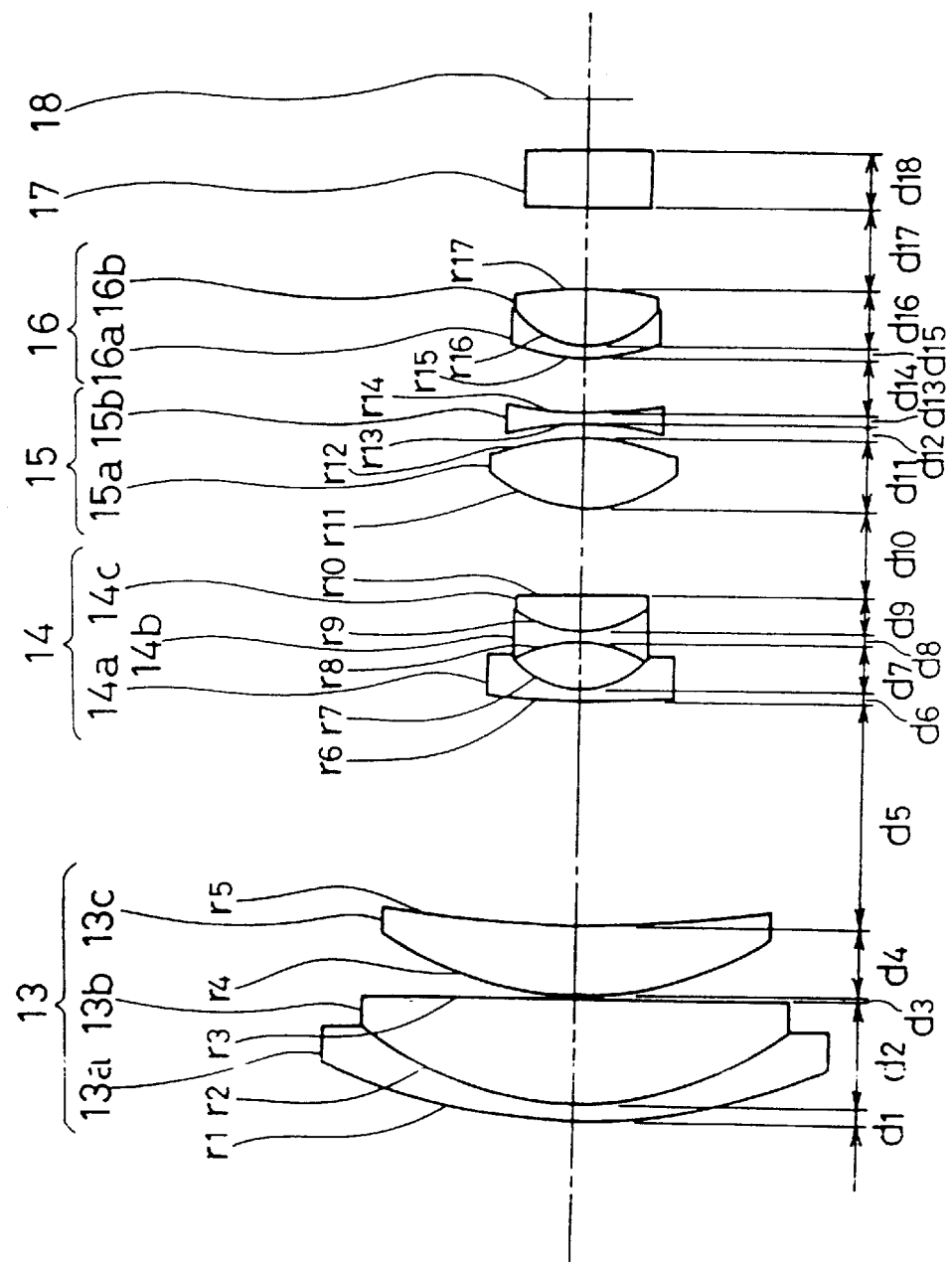
FIG. 3 is a diagram of the zoom lens of the third embodiment of the present invention.

In FIG. 3, ri (i=1 to 17) denotes the curvature of a lens surface, dk (k=1 to 18) the thickness of a lens or a space distance between lenses. It is designed to satisfy the above mentioned formula (1), when fw is defined to be the focal length of the system at the wide angle end, f1 the focal length of the first lens group 13, f2 the focal length of the second lens group 14, and W the angle of view at the wide angle end. The formula (1) relates to the back focus and the angle of view. In the case a figure is smaller than the lower limit, although the angle of view becomes wider, a sufficient back focus can not be obtained. On the other hand, if a figure is greater than the upper limit, although a sufficient back focus can be achieved, a wide angle of view can not be obtained. Further, a focal length fi (i=1 to 4) of the first to fourth lens groups is designed according to the conditions (11) to (14) of the above mentioned formula (8) with fw being the focal length at the wide angle end. The conditions (11), (12), (13), (14) are conditional formulae stipulating the refracting power of each lens group to show the range to provide a strong refracting power to achieve a compact zoom lens and a good aberration property by designing an optimum type of lens and a surface shape of the each lens group.

In the case a figure is smaller than the lower limit of the condition (11), which concerns the refracting power of the first lens group 13, it is difficult to compensate spherical aberration at the long focus end and off-axis coma aberration since the refracting power of the first lens group 13 becomes too large. On the other hand, if a figure is greater than the upper limit, a compact zoom lens cannot be realized since the lens length becomes too long.

In the case a figure is smaller than the lower limit of the condition (12), which concerns the refracting power of the second lens group 14, although a compact zoom lens can be achieved, curvature of field can not be compensated by merely selecting the glass material since the Petzval sum of the entire system becomes significantly negative. On the other hand, if a figure is greater than the upper limit, then the zooming system becomes too long, and downsizing of the entire system cannot be achieved although aberration can be compensated easily.

In the case a figure is smaller than the lower limit of the condition (13), which concerns the refracting power of the third lens group 15, the refracting power of the third lens group 15 becomes too large, a back focus to locate a crystal cannot be obtained, and the compensation of spherical aberration becomes difficult. On the other hand, if a figure is greater than the upper limit, then the first lens group, the second lens group, and the third lens group changes to a diverging system from a complex system, the outside diameter of the lens of the fourth lens group should be larger and, further, the Petzval sum of the entire system cannot be small.

In the case a figure is smaller than the lower limit of the condition (14), which concerns the refracting power of the fourth lens group 16, then the image circle becomes too small and thus the lens system of the first lens group 13 needs to be larger and so a compact and lightweight system cannot be achieved. On the other hand, if a figure is greater than the upper limit, although it is easy to compensate aberration, the moving distance of the fourth lens group 16 in short range operation becomes long and thus a compact system cannot be realized. Additionally it becomes difficult to compensate the imbalance of off-axis aberration for both short range operation and long range operation.

Further, the curvature r13 of the objective side of the lens at the focal plane side of the abovementioned third lens group 15 is determined by condition (15) of the above mentioned formula (8). In the case a figure is smaller than the lower limit of the condition (15) (when a curvature becomes greater), where condition (5) concerns the lens with a negative refracting power located at the objective side 15b comprising the third lens group 15, although the flare at the middle of the wide angle end and the standard angle becomes smaller, a large coma aberration is generated. On the other hand, if a figure is greater than the upper limit, although coma aberration can be decreased, a large flare is generated at the middle of the wide angle end and the standard angle.

(Fourth embodiment)

A fourth embodiment of a zoom lens of the present invention will be described in detail with reference to FIG. 4, a diagram of the zoom lens of the fourth embodiment. The zoom lens of FIG. 4 comprises (aligned from the objective side) a first lens group 19 with a positive refracting power fixed with respect to the focal plane 24, a second lens group 20 with a negative refracting power movable along the optical axis to provide a zooming effect, a third lens group 21 with a positive refracting power fixed with respect to the focal plane 24 to provide a converging effect, a fourth lens group 22 with a positive refracting power movable along the optical axis to keep the focal plane 24 at a certain distance from the reference plane by compensating the position change of the focal plane 24 subsequent to the movement of the second lens group 20 or the movement of the object. Further, a plate 23 equivalent to an optical low-pass filter or a faceplate of an image pick-up device is located between the fourth lens group 22 and the focal plane 24.

The first lens group 19 comprises (aligned from the objective side) a lens 19a with a negative refracting power, a lens 19b with a positive refracting power, and a meniscus lens 19c with a positive refracting power having the convex surface at the objective side. The second lens group 20 comprises (aligned from the objective side) a lens 20a with a negative refracting power, a biconcave lens 20b, and a lens 20c with a positive refracting power, with at least one surface of these lenses aspheric. The third lens group 21 consists of a biconvex single lens 21a with a positive refracting power and with both surfaces being aspheric. This structure of the third lens group 21 is indispensable for compensating aberrations including a flare aberration, despite the largest aperture having an f-number of about 1.4. In particular, the biconvex lens with aspheric shapes on both sides 21a in the third lens group 21, significantly contributes to the compensation of spherical aberration. A fourth lens group 22 comprises (aligned from the objective side) a lens 22a with a negative refracting power having a convex surface at the objective side, a biconvex lens 22b with a positive refracting power with the focal plane side aspheric, lenses 22a and 22b being bonded together, and a biconvex lens 22c with a positive refracting power. This structure provides sufficient back focus and at the same time is effective in compensating longitudinal and off-axis chromatic aberration, and monochromatic off-axis aberration, in particular, coma aberration.

Figure 4:
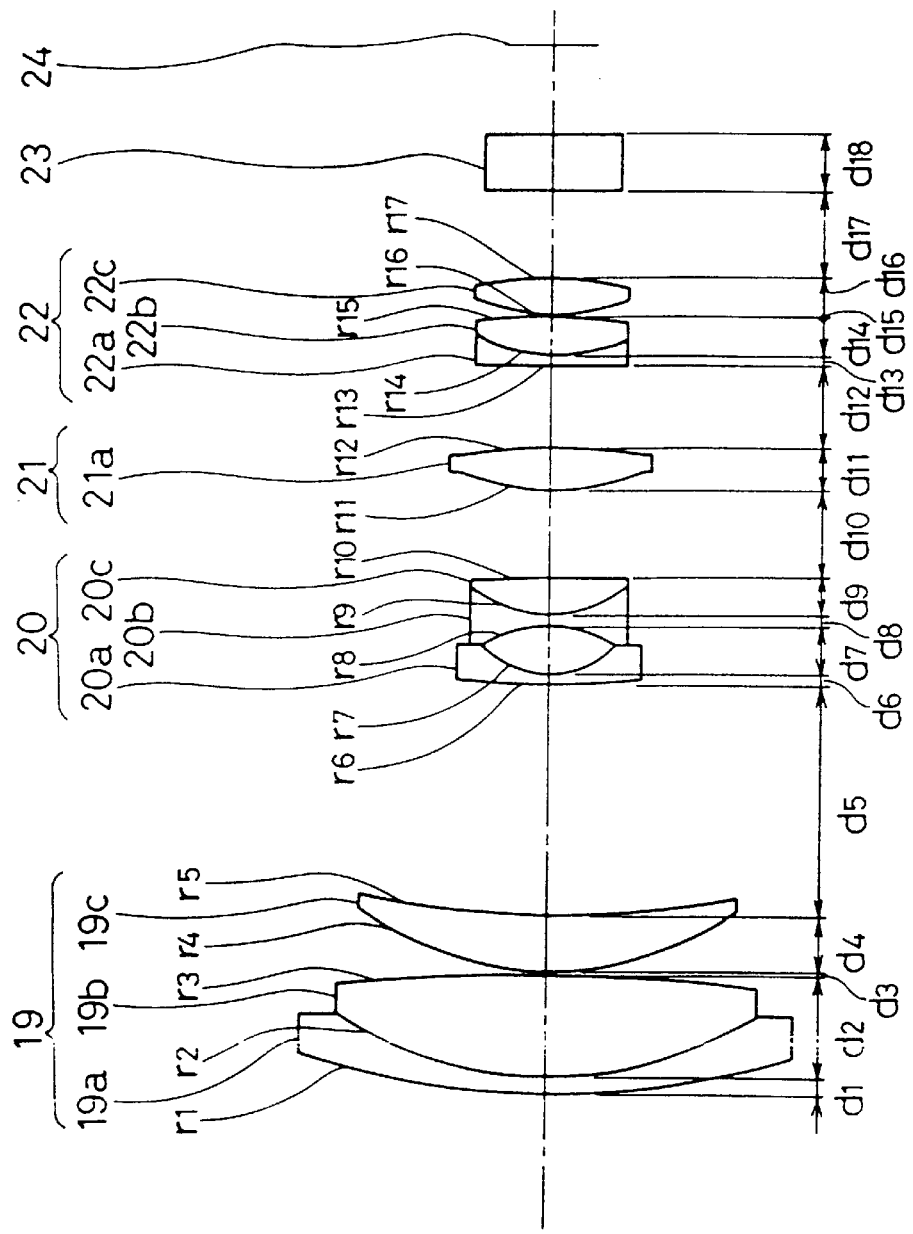
FIG. 4 is a diagram of the zoom lens of the fourth embodiment of the present invention.

In FIG. 4, ri (i=1 to 17) denotes the curvature of a lens surface, dk (k=1 to 18) the thickness of a lens or a space distance between lenses. It is designed to satisfy the above mentioned formula (1), when fw is defined to be the focal length of the system at the wide angle end, f1 the focal length of the first lens group 19, and f2 the focal length of the second lens group 20. The formula (1) relates to the back focus and the angle of view. In the case a figure is smaller than the lower limit, although the angle of view becomes wider, a sufficient back focus cannot be obtained. On the other hand, if a figure is greater than the upper limit, although a sufficient back focus can be achieved, a wide angle of view cannot be obtained. Further, a focal length fi (i=1 to 4) of the first to fourth lens groups is designed according to the conditions of the above mentioned formula (11) with fw being the focal length at the wide angle end. The conditions (16), (17), (18), (19), (20) are conditional formulae stipulating the refracting power of each lens group to show the range to provide a strong refracting power to achieve a compact zoom lens and a good aberration property by designing an optimum type of lens and a surface shape of the each lens group.

In the case a figure is smaller than the lower limit of the condition (16), which concerns the refracting power of the first lens group 19, then the refracting power of the first lens group 19 becomes too large, it is difficult to compensate the spherical aberration at the long focus end and the off-axis coma aberration. On the other hand, if a figure is greater than the upper limit, since the lens length becomes too large, and a compact zoom lens can not be realized.

In the case a figure is smaller than the lower limit of the condition (17), which concerns the refracting power of the second lens group 20, although a compact zoom lens can be achieved, curvature of field cannot be compensated by merely selecting the glass material since the Petzval sum of the entire system becomes significantly negative. On the other hand, if a figure is greater than the upper limit, then the zooming system becomes too long, and downsizing of the entire system cannot be achieved although aberration can be compensated easily.

In the case a figure is smaller than the lower limit of the condition (18), which concerns the refracting power of the third lens group 21, the refracting power of the third lens group 21 becomes too large, a back focus to locate a crystal or the like cannot be obtained, and the compensation of spherical aberration becomes difficult. On the other hand, if a figure is greater than the upper limit, then the first lens group, the second lens group, and the third lens group changes to a diverging system from a complex system, the outside diameter of the lens of the fourth lens group should be larger, and further the Petzval sum of the entire system can not be small.

In the case a figure is smaller than the lower limit of the condition (19), which concerns the refracting power of the fourth lens group 22, then the image circle becomes too small and thus the lens system of the first lens group 19 needs to be larger and so a compact and lightweight system cannot be achieved. On the other hand, if a figure is greater than the upper limit, although it is easy to compensate aberration, the moving distance of the fourth lens group 22 in short range operation becomes long and thus a compact system cannot be realized. Additionally it becomes difficult to compensate the imbalance of off-axis aberration for both short range operation and long range operation.

Further, if a figure is smaller than the lower limit of the condition (20), which concerns the refracting power of the first lens group 19, the second lens group 20, the third lens group 21, and the fourth lens group 22, the lens system becomes too large even though it is effective in terms of compensating the aberration. On the other hand, if a figure is greater than the upper limit, aberration compensation becomes difficult although a compact system can be achieved.

(Concrete numerical example)

A concrete numerical example 1 of the first embodiment illustrated in FIG. 1 is shown in Table 1. In this numerical example 1, the value of $(fw \cdot \tan W)/(f1 \cdot |f2|)^{1/2}$ is set to be 0.209. In Table 1, r denotes the curvature of a lens, d the thickness of a lens or a space distance between lenses, n the refractive index of a lens with respect to the sodium D line, and ν the Abbe constant of a lens with respect to the D line.

TABLE 1

| Group | Surface | r | d | n | ν |
|---|---|---|---|---|---|
| 1 | 1 | 48.971 | 1.20 | 1.84666 | 23.9 |
|   | 2 | 24.189 | 7.30 | 1.62041 | 60.3 |
|   | 3 | −262.000 | 0.20 |   |   |
|   | 4 | 21.621 | 4.30 | 1.69680 | 55.6 |
|   | 5 | 64.086 | changeable |   |   |
| 2 | 6 | 65.769 | 0.80 | 1.77250 | 49.6 |
|   | 7 | 5.836 | 3.35 |   |   |
|   | 8 | −9.174 | 0.80 | 1.66547 | 55.4 |
|   | 9 | 7.072 | 2.50 | 1.80518 | 25.5 |
|   | 10 | ∞ | changeable |   |   |
| 3 | 11 | 8.801 | 4.30 | 1.66547 | 63.5 |
|   | 12 | −20.369 | 1.00 |   |   |
|   | 13 | 29.590 | 0.80 | 1.84666 | 23.9 |
|   | 14 | 8.730 | changeable |   |   |
| 4 | 15 | 11.440 | 4.30 | 1.60602 | 57.8 |
|   | 16 | −8.130 | 0.80 | 1.80518 | 25.5 |
|   | 17 | −16.200 | 0.00 |   |   |
| 5 | 18 | ∞ | 4.0 | 1.51633 | 64.1 |
|   | 19 | ∞ |   |   |   |

Further, an aspheric surface is defined by the following formula (14), $$z = \frac{CY^2}{1 + (1 - (1+K)C^2 Y^2)^{1/2}} + DY^4 + EY^6 + FY^8 + GY^{10} \quad (14)$$

where z is the distance in optical axial direction between a plane including the vertex of the aspherical surface and a plane including a point on the aspherical surface at a height Y from the optical axis;

Y is the height from the optical axis;

C is the curvature of the vertex of the aspherical surface (=1/r);

K is the cone constant; and

D, E, F, G are the aspherical coefficients.

The surfaces 8, 11, 12, 15 shown in FIG. 1 are aspheric, and the aspheric coefficients are listed in Table 2. In Table 2, notations such as "E+00" and "E-04" represent $10^0$ and $10^{-4}$, respectively. The same notation is employed hereinafter.

TABLE 2

| plane | 8 | 11 | 12 | 15 |
|---|---|---|---|---|
| K | 0.00000E+00 | 0.00000E+00 | 0.00000E+00 | 0.00000E+00 |
| D | 2.67714E−05 | −2.08517E−04 | 1.60091E−04 | −1.11041E−04 |
| E | 1.10176E−06 | −1.47207E−06 | −2.12074E−06 | −1.71137E−06 |
| F | −4.88865E−07 | 2.74551E−08 | 7.70408E−08 | 4.77328E−08 |
| G | 7.01752E−09 | −7.22693E−10 | −1.18345E−09 | −1.05368E−09 |

As an example of variation in the air spaces for zooming, figures for a 2 m object distance are shown in Table 3. In Table 3, "Standard" denotes the zooming position where the fourth lens group 4 approaches closest to the third lens group 3. "f", "F/NO" and "W" represent the focal length, the f-number, and the half angle of view of incidence at the wide angle end, the standard position, and the telescopic end, respectively.

TABLE 3

| | wide angle position | standard | telescopic position |
|---|---|---|---|
| f | 4.148 | 26.577 | 55.399 |
| F/NO | 1.47 | 1.70 | 1.87 |
| 2W(°) | 65.7 | 10.6 | 5.2 |
| d5 | 0.7000 | 15.4110 | 18.7254 |
| d10 | 19.0200 | 4.3090 | 0.9946 |
| d14 | 6.8579 | 2.6329 | 5.2998 |
| d17 | 1.9339 | 6.1589 | 3.4920 |

Concrete figures of the above mentioned conditions (1) to (5) of the above mentioned concrete numerical example 1 are described below.
(1) f1/fw=7.597
(2) |f2|/fw=1.259
(3) f3/fw=4.088
(4) f4/fw=3.262
(5) fw/r13=0.140

A concrete numerical example 2 of the first embodiment is shown in Table 4. In this numerical example 2, the value of $(fw \cdot tan\ W)/(f1 \cdot |f2|)^{1/2}$ is set to be 0.182. In Table 4, r denotes the curvature of a lens, d the thickness of a lens or a space distance between lenses, n the refractive index of a lens with respect to the sodium D line, ν the Abbe constant of a lens with respect to the D line.

TABLE 4

| Group | Surface | r | d | n | ν |
|---|---|---|---|---|---|
| 1 | 1 | 56.317 | 1.38 | 1.84666 | 23.9 |
| | 2 | 27.817 | 8.28 | 1.62041 | 60.3 |
| | 3 | −301.300 | 0.23 | | |
| | 4 | 24.864 | 4.95 | 1.69680 | 55.6 |
| | 5 | 73.699 | changeable | | |
| 2 | 6 | 75.634 | 0.92 | 1.77250 | 49.6 |
| | 7 | 6.711 | 3.85 | | |
| | 8 | −10.550 | 0.92 | 1.66547 | 55.4 |
| | 9 | 8.133 | 2.88 | 1.80518 | 25.5 |
| | 10 | ∞ | changeable | | |
| 3 | 11 | 8.685 | 4.26 | 1.66547 | 63.5 |
| | 12 | −19.013 | 1.15 | | |
| | 13 | 27.094 | 0.92 | 1.84666 | 23.9 |
| | 14 | 8.272 | changeable | | |
| 4 | 15 | 11.192 | 4.37 | 1.60602 | 57.8 |
| | 16 | −7.920 | 0.92 | 1.80518 | 25.5 |
| | 17 | −15.790 | 0.00 | | |
| 5 | 18 | ∞ | 4.0 | 1.51633 | 64.1 |
| | 19 | ∞ | | | |

The surfaces 8, 11, 12, 15 shown in FIG. 1 are aspheric, and the aspheric coefficients are listed in Table 5.

TABLE 5

| plane | 8 | 11 | 12 | 15 |
|---|---|---|---|---|
| K | 0.00000E+00 | 0.00000E+00 | 0.00000E+00 | 0.00000E+00 |
| D | 1.76026E−05 | −2.21404E−04 | 1.71017E−04 | −1.18887E−04 |
| E | 5.47769E−07 | −1.72418E−06 | −2.36394E−06 | −1.91761E−06 |
| F | −1.83782E−07 | 2.75784E−08 | 8.95789E−08 | 5.59757E−08 |
| G | 1.99482E−09 | −6.79334E−10 | −1.35203E−09 | −1.29318E−09 |

As an example of variation in the air spaces for zooming, figures for a 2 m object distance are shown in Table 6. In Table 6, "Standard" denotes the zooming position where the fourth lens group 4 approaches closest to the third lens group 3. "f", "F/NO" and "W" represent the focal length, the f-number, and the half angle of view of incidence at the wide angle end, the standard position, and the telescopic end, respectively.

TABLE 6

| | wide angle position | standard | telescopic position |
|---|---|---|---|
| f | 4.161 | 25.528 | 55.932 |
| F/NO | 1.47 | 1.44 | 1.61 |
| 2W(°) | 65.7 | 11.4 | 5.2 |
| d5 | 0.5000 | 17.8110 | 21.5600 |
| d10 | 22.1780 | 4.8670 | 1.1180 |
| d14 | 7.9542 | 4.0352 | 6.2289 |
| d17 | 2.0108 | 5.9298 | 3.7361 |

Concrete figures of the above mentioned conditions (1) to (5) of the above mentioned concrete numerical example 2 are described below.
(1) f1/fw=8.709
(2) |f2|/fw=1.443
(3) f3/fw=3.840
(4) f4/fw=3.190
(5) fw/r13=0.1536

A concrete numerical example 3 of the first embodiment is shown in Table 7. In this numerical example 3, the value of $(fw \cdot tan\ W)/(f1 \cdot |f2|)^{1/2}$ is set to be 0.0228. In Table 7, r denotes the curvature of a lens, d the thickness of a lens or a space distance between lenses, n the refractive index of a lens with respect to the sodium D line, ν the Abbe constant of a lens with respect to the D line.

TABLE 7

| Group | Surface | r | d | n | ν |
|---|---|---|---|---|---|
| 1 | 1 | 41.578 | 1.02 | 1.84666 | 23.9 |
| | 2 | 20.626 | 6.12 | 1.62041 | 60.3 |
| | 3 | −223.882 | 0.17 | | |
| | 4 | 18.394 | 3.66 | 1.69680 | 55.6 |
| | 5 | 54.380 | changeable | | |
| 2 | 6 | 55.904 | 0.68 | 1.77250 | 49.6 |
| | 7 | 4.969 | 2.85 | | |
| | 8 | −7.740 | 0.68 | 1.66547 | 55.4 |
| | 9 | 6.093 | 2.13 | 1.80518 | 25.5 |
| | 10 | ∞ | changeable | | |
| 3 | 11 | 9.028 | 4.08 | 1.66547 | 63.5 |
| | 12 | −20.270 | 0.85 | | |
| | 13 | 30.730 | 0.68 | 1.84666 | 23.9 |
| | 14 | 8.928 | changeable | | |
| 4 | 15 | 11.765 | 4.08 | 1.60602 | 57.8 |
| | 16 | −10.582 | 0.68 | 1.80518 | 25.5 |
| | 17 | −18.304 | 0.00 | | |
| 5 | 18 | ∞ | 4.0 | 1.51633 | 64.1 |
| | 19 | | | | |

The surfaces 8, 11, 12, 15 shown in FIG. 1 are aspheric, and the aspheric coefficients are listed in Table 8.

TABLE 8

| plane | 8 | 11 | 12 | 15 |
|---|---|---|---|---|
| K | 0.00000E + 00 | 0.00000E + 00 | 0.00000E + 00 | 0.00000E + 00 |
| D | 8.38708E − 05 | −2.10403E − 04 | 1.50425E − 04 | −1.03528E − 04 |
| E | 2.65077E − 06 | −1.28276E − 06 | −1.98900E − 06 | −1.59739E − 06 |
| F | −1.12740E − 06 | 1.52747E − 08 | 3.11916E − 08 | −1.65185E − 08 |
| G | −1.45633E − 08 | −6.22476E − 10 | −3.57579E − 10 | 7.01507E − 10 |

As an example of variation in the air spaces for zooming, figures for a 2 m object distance are shown in Table 9. In Table 9, "Standard" denotes the zooming position where the fourth lens group 4 approaches closest to the third lens group 3. "f", "F/NO" and "W" represent the focal length, the f-number, and the half angle of view of incidence at the wide angle end, the standard position, and the telescopic end, respectively.

TABLE 9

|  | wide angle position | standard | telescopic position |
|---|---|---|---|
| f | 4.149 | 29.566 | 56.835 |
| F/NO | 1.49 | 2.09 | 2.27 |
| 2W(°) | 66.3 | 9.4 | 5.0 |
| d5 | 0.5000 | 13.0370 | 15.9165 |
| d10 | 16.2620 | 3.7250 | 0.8455 |
| d14 | 6.5309 | 1.0777 | 4.9235 |
| d17 | 2.0088 | 7.4620 | 3.6162 |

Concrete figures of the above mentioned conditions (6) to (10) of the above mentioned concrete numerical example 3 are described below.

(6) f1/fw=6.457

(7) |f2|/fw=1.069

(8) f3/fw=4.345

(9) f4/fw=3.318

(10) fw/r13=0.135

A concrete numerical example 4 of the second embodiment is shown in Table 10. In this numerical example 4, the value of $(fw \cdot \tan W)/(f1 \cdot |f2|)^{1/2}$ is set to be 0.208. In Table 10, r denotes the curvature of a lens, d the thickness of a lens or a space distance between lenses, n the refractive index of a lens with respect to the sodium D line, ν the Abbe constant of a lens with respect to the D line.

TABLE 10

| Group | Surface | r | d | n | ν |
|---|---|---|---|---|---|
| 1 | 1 | 45.927 | 1.20 | 1.84666 | 23.9 |
|  | 2 | 23.810 | 7.20 | 1.60311 | 60.7 |
|  | 3 | −258.414 | 0.20 |  |  |
|  | 4 | 21.623 | 4.20 | 1.67790 | 55.5 |
|  | 5 | 67.283 | changeable |  |  |
| 2 | 6 | 67.283 | 0.80 | 1.77250 | 49.6 |
|  | 7 | 5.860 | 3.40 |  |  |
|  | 8 | −9.477 | 0.80 | 1.66547 | 55.4 |
|  | 9 | 6.763 | 2.80 | 1.80518 | 25.5 |
|  | 10 | 291.397 | changeable |  |  |
| 3 | 11 | 9.754 | 4.60 | 1.60602 | 57.8 |
|  | 12 | −13.403 | 0.65 |  |  |
|  | 13 | 25.810 | 0.80 | 1.80518 | 25.5 |
|  | 14 | 25.810 | changeable |  |  |
| 4 | 15 | 17.895 | 3.80 | 1.60602 | 57.8 |
|  | 16 | −8.000 | 0.80 | 1.80518 | 25.5 |
|  | 17 | −13.000 | 0.00 |  |  |
| 5 | 18 | ∞ | 4.0 | 1.51633 | 64.1 |
|  | 19 | ∞ |  |  |  |

The surfaces 8, 11, 12, 15 shown in FIG. 2 are aspheric, and the aspheric coefficients are listed in Table 11.

TABLE 11

| plane | 8 | 11 | 12 | 15 |
|---|---|---|---|---|
| K | 0.00000E + 00 | 0.00000E + 00 | 0.00000E + 00 | 0.00000E + 00 |
| D | −3.58204E − 06 | −1.20901E − 04 | 2.27026E − 04 | −1.68009E − 04 |
| E | 4.90455E − 07 | −5.56104E − 07 | −8.78416E − 07 | −1.13387E − 06 |
| F | −3.25453E − 07 | 2.86555E − 08 | 4.07997E − 08 | 2.53391E − 08 |
| G | −3.18054E − 09 | −8.21303E − 10 | −9.77749E − 10 | −8.39088E − 10 |

As an example of variation in the air spaces for zooming, figures for a 2 m object distance are shown in Table 12. In Table 12, "Standard" denotes the zooming position where the fourth lens group 10 approaches closest to the third lens group 9. "f", "F/NO" and "W" represent the focal length, the f-number, and the half angle of view of incidence at the wide angle end, the standard position, and the telescopic end, respectively.

TABLE 12

| | wide angle position | standard | telescopic position |
|---|---|---|---|
| f | 4.146 | 26.945 | 56.015 |
| F/NO | 1.46 | 1.78 | 1.89 |
| 2W(°) | 65.5 | 10.4 | 5.0 |
| d5 | 0.7000 | 15.4150 | 18.7170 |
| d10 | 19.0200 | 4.3050 | 1.0030 |
| d14 | 6.6027 | 2.3611 | 5.0594 |
| d17 | 2.0092 | 6.2506 | 3.5524 |

Concrete figures of the above mentioned conditions (6) to (10) of the above mentioned concrete numerical example 4 are described below.

(6) f1/fw=7.597

(7) |f2|/fw=1.256

(8) f3/fw=4.545

(9) f4/fw=3.571

(10) fw/r13=−0.161

A concrete numerical example 5 of the second embodiment is shown in Table 13. In this numerical example 5, the value of $(fw \cdot \tan W)/(f1 \cdot |f2|)^{1/2}$ is set to be 0.236. In Table 13, r denotes the curvature of a lens, d the thickness of a lens or a space distance between lenses, n the refractive index of a lens with respect to the sodium D line, ν the Abbe constant of a lens with respect to the D line.

TABLE 13

| Group | Surface | r | d | n | ν |
|---|---|---|---|---|---|
| 1 | 1 | 40.435 | 1.06 | 1.84666 | 23.9 |
| | 2 | 20.983 | 6.34 | 1.60311 | 60.7 |
| | 3 | −227.812 | 0.18 | | |
| | 4 | 19.036 | 3.70 | 1.67790 | 55.5 |
| | 5 | 59.296 | changeable | | |
| 2 | 6 | 59.296 | 0.70 | 1.77250 | 49.6 |
| | 7 | 5.156 | 2.99 | | |
| | 8 | −8.359 | 0.70 | 1.66547 | 55.4 |
| | 9 | 5.997 | 2.46 | 1.80518 | 25.5 |
| | 10 | 258.586 | changeable | | |
| 3 | 11 | 9.895 | 4.66 | 1.60602 | 57.8 |
| | 12 | −13.544 | 0.65 | | |
| | 13 | −26.963 | 0.81 | 1.80518 | 25.5 |
| | 14 | 25.377 | changeable | | |
| 4 | 15 | 18.055 | 3.85 | 1.60602 | 57.8 |
| | 16 | −8.024 | 0.80 | 1.80518 | 25.5 |
| | 17 | −13.000 | 0.00 | | |
| 5 | 18 | ∞ | 4.0 | 1.51633 | 64.1 |
| | 19 | ∞ | | | |

The surfaces 8, 11, 12, 15 shown in FIG. 2 are aspheric, and the aspheric coefficients are listed in Table 14.

TABLE 14

| plane | 8 | 11 | 12 | 15 |
|---|---|---|---|---|
| K | 0.00000E+00 | 0.00000E+00 | 0.00000E+0 | 0.00000E+00 |
| D | −1.90420E-07 | −1.20782E-04 | 2.19297E-04 | −1.62103E-04 |
| E | 7.66113E-07 | −5.16082E-07 | −7.29344E-07 | −1.06822E-06 |
| F | −2.080408E-08 | 3.06316E-08 | 3.53560E-08 | 2.42880E-08 |
| G | −6.34545E-08 | −8.09722E-10 | −8.18661E-10 | −7.53673E-10 |

As an example of variation in the air spaces for zooming, figures for a 2 m object distance are shown in Table 15. In Table 15, "Standard" denotes the zooming position where the fourth lens group 10 approaches closest to the third lens group 9. "f", "F/NO" and "W" represent the focal length, the f-number, and the half angle of view of incidence at the wide angle end, the standard position, and the telescopic end, respectively.

TABLE 15

| | wide angle position | standard | telescopic position |
|---|---|---|---|
| f | 4.174 | 28.556 | 56.916 |
| F/NO | 1.47 | 1.95 | 2.22 |
| 2W(°) | 64.6 | 9.9 | 5.0 |
| d5 | 0.6000 | 13.5020 | 16.4710 |
| d10 | 16.7556 | 3.8536 | 0.8846 |
| d14 | 5.8160 | 0.7206 | 4.2555 |
| d17 | 2.0090 | 7.1044 | 3.5695 |

Concrete figures of the above mentioned conditions (6) to (10) of the above mentioned concrete numerical example 5 are described below.

(6) f1/fw=6.641

(7) |f2|/fw=1.098

(8) f3/fw=4.571

(9) f4/fw=3.608

(10) fw/r13=−0.154

A concrete numerical example 6 of the second embodiment is shown in Table 16. In this numerical example 6, the value of $(fw \cdot \tan W)/(f1 \cdot |f2|)^{1/2}$ is set to be 0.168. In Table 16, r denotes the curvature of a lens, d the thickness of a lens or a space distance between lenses, n the refractive index of a lens with respect to the sodium D line, ν the Abbe constant of a lens with respect to the D line.

TABLE 16

| Group | Surface | r | d | n | ν |
|---|---|---|---|---|---|
| 1 | 1 | 57.356 | 1.50 | 1.84666 | 23.9 |
| | 2 | 29.666 | 9.00 | 1.60311 | 60.7 |
| | 3 | −325.613 | 0.25 | | |
| | 4 | 27.006 | 5.25 | 1.67790 | 55.5 |
| | 5 | 84.223 | changeable | | |
| 2 | 6 | 84.223 | 1.00 | 1.77250 | 49.6 |
| | 7 | 7.324 | 4.25 | | |
| | 8 | −11.842 | 1.00 | 1.66547 | 55.4 |
| | 9 | 8.418 | 3.50 | 1.80518 | 25.5 |
| | 10 | 358.315 | changeable | | |
| 3 | 11 | 9.380 | 4.63 | 1.60602 | 57.8 |
| | 12 | −12.936 | 0.88 | | |
| | 13 | −27.143 | 0.88 | 1.80518 | 25.5 |
| | 14 | 23.067 | changeable | | |
| 4 | 15 | 17.011 | 4.00 | 1.60602 | 57.8 |
| | 16 | −7.236 | 0.88 | 1.80518 | 25.5 |
| | 17 | −12.235 | 0.00 | | |
| 5 | 18 | ∞ | 4.0 | 1.51633 | 64.1 |
| | 19 | ∞ | | | |

The surfaces 8, 11, 12, 15 shown in FIG. 2 are aspheric, and the aspheric coefficients are listed in Table 17.

TABLE 17

| plane | 8 | 11 | 12 | 15 |
|---|---|---|---|---|
| K | 0.00000E+00 | 0.00000E+00 | 0.00000E+0 | 0.00000E+00 |
| D | −2.27425E−06 | −1.31558E−04 | 2.57561E−04 | −1.93240E−04 |
| E | 2.61039E−07 | −8.26093E−07 | −1.25429E−06 | −1.33396E−06 |
| F | −1.12618E−07 | 3.09874E−08 | 9.21017E−08 | 9.29033E−08 |
| G | 8.34883E−10 | −1.31465E−11 | −1.15056E−09 | −3.91206E−09 |

As an example of variation in the air spaces for zooming, figures for a 2 m object distance are shown in Table 18. In Table 18, "Standard" denotes the zooming position where the fourth lens group 10 approaches closest to the third lens group 9. "f", "F/NO" and "W" represent the focal length, the f-number, and the half angle of view of incidence at the wide angle end, the standard position, and the telescopic end, respectively.

TABLE 18

| | wide angle position | standard | telescopic position |
|---|---|---|---|
| f | 4.167 | 25.475 | 56.250 |
| F/NO | 1.45 | 1.43 | 1.70 |
| 2W(°) | 65.5 | 11.0 | 5.3 |
| d5 | 0.600 | 19.4150 | 23.4200 |
| d10 | 24.0500 | 5.2350 | 1.2300 |
| d14 | 8.3053 | 4.6678 | 6.6035 |
| d17 | 2.0108 | 5.6483 | 3.7126 |

Concrete figures of the above mentioned conditions (6) to (10) of the above mentioned concrete numerical example 6 are described below.

(6) $f1/fw=9.449$ (7) $|f2|/fw=1.563$ (8) $f3/fw=4.184$ (9) $f4/fw=3.420$

(10) $fw/r13=-0.154$

A concrete numerical example 7 of the third embodiment is shown in Table 19. In this numerical example 7, the value of $(fw \cdot \tan W)/(f1 \cdot |f2|)^{1/2}$ is set to be 0.206. In Table 19, r denotes the curvature of a lens, d the thickness of a lens or a space distance between lenses, n the refractive index of a lens with respect to the sodium Dline, ν the Abbe constant of a lens with respect to the D line.

TABLE 19

| Group | Surface | r | d | n | ν |
|---|---|---|---|---|---|
| 1 | 1 | 39.354 | 1.20 | 1.84666 | 23.9 |
| | 2 | 22.208 | 7.18 | 1.60311 | 60.7 |
| | 3 | 1417.369 | 0.20 | | |
| | 4 | 22.548 | 4.88 | 1.67790 | 55.5 |
| | 5 | 76.322 | changeable | | |
| 2 | 6 | 76.322 | 0.80 | 1.77250 | 49.6 |
| | 7 | 5.620 | 3.22 | | |
| | 8 | −8.885 | 0.80 | 1.66547 | 55.4 |
| | 9 | 7.056 | 2.49 | 1.78472 | 25.7 |
| | 10 | −96.715 | changeable | | |
| 3 | 11 | 9.188 | 4.92 | 1.60602 | 57.8 |
| | 12 | −11.671 | 0.95 | | |
| | 13 | −17.818 | 0.80 | 1.80518 | 25.5 |
| | 14 | 26.042 | changeable | | |
| 4 | 15 | 12.591 | 0.80 | 1.68906 | 34.0 |
| | 16 | 5.174 | 3.93 | 1.66547 | 55.4 |
| | 17 | −22.970 | 0.00 | | |
| 5 | 18 | ∞ | 4.0 | 1.51633 | 64.1 |
| | 19 | ∞ | | | |

The surfaces 8, 11, 12, 15, 17 shown in FIG. 3 are aspheric, and the aspheric coefficients are listed in Table 20.

TABLE 20

| plane | 8 | 11 | 12 | 15 | 17 |
|---|---|---|---|---|---|
| K | 0.00000E + 00 | 0.00000E + 00 | 0.00000E + 00 | 0.00000E + 00 | 0.00000E + 00 |
| D | 4.07743E − 05 | −1.13492E − 04 | 3.30354E − 04 | −3.38462E − 05 | 1.50338E − 04 |
| E | −1.75215E − 07 | −6.16718E − 08 | −1.21222E − 07 | 8.35196E − 07 | 2.63736E − 06 |
| F | −2.59908E − 07 | −5.11408E − 09 | 5.56820E − 09 | 3.13446E − 08 | −1.08798E − 07 |
| G | −2.65678E − 08 | 6.51619E − 10 | 6.59348E − 10 | −4.56078E − 09 | −4.42470E − 09 |

As an example of variation in the air spaces for zooming, figures for a 2 m object distance are shown in Table 21. In Table 21, "Standard" denotes the zooming position where the fourth lens group 16 approaches closest to the third lens group 15. "f", "F/NO" and "W" represent the focal length, the f-number, and the half angle of view of incidence at the wide angle end, the standard position, and the telescopic end, respectively.

TABLE 21

| | wide angle position | standard | telescopic position |
|---|---|---|---|
| f | 4.141 | 25.950 | 55.890 |
| F/NO | 1.44 | 1.57 | 1.84 |
| 2W(°) | 65.7 | 10.8 | 5.1 |
| d5 | 0.7000 | 15.4150 | 18.7170 |
| d10 | 19.0200 | 4.3050 | 1.0030 |
| d14 | 6.1891 | 2.2929 | 4.7462 |
| d17 | 1.5015 | 5.3978 | 2.9445 |

Concrete figures of the above mentioned conditions (11) to (15) of the above mentioned concrete numerical example 7 are described below.

(11) $f1/fw=7.759$

(12) |f2|/fw=1.260

(13) f3/fw=4.355

(14) f4/fw=3.217

(15) fw/r13=−0.232

A concrete numerical example 8 of the third embodiment is shown in Table 22. In this numerical example 8, the value of $(fw \cdot tan W)/(f1 \cdot |f2|)^{1/2}$ is set to be 0.246. In Table 22, r denotes the curvature of a lens, d the thickness of a lens or a space distance between lenses, n the refractive index of a lens with respect to the sodium D line, ν the Abbe constant of a lens with respect to the D line.

TABLE 22

| Group | Surface | r | d | n | ν |
|---|---|---|---|---|---|
| 1 | 1 | 35.859 | 1.01 | 1.84666 | 23.9 |
|   | 2 | 19.913 | 6.02 | 1.60311 | 60.7 |
|   | 3 | −482.468 | 0.17 |   |   |
|   | 4 | 18.411 | 4.10 | 1.67790 | 55.5 |
|   | 5 | 54.222 | changeable |   |   |
| 2 | 6 | 54.222 | 0.67 | 1.77250 | 49.6 |
|   | 7 | 4.827 | 2.71 |   |   |
|   | 8 | −6.709 | 0.67 | 1.66547 | 55.4 |
|   | 9 | 6.889 | 2.09 | 1.78472 | 25.7 |
|   | 10 | −49.725 | changeable |   |   |
| 3 | 11 | 9.194 | 4.95 | 1.60602 | 57.8 |
|   | 12 | −13.254 | 0.96 |   |   |
|   | 13 | −27.196 | 0.81 | 1.80518 | 25.5 |
|   | 14 | 20.037 | changeable |   |   |
| 4 | 15 | 12.682 | 0.81 | 1.68906 | 34.0 |
|   | 16 | 4.969 | 3.96 | 1.66547 | 55.4 |
|   | 17 | −22.977 | 0.00 |   |   |
| 5 | 18 | ∞ | 4.0 | 1.51633 | 64.1 |
|   | 19 | ∞ |   |   |   |

The surfaces 8, 11, 12, 15, 17 shown in FIG. 3 are aspheric, and the aspheric coefficients are listed in Table 23.

TABLE 23

| plane | 8 | 11 | 12 | 15 | 17 |
|---|---|---|---|---|---|
| K | 0.00000E + 00 | 0.00000E + 00 | 0.00000E + 00 | 0.00000E + 00 | 0.00000E + 00 |
| D | 1.81109E − 04 | −1.23065E − 04 | 3.10354E − 04 | −4.09907E − 05 | 1.21742E − 04 |
| E | 1.12376E − 05 | −3.39874E − 08 | −5.20922E − 07 | 6.13308E − 07 | 2.66474E − 06 |
| F | −3.45824E − 06 | 1.20972E − 08 | 6.08821E − 09 | 3.05964E − 08 | −2.45049E − 08 |
| G | 1.97842E − 07 | −3.72755E − 10 | −1.01292E − 11 | −2.36702E − 09 | −3.57229E − 09 |

As an example of variation in the air spaces for zooming, figures for a 2 m object distance are shown in Table 24. In Table 24, "Standard" denotes the zooming position where the fourth lens group 16 approaches closest to the third lens group 15. "f", "F/NO" and "W" represent the focal length, the f-number, and the half angle of view of incidence at the wide angle end, the standard position, and the telescopic end, respectively.

TABLE 24

|   | wide angle position | standard | telescopic position |
|---|---|---|---|
| f | 4.155 | 25.693 | 56.652 |
| F/NO | 1.43 | 1.95 | 2.28 |
| 2W(°) | 65.5 | 11.0 | 5.0 |
| d5 | 0.6000 | 12.4940 | 15.7222 |
| d10 | 15.9648 | 4.0708 | 0.8426 |

TABLE 24-continued

|   | wide angle position | standard | telescopic position |
|---|---|---|---|
| d14 | 5.1951 | 0.2959 | 3.7680 |
| d17 | 2.0038 | 5.9030 | 3.4309 |

Concrete figures of the above mentioned conditions (11) to (15) of the above mentioned concrete numerical example 8 are described below.

(11) f1/fw=6.493

(12) |f2|/fw=1.055

(13) f3/fw=4.372

(14) f4/fw=3.230

(10) fw/r13=−0.152

A concrete numerical example 9 of the third embodiment is shown in Table 25. In this numerical example 9, the value of $(fw \cdot tan W)/(f1 \cdot |f2|)^{1/2}$ is set to be 0.167. In Table 25, r denotes the curvature of a lens, d the thickness of a lens or a space distance between lenses, n the refractive index of a lens with respect to the sodium D line, ν the Abbe constant of a lens with respect to the D line.

TABLE 25

| Group | Surface | r | d | n | ν |
|---|---|---|---|---|---|
| 1 | 1 | 49.193 | 1.50 | 1.84666 | 23.9 |
|   | 2 | 27.751 | 8.96 | 1.60311 | 60.7 |
|   | 3 | 1778.757 | 0.25 |   |   |

TABLE 25-continued

| Group | Surface | r | d | n | ν |
|---|---|---|---|---|---|
|   | 4 | 28.185 | 6.10 | 1.67790 | 55.5 |
|   | 5 | 95.435 | changeable |   |   |
| 2 | 6 | 95.435 | 1.00 | 1.77250 | 49.6 |
|   | 7 | 7.026 | 4.03 |   |   |
|   | 8 | −11.077 | 1.00 | 1.66547 | 55.4 |
|   | 9 | 8.728 | 3.11 | 1.78472 | 25.7 |
|   | 10 | −121.143 | changeable |   |   |
| 3 | 11 | 8.868 | 4.70 | 1.60602 | 57.8 |
|   | 12 | −10.868 | 0.91 |   |   |
|   | 13 | −18.659 | 0.77 | 1.80518 | 25.5 |
|   | 14 | 21.448 | changeable |   |   |
| 4 | 15 | 12.051 | 0.77 | 1.68906 | 34.0 |
|   | 16 | 5.047 | 3.76 | 1.66547 | 55.4 |
|   | 17 | −21.907 | 0.00 |   |   |
| 5 | 18 | ∞ | 4.0 | 1.51633 | 64.1 |
|   | 19 | ∞ |   |   |   |

The surfaces 8, 11, 15, 17 shown in FIG. 3 are aspheric, and the aspheric coefficients are listed in Table 26.

TABLE 26

| plane | 8 | 11 | 12 | 15 | 17 |
|---|---|---|---|---|---|
| K | 0.00000E + 00 | 0.00000E + 00 | 0.00000E + 00 | 0.00000E + 00 | 0.000000E + 00 |
| D | 1.18368E − 05 | −1.22702E − 04 | 4.04043E − 04 | −3.60681E − 06 | 2.83896E − 04 |
| E | 2.45702E − 07 | −4.36853E − 07 | −9.97199E − 07 | 1.25947E − 06 | 1.50898E − 06 |
| F | −1.42958E − 06 | −4.60927E − 08 | 1.79657E − 09 | −1.65609E − 07 | −1.10458E − 06 |
| G | 4.11939E − 08 | 1.31219E − 09 | −2.10906E − 12 | 1.48929E − 09 | 4.43225E − 08 |

As an example of variation in the air spaces for zooming, figures for a 2 m object distance are shown in Table 27. In Table 27, "Standard" denotes the zooming position where the fourth lens group 16 approaches closest to the third lens group 15. "f", "F/NO" and "W" represent the focal length, the f-number, and the half angle of view of incidence at the wide angle end, the standard position, and the telescopic end, respectively.

TABLE 27

|  | wide angle position | standard | telescopic position |
|---|---|---|---|
| f | 4.125 | 24.620 | 55.213 |
| F/NO | 1.45 | 1.40 | 1.62 |
| 2W(°) | 66.5 | 11.4 | 5.3 |
| d5 | 0.7000 | 19.4170 | 23.4000 |
| d10 | 23.9500 | 5.2330 | 1.2500 |
| d14 | 7.7661 | 4.5328 | 6.2163 |
| d17 | 2.0104 | 5.2437 | 2.5602 |

Concrete figures of the above mentioned conditions (11) to (15) of the above mentioned concrete numerical example 9 are described below.

(11) f1/fw=9.737

(12) |f2|/fw=1.581

(13) f3/fw=4.181

(14) f4/fw=3.084

(15) fw/r13=−0.221

A concrete numerical example 10 of the fourth embodiment is shown in Table 28. In this numerical example 10, the value of $(fw \cdot \tan W)/(f1 \cdot |f2|)^{1/2}$ is set to be 0.198. In Table 28, r denotes the curvature of a lens, d the thickness of a lens or a space distance between lenses, n the refractive index of a lens with respect to the sodium D line, v the Abbe constant of a lens with respect to the D line.

TABLE 28

| Group | Surface | r | d | n | v |
|---|---|---|---|---|---|
| 1 | 1 | 54.610 | 1.20 | 1.84666 | 23.9 |
|  | 2 | 25.960 | 7.30 | 1.60311 | 60.7 |
|  | 3 | −142.000 | 0.20 |  |  |
|  | 4 | 21.490 | 3.95 | 1.67790 | 55.5 |
|  | 5 | 58.338 | changeable |  |  |
| 2 | 6 | 58.338 | 0.70 | 1.77250 | 49.6 |
|  | 7 | 6.000 | 3.39 |  |  |
|  | 8 | −8.642 | 0.80 | 1.66547 | 55.4 |
|  | 9 | 8.000 | 2.60 | 1.80518 | 25.5 |
|  | 10 | −85.700 | changeable |  |  |
| 3 | 11 | 13.702 | 3.00 | 1.51450 | 63.5 |
|  | 12 | −43.933 | changeable |  |  |
| 4 | 13 | 137.583 | 0.80 | 1.84666 | 23.9 |
|  | 14 | 10.422 | 2.80 | 1.60602 | 57.8 |
|  | 15 | −46.478 | 0.15 |  |  |
|  | 16 | 13.715 | 2.60 | 1.56883 | 56.0 |
|  | 17 | −25.250 | changeable |  |  |
| 5 | 18 | ∞ | 4.0 | 1.51633 | 64.1 |
|  | 19 | ∞ |  |  |  |

The surfaces 8, 11, 12, 15 shown in FIG. 4 are aspheric, and the aspheric coefficients are listed in Table 29.

TABLE 29

| plane | 8 | 11 | 12 | 15 |
|---|---|---|---|---|
| K | 2.44209E − 01 | −2.94965E − 02 | −7.06772E + 01 | 5.00685E + 00 |
| D | 9.09600E − 05 | −8.84486E − 05 | −8.47419E − 05 | 8.59675E − 05 |
| E | 3.54726E − 06 | −2.01845E − 07 | 1.51914E − 06 | 3.78258E − 07 |
| F | −6.27173E − 07 | 1.11591E − 08 | −3.20919E − 08 | 4.82992E − 10 |
| G | 1.82732E − 08 | −1.53242E − 09 | −1.00434E − 09 | 1.52705E − 10 |

As an example of variation in the air spaces for zooming, figures for a 2 m object distance are shown in Table 30. In Table 30, "Standard" denotes the zooming position where the fourth lens group 22 approaches closest to the third lens group 21. "f", "F/NO" and "W" represent the focal length, the f-number, and the half angle of view of incidence at the wide angle end, the standard position, and the telescopic end, respectively.

TABLE 30

|       | wide angle position | standard | telescopic position |
|-------|---------------------|----------|---------------------|
| f     | 4.151               | 25.672   | 55.850              |
| F/NO  | 1.46                | 1.75     | 1.77                |
| 2W(°) | 65.6                | 11.0     | 5.1                 |
| d5    | 0.7000              | 16.4576  | 20.0032             |
| d10   | 20.3430             | 4.5854   | 1.0398              |
| d12   | 9.7584              | 6.6846   | 8.2186              |
| d17   | 2.0090              | 6.0827   | 3.5488              |

Concrete figures of the above mentioned conditions (16) to (20) of the above mentioned concrete numerical example 10 are described below.

(16) f1/fw=7.892

(17) |f2|/fw=1.348

(18) f3/fw=4.979

(19) f4/fw=3.963

(20) (f1·f2)/(f3·f4)=−0.539

A concrete numerical example 11 of the fourth embodiment is shown in Table 31. In this numerical example 11, the value of $(fw \cdot \tan W)/(f1 \cdot |f2|)^{1/2}$ is set to be 0.267. In Table 31, r denotes the curvature of a lens, d the thickness of a lens or a space distance between lenses, n the refractive index of a lens with respect to the sodium D line, ν the Abbe constant of a lens with respect to the D line.

TABLE 31

| Group | Surface | r        | d         | n       | ν    |
|-------|---------|----------|-----------|---------|------|
| 1     | 1       | 39.484   | 0.91      | 1.84666 | 23.9 |
|       | 2       | 20.064   | 5.55      | 1.60311 | 60.7 |
|       | 3       | −131.480 | 0.15      |         |      |
|       | 4       | 17.060   | 3.00      | 1.67790 | 55.5 |
|       | 5       | 50.486   | changeable|         |      |
| 2     | 6       | −224.520 | 0.53      | 1.77250 | 49.6 |
|       | 7       | 4.979    | 2.58      |         |      |
|       | 8       | −8.294   | 0.61      | 1.66547 | 55.4 |
|       | 9       | 6.302    | 1.98      | 1.80518 | 25.5 |
|       | 10      | −432.488 | changeable|         |      |
| 3     | 11      | 13.922   | 3.01      | 1.51450 | 63.5 |
|       | 12      | −42.324  | changeable|         |      |
| 4     | 13      | 71.364   | 0.80      | 1.84666 | 23.9 |
|       | 14      | 10.090   | 2.81      | 1.60602 | 57.8 |
|       | 15      | −49.081  | 0.15      |         |      |
|       | 16      | 18.189   | 2.61      | 1.56883 | 56.0 |
|       | 17      | −19.470  | changeable|         |      |
| 5     | 18      | ∞        | 4.0       | 1.51633 | 64.1 |
|       | 19      | ∞        |           |         |      |

The surfaces 8, 11, 12, 15 shown in FIG. 4 are aspheric, and the aspheric coefficients are listed in Table 32.

TABLE 32

| plane | 8             | 11            | 12            | 15            |
|-------|---------------|---------------|---------------|---------------|
| K     | 2.44209E − 01 | −2.94965E − 02| −7.06772E + 01| 5.00685E + 00 |
| D     | 1.75511E − 04 | 3.29845E − 05 | 7.09332E − 05 | 5.42862E − 05 |
| E     | 1.78801E − 05 | −4.88910E − 06| −1.35957E − 06| 5.70900E − 07 |
| F     | −9.48568E − 07| −4.11353E − 09| −1.79517E − 07| 1.47570E − 08 |
| G     | 2.69300E − 08 | −3.82484E − 09| −5.02951E − 10| −3.75976E − 11|

As an example of variation in the air spaces for zooming, figures for a 2 m object distance are shown in Table 33. In Table 33, "Standard" denotes the zooming position where the fourth lens group 22 approaches closest to the third lens group 21. "f", "F/NO" and "W" represent the focal length, the f-number, and the half angle of view of incidence at the wide angle end, the standard position, and the telescopic end, respectively.

TABLE 33

|       | wide angle position | standard | telescopic position |
|-------|---------------------|----------|---------------------|
| f     | 4.155               | 38.097   | 56.757              |
| F/NO  | 1.46                | 2.17     | 2.39                |
| 2W(°) | 67.0                | 10.1     | 5.1                 |
| d5    | 0.6000              | 12.4060  | 15.2300             |
| d10   | 15.3926             | 3.5866   | 0.7626              |
| d12   | 7.3916              | 1.7273   | 6.0054              |
| d17   | 2.0088              | 7.6731   | 3.3950              |

Concrete figures of the above mentioned conditions (16) to (20) of the above mentioned concrete numerical example 11 are described below.

(16) f1/fw=5.509

(17) |f2|/fw=1.024

(18) f3/fw=4.992

(19) f4/fw=3.977

(20) (f1·f2)/(f3·f4)=−0.309

A concrete numerical example 12 of the fourth embodiment is shown in Table 34. In this numerical example 12, the value of $(fw \cdot \tan W)/(f1 \cdot |f2|)^{1/2}$ is set to be 0.181. In Table 34, r denotes the curvature of a lens, d the thickness of a lens or a space distance between lenses, n the refractive index of a lens with respect to the sodium D line, ν the Abbe constant of a lens with respect to the D line.

TABLE 34

| Group | Surface | r        | d         | n       | ν    |
|-------|---------|----------|-----------|---------|------|
| 1     | 1       | 60.071   | 1.32      | 1.84666 | 23.9 |
|       | 2       | 28.556   | 8.03      | 1.60311 | 60.7 |
|       | 3       | −156.200 | 0.22      |         |      |
|       | 4       | 23.639   | 4.35      | 1.67790 | 55.5 |
|       | 5       | 64.172   | changeable|         |      |
| 2     | 6       | 64.172   | 0.77      | 1.77250 | 49.6 |
|       | 7       | 6.600    | 3.73      |         |      |
|       | 8       | −9.506   | 0.88      | 1.66547 | 55.4 |
|       | 9       | 8.800    | 2.86      | 1.80518 | 25.5 |
|       | 10      | −94.270  | changeable|         |      |
| 3     | 11      | 13.417   | 2.97      | 1.51450 | 63.5 |
|       | 12      | −45.005  | changeable|         |      |

TABLE 34-continued

| Group | Surface | r | d | n | ν |
|---|---|---|---|---|---|
| 4 | 13 | 226.316 | 0.79 | 1.84666 | 23.9 |
|  | 14 | 10.181 | 2.77 | 1.60602 | 57.8 |
|  | 15 | −43.189 | 0.15 |  |  |
|  | 16 | 12.201 | 2.57 | 1.56883 | 56.0 |
|  | 17 | −29.382 | changeable |  |  |
| 5 | 18 | ∞ | 4.0 | 1.51633 | 64.1 |
|  | 19 | ∞ |  |  |  |

The surfaces 8, 11, 12, 15 shown in FIG. 4 are aspheric, and the aspheric coefficients are listed in Table 35.

TABLE 35

| plane | 8 | 11 | 12 | 15 |
|---|---|---|---|---|
| K | 2.44209E−01 | −2.94965E−02 | −7.06772E+01 | 5.00685E+00 |
| D | 6.83396E−05 | −7.49639E−05 | −6.98136E−05 | 8.69136E−05 |
| E | 2.20257E−06 | 1.79927E−07 | 1.77128E−06 | 3.99400E−07 |
| F | −3.21839E−07 | 2.17868E−08 | −6.77553E−09 | 2.58310E−08 |
| G | 7.74963E−09 | −8.97526E−09 | −6.97157E−10 | −7.19329E−10 |

As an example of variation in the air spaces for zooming, figures for a 2 m object distance are shown in Table 36. In Table 36, "Standard" denotes the zooming position where the fourth lens group 22 approaches closest to the third lens group 21. "f", "F/NO" and "W" represent the focal length, the f-number, and the half angle of view of incidence at the wide angle end, the standard position, and the telescopic end, respectively.

TABLE 36

|  | wide angle position | standard | telescopic position |
|---|---|---|---|
| f | 4.143 | 25.381 | 55.974 |
| F/NO | 1.47 | 1.48 | 1.78 |
| 2W(°) | 66.1 | 11.3 | 5.2 |
| d5 | 0.6000 | 18.1630 | 22.0000 |
| d10 | 22.5473 | 4.9843 | 1.1473 |
| d12 | 10.7680 | 6.9534 | 9.1475 |
| d17 | 2.0097 | 5.8243 | 3.6302 |

Concrete figures of the above mentioned conditions (16) to (20) of the above mentioned concrete numerical example 12 are described below.

(16) f1/fw=8.697

(17) |f2|/fw=1.486

(18) f3/fw=4.934

(19) f4/fw=3.927

(20) (f1·f2)/(f3·f4)=−0.667

FIGS. 5, 6, and 7 illustrate aberration properties of the zoom lens of the concrete numerical example 1 in the first embodiment as shown in Table 1 at the wide angle position, the standard position and the telescopic position, respectively. FIGS. 8, 9, and 10 illustrate aberration properties of the zoom lens of the concrete numerical example 2 in the first embodiment as shown in Table 4 at the wide angle position, the standard position and the telescopic position, respectively. Further, FIGS. 11, 12, and 13 illustrate aberration properties of the zoom lens of the concrete numerical example 3 in the first embodiment as shown in Table 7 at the wide angle position, the standard position and the telescopic position, respectively.

Similarly, FIGS. 14, 15, and 16 illustrate aberration properties of the zoom lens of the concrete numerical example 4 in the second embodiment as shown in Table 10 at the wide angle end, the standard position and the telescopic end, respectively. FIGS. 17, 18, and 19 illustrate aberration properties of the zoom lens of the concrete numerical example 6 in the second embodiment as shown in Table 13 at the wide angle end, the standard position and the telescopic end, respectively. Further, FIGS. 20, 21, and 22 illustrate aberration properties of the zoom lens of the concrete numerical example 6 in the second embodiment as shown in Table 16 at the wide angle end, the standard position and the telescopic end, respectively.

Similarly, FIGS. 23, 24, and 25 illustrate aberration properties of the zoom lens of the concrete numerical example 7 in the third embodiment as shown in Table 19 at the wide angle position, the standard position and the telescopic position, respectively. FIGS. 26, 27, and 28 illustrate aberration properties of the zoom lens of the concrete numerical example 8 in the third embodiment as shown in Table 22 at the wide angle position, the standard position and the telescopic position, respectively. Further, FIGS. 29, 30, and 31 illustrate aberration properties of the zoom lens of the concrete numerical example 9 in the third embodiment as shown in Table 25 at the wide angle position, the standard position and the telescopic position, respectively.

Similarly, FIGS. 32, 33, and 34 illustrate aberration properties of the zoom lens of the concrete numerical example 10 in the fourth embodiment as shown in Table 28 at the wide angle position, the standard position and the telescopic position, respectively. FIGS. 35, 36, and 37 illustrate aberration properties of the zoom lens of the concrete numerical example 11 in the fourth embodiment as shown in Table 31 at the wide angle position, the standard position and the telescopic position, respectively. Further, FIGS. 38, 39, and 40 illustrate aberration properties of the zoom lens of the concrete numerical example 12 in the fourth embodiment as shown in Table 34 at the wide angle position, the standard position and the telescopic position, respectively.

In each of the above mentioned drawings, (a) illustrates spherical aberration, where the solid line denotes a value with respect to the sodium D line, and the dotted line describes the sine condition. (b) illustrates astigmatism, where the solid line denotes the sagittal image surface distortion, and the dotted line describes the meridional image surface distortion. Drawing (c) illustrates distortion. (d) illustrates longitudinal aberration, where the solid line denotes a value with respect to the sodium D line, the dotted line describes a value with respect to the F line, and the broken line represents a value with respect to the C line. (e) illustrates chromatic aberration of magnification, wherein the dotted line denotes a value with respect to the F line, and the broken line describes a value with respect to the C line. These drawings show that all of the three concrete numerical examples in the first embodiment, the three concrete numerical examples of the second embodiment, the three concrete numerical examples of the third embodiment, the three concrete numerical examples of the fourth embodiment possess good optical properties. In FIGS. 5 to 40, the vertical axis illustrate the height from the optical axis.

Figure 41:
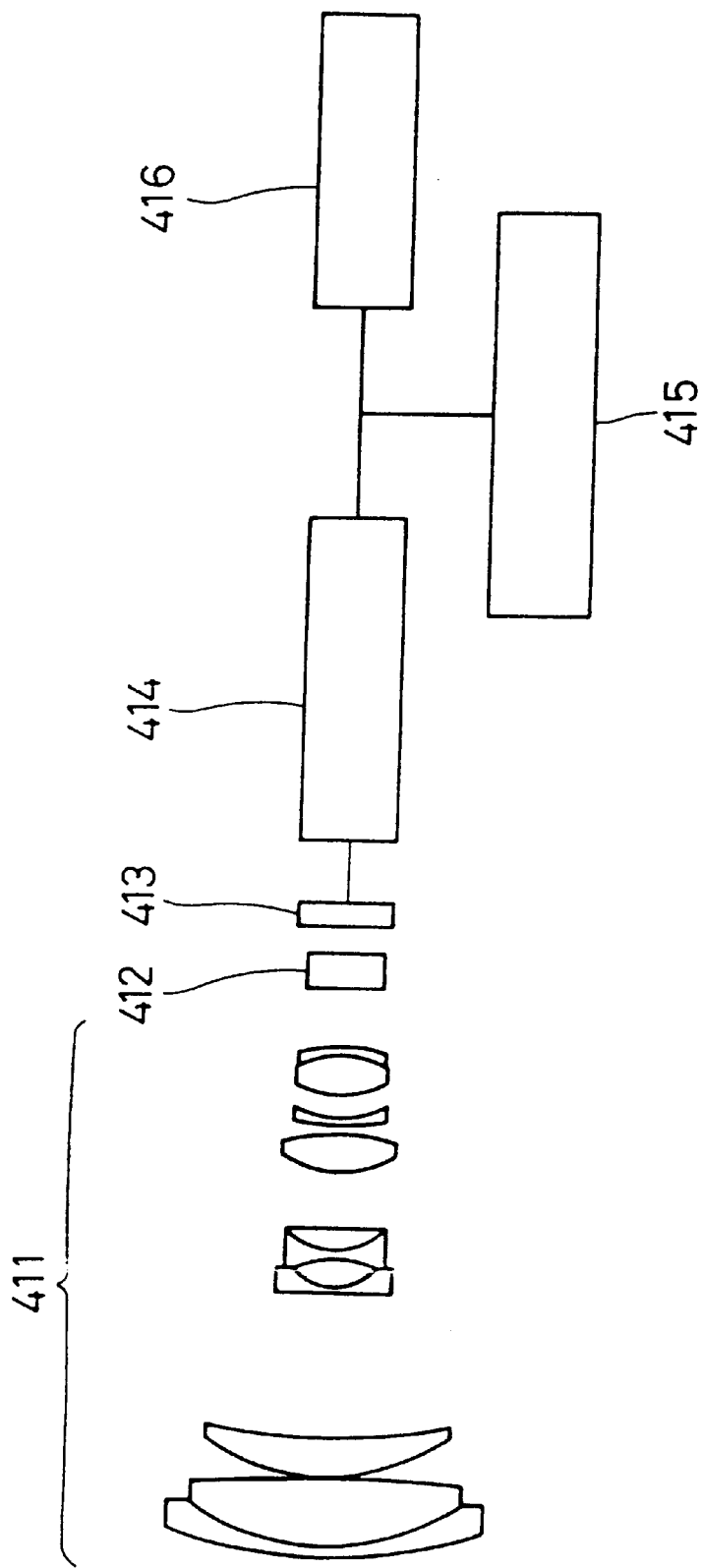
FIG. 41 is a diagram of the structure of a video camera comprising the zoom lens of the first embodiment.
Figure 42:
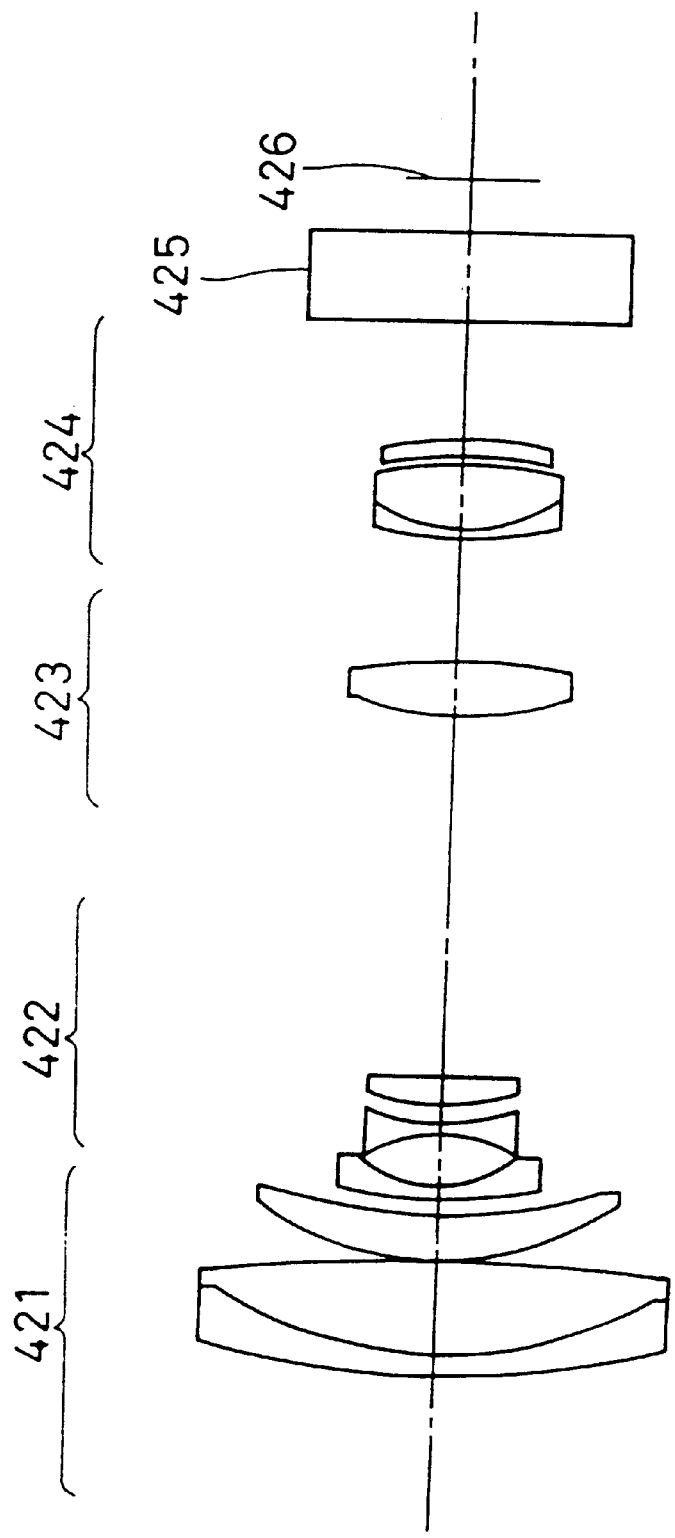
FIG. 42 is a diagram of the structure of a conventional zoom lens.

FIG. 41 illustrates an embodiment of a video camera comprising a zoom lens of the first embodiment of the present invention. In FIG. 41, the numeral 411 denotes the zoom lens of the first embodiment. The basic structure of the video camera includes a low-pass filter 412, an image pick up device 413, a signal processing circuit 414, a viewfinder 415 and a recording system 416. Other functions can be added optionally. It is understood that video cameras with a zoom lens of the second embodiment to the fourth embodiment can be produced similarly.

As this invention may be embodied in several forms without departing from the spirit of essential characteristics thereof, the present embodiments are therefore illustrative and not restrictive, since the scope of the invention is defined by the appended claims rather than by the description preceding them, and al changes that fall within metes and bounds of the claims, or equivalence of such metes and bounds are therefore intended to embraced by the claims.

What is claimed is:

1. A zoom lens, aligned respectively from the objective side and along an optical axis, the zoom lens having a focal plane, the zoom lens comprising a first lens group with a positive refracting power fixed with respect to the focal plane, a second lens group with a negative refracting power movable along the optical axis to provide a zooming effect, a third lens group with a positive refracting power fixed with respect to the focal plane to provide a converging effect, a fourth lens group with a positive refracting power movable along the optical axis to keep the focal plane at a certain distance from a reference plane by compensating the position change of the focal plane subsequent to the movement of the second lens group or the movement of the objective; wherein, the first lens group comprises, aligned from the objective side, a lens with a negative refracting power, a lens with a positive refracting power, and a meniscus lens with a positive refracting power having a convex surface at the objective side, the second lens group comprises, aligned from the objective side, a lens with a negative refracting power, a biconcave lens, and a lens with a positive refracting power, with at least one surface of at least one of the lens with a negative refracting power, the biconcave lens and the lens with a positive refracting power being aspheric;

the third lens group comprises, aligned from the objective side, a lens with a positive refracting power, and a lens with a negative refracting power having a convex surface at the objective side, with at least one surface of at least one of the lens with a positive refracting power and the lens with a negative refracting power being aspheric;

the fourth lens group comprises two lenses, with at least one surface of at least one of the two lenses being aspheric; the zoom lens satisfying $$0.1<(fw \cdot tan\ W)/(f1 \cdot |f2|)^{1/2}<0.35,$$

where fw is a focal length of the zoom lens operating in a wide angle condition, W is the half angle of view of the zoom lens operating in the wide angle condition, f1 is a focal length of the first lens group, f2 is a focal length of the second lens group, and 2W is at least 64°.

2. The zoom lens according to claim 1, wherein the fourth lens group comprises, aligned from the objective side, a lens with a positive refracting power and a lens with a negative refracting power.

3. The zoom lens according to claim 1, wherein the fourth lens group comprises, aligned from the objective side, a lens with a positive refracting power and a lens with a negative refracting power, said positive and negative lenses of the fourth lens group being bonded together.

4. The zoom lens according to claim 1, wherein the fourth lens group comprises, aligned from the objective side, a lens with a negative refracting power having a convex surface at the objective side and a lens with a positive refracting power.

5. The zoom lens according to claim 1, wherein the fourth lens group comprises, aligned from the objective side, a lens with a negative refracting power and a lens with a positive refracting power, said positive and negative lenses of the fourth lens group being bonded together.

6. The zoom lens according to claim 1, wherein the second lens group comprises, aligned from the objective side, a lens with a negative refracting power having a convex surface at the objective side, a biconcave lens having a negative refracting power, and a lens with a positive refracting power having a convex surface at the objective side which is bonded to the biconcave lens.

7. The zoom lens according to claim 1, wherein the conditions, $$3.0<f1/fw<9.0,$$

$$0.5<|f2|/fw<1.6,$$

$$2.0<f3/fw<7.0,$$

$$2.0<f4/fw<5.0,$$

and $$0.1<fw/r13<0.2$$

are satisfied, where fi is a focal length of the (i)th lens group (i=1, 2, 3, 4); and r13 is a curvature of the convex surface of the lens with a negative refracting power of the third lens group.

8. The zoom lens according to claim 1, wherein the conditions, $$6.4<f1/fw<8.6,$$

$$1.0<|f2|/fw<1.4,$$

$$3.7<f3/fw<5.2,$$

$$3.1<f4/fw<3.5,$$

$$0.13<fw/r13<0.16,$$

and $$0.182<(fw \cdot tan\ W)/(f1 \cdot |f2|)^{1/2}<0.248$$

are satisfied, where fi is a focal length of the (i)th lens group (i=1, 2, 3, 4), r13 is a curvature of the convex surface of the lens with a negative refracting power of the third lens group.

9. A zoom lens, aligned respectively from the objective side and along an optical axis, the zoom lens having a focal plane, the zoom lens comprising:
a first lens group with a positive refracting power fixed with respect to the focal plane,
a second lens group with a negative refracting power movable along the optical axis to provide a zoomimg effect,
a third lens group with a positive refracting power fixed with respect to the focal plane to provide a converging effect,
a fourth lens group with a positive refracting power movable along the optical axis to keep the focal plane at a certain distance from a reverence plane by compensating the position change of the focal plane subsequent to the movement of the second lens group or the movement of the objective; wherein,
the first lens group comprises, aligned from the objective side, a lens with a negative refracting power, a lens with a positive refracting power and a meniscus lens with a positive refracting power having a convex surface at the objective side,
the second lens group comprises, aligned from the objective side, a lens with a negative refracting power, a biconcave lens with a negative refracting power and a lens with a positive refracting power, with at least one surface of at least one of the lens with a negative refracting power, the biconcave lens and the lens with a positive refracting power being aspheric,
the third lens group comprises, aligned from the objective side, a lens with a ppositive refracting power, and a biconcave lens with a negative refracting power, with at least one surface of at least one of the lens with a positive refracting power and the biconcave lens being aspheric,
the fourth lens group comprises, aligned from the objective side, a lens with a positive refracting power and a lens with a negative refracting ppower, with at least one surface of at least one of the lens with a ppositive refracting power and the lens with a negative refracting power being aspheric;
the zoom lens satisfying $$0.1<(fw\cdot\tan W)/(f1\cdot|f2|)^{1/2}<0.35,$$

where fw is a focal length of the zoom lens operating in a wide angle condition,
W is the half angle of view of the zoom lens operating in the wide angle condition,
f1 is a focal length of the first lens group,
f2 is a focal length of the second lens group, and
2W is at least 64°.

10. The zoom lens according to claim 9 wherein the fourth lens group comprises, aligned from the objective side, a biconvex lens with a positive refracting power and a lens with a negative refracting power having a convex surface at the focal plane side.

11. The zoom lens according to claim 9, wherein the fourth lens group comprises, aligned from the objective side, a lens with a popsitive refracting power and a lens with a negative refracting power, said positive and negative lenses of the fourth lens group being bonded together.

12. The zoom lens according to claim 9, wherein the second lens group comprises, aligned from the objective side, a lens with a negative refracting power having a convex surface at the objective side, a biconcave lens having a negative refracting popwer, and a lens with a positive refracting power having a convex surface at the objective side which is bonded to the biconcave lens.

13. The zoom lens according to claim 9, wherein the conditions, $$3.0<f1/fw<10.0,$$
$$0.5<|f2|/fw<1.8,$$
$$2.0<f3/fw<7.0,$$
$$2.0<f4/fw<5.0,$$

and $$-0.2<fw/r13<-0.1$$

are satisfied, where fi is a focal length of the (i)th lens group (i=1, 2, 3, 4); and
r13 is a curvature of an objective side surface of the biconcave lens of the third lens group.

14. The zoom lens according to claim 9, wherein the conditions, $$6.6<f1/fw<9.3,$$
$$1.1<|f2|/fw<1.6,$$
$$4.1<f3/fw<4.6,$$
$$3.3<f4/fw<3.6,$$
$$-0.17<fw/r13<-0.15,$$

and $$0.168<(fw\cdot\tan W)/(f1\cdot|f2|)^{1/2}<0.236$$

are satisfied, where fi is a focal length of the (i)th lens group (i=1, 2, 3, 4),
r13 is a curvature of an objective side surface of the biconcave lens of the third lens group.

15. A zoom lens, aligned respectively from the objective side and along an optical axis, the zoom lens having a focal plane, the zoom lens comprising:
a first lens group with a positive refracting power fixed with respect to the focal plane,
a second lens group with a negative refracting power movable along the optical axis to provide a zooming effect,
a third lens group with a positive refracting power fixed with respect to the focal plane to provide a converging effect,
a fourth lens group with a positive refracting power movable along the optical axis to keep the focal plane at a certain distance from a reference plane by compensating the position change of the focal plane subsequent to the movement of the second lens group or the movement of the objective; wherein, the first lens group comprises, aligned from the objective side, a lens with a negative refracting power, a lens with a positive refracting power and a meniscus lens with a positive refracting power having a convex surface at the objective side, the second lens group comprises, aligned from the objective side, a lens with a negative refracting power, a biconcave lens and a lens with a positive refracting power, with at least one surface of at least one of the lens with a negative refracting power, the biconcave lens, and the lens with a positive refracting power being aspheric, the third lens group comprises, aligned from the objective side, a lens with a positive refracting power, and a biconcave lens with a negative refracting power, with at least one surface of at least one of the lens with a positive refracting power and the biconcave lens being aspheric, the fourth lens group comprises, aligned from the objective side, a lens with a negative refracting power and a lens with a positive refracting power, with at least one surface of at least one of the lens with a negative refracting power and the lens with a positive refracting power being aspheric;

the zoom lens satisfying $0.1 < (fw \cdot \tan W)/(f1 \cdot |f2|)^{1/2} < 0.35$, where fw is a focal length of the zoom lens operating in a wide angle condition, W is the half angle of view of the zoom lens operating in the wide angle condition, f1 is a focal length of the first lens group, f2 is a focal length of the second lens group, and 2W is at least 64°.

16. The zoom lens according to claim 15, wherein the fourth lens group comprises, aligned from the objective side, a lens with a negative refracting power having a convex surface at the objective side and a lens with a positive refracting power.

17. The zoom lens according to claim 15, wherein the fourth lens group comprises, aligned from the objective side, a lens with a negative refracting power and a lens with a positive refracting power, said positive and negative lenses of the fourth lens group being bonded together.

18. The zoom lens according to claim 15, wherein the second lens group comprises, aligned from the objective side, a lens with a negative refracting power having a convex surface at the objective side, a biconcave lens with a negative refracting power, and a lens with a positive refracting power having a convex surface at the objective side which is bonded to the biconcave lens.

19. The zoom lens according to claim 15, wherein the conditions, $3.0 < f1/fw < 12.0$, $0.5 < |f2|/fw < 1.8$, $2.0 < f3/fw < 7.0$, $2.0 < f4/fw < 5.0$, and $0.1 < fw/r13 < 0.2$ are satisfied where fi is a focal length of the (i)th lens group (i=1, 2, 3, 4), and r13 is a curvature of an objective side surface of the lens with a negative refracting power of the third lens group.

20. The zoom lens according to claim 15, wherein the conditions, $6.5 < f1/fw < 9.7$, $1.0 < |f2|/fw < 1.6$, $4.1 < f3/fw < 4.4$, $3.0 < f4/fw < 3.2$, $0.1 < fw/r13 < 0.2$, and $0.167 < (fw \cdot \tan W)/(f1 \cdot |f2|)^{1/2} < 0.246$ are satisfied, where fi is a focal length of the (i)th lens group (i=1, 2, 3, 4), and r13 is a curvature of an objective side surface of the biconcave lens of the third lens group.

21. A zoom lens, aligned respectively from the objective side and along an optical axis, the zoom lens having a focal plane, the zoom lens comprising:

a first lens group with a positive refracting power fixed with respect to the focal plane, a second lens group with negative refracting power movable along the optical axis to provide a zooming effect, a third lens group with a positive refracting power fixed with respect to the focal plane to provide a converging effect, a fourth lens group with a positive refracting power movable along the optical axis to keep the focal plane at a certain distance from a reference plane by compensating the position change of the focal plane subsequent to the movement of the second lens group or the movement of the objective; wherein, the first lens group comprises, aligned from the objective side, a lens with a negative refracting power, a lens with a positive refracting power and a meniscus lens with a positive refracting power having a convex surface at the objective side, the second lens group comprises, aligned from the objective side, a lens with a negative refracting power, a biconcave lens and a lens with a positive refracting power, with at least one surface of the lens with a negative refracting power, the biconcave lens, and the lens with a positive refracting power being aspheric, the third lens group comprises a biconvex lens with a positive refracting power, with at least one surface of said biconvex lens being aspheric, the fourth lens group comprises three lenses, with at least one surface of at least one of the three lenses being aspheric;

the zoom lens satisfying $0.1 < (fw \cdot \tan W)/(f1 \cdot |f2|)^{1/2} < 0.35$, where fw is a focal length of the zoom lens operating in a wide angle condition, W is the half angle of view of the zoom lens operating in the wide angle condition, f1 is a focal length of the first lens group, f2 is a focal length of the second lens group, and 2W is at least 64°.

22. The zoom lens according to claim 21, wherein the fourth lens group comprises, aligned from the objective side, a lens with a negative refracting power, a lens with a positive refracting power and a lens with a positive refracting power.

23. The zoom lens according to claim 21, wherein the second lens group comprises, aligned from the objective side, a lens with a negative refracting power having a convex surface at the objective side, a biconcave lens with a negative refracting power, and a biconvex lens with a positive refracting power which is bonded to the biconcave lens.

24. The zoom lens according to claim 21, wherein the second lens group comprises, aligned from the objective side, a lens with a negative refracting power having a convex surface at the objective side, a biconcave lens with a negative refracting power, and a lens with a positive refracting power having a convex surface at the objective side which is bonded to the biconcave lens.

25. The zoom lens according to claim 21, wherein the conditions, $3.0 < f1/fw < 12.0,$ $0.5 < |f2|/fw < 1.8,$ $2.0 < f3/fw < 7.0,$ $2.0 < f4/fw < 5.0,$ and $-0.8 < (f1 \cdot f2)/(f3 \cdot f4) < -0.1$ are satisfied, where fi is a focal length of the (i)th lens group (i=1, 2, 3, 4).

26. The zoom lens according to claim 21, wherein the conditions, $6.0 < f1/fw < 8.6,$ $1.0 < |f2|/fw < 1.5,$ $4.8 < f3/fw < 5.3,$ $3.8 < f4/fw < 4.0,$ $-0.7 < (f1 \cdot f2)/(f3 \cdot f4) < -0.3,$ and $0.181 < (fw \cdot \tan W)/(f1 \cdot |f2|)^{1/2} < 0.267$ are satisfied, where fi is a focal length of the (i)th lens group (i=1, 2, 3, 4).

27. A video camera using a zoom lens which is aligned respectively from the objective side and along an optical axis, the zoom lens having a focal plane, the zoom lens comprising:

a first lens group with a positive refracting power fixed with respect to the focal plane, a second lens group with a negative refracting power movable along the optical axis to provide a zooming effect, a third lens group with a positive refracting power fixed with respect to the focal plane to provide a converging effect, a fourth lens group with a positive refracting power movable along the optical axis to keep the focal plane at a certain distance from a reference plane by compensating the position change of the focal plane subsequent to the movement of the second lens group or the movement of the objective; wherein, the first lens group comprises, aligned from the objective side, a lens with a negative refracting power, a lens with a positive refracting power, and a meniscus lens with a positive refracting power having a convex surface at the objective side, the second lens group comprises, aligned from the objective side, a lens with a negative refracting power, a biconcave lens, and a lens with a positive refracting power, with at least one surface of at least one of the lens with a negative refracting power, the biconcave lens and the lens with a positive refracting power being aspheric;

the third lens group comprises, aligned from the objective side, a lens with a positive refracting power, and a lens with a negative refracting power having a convex surface at the objective side, with at least one surface of at least one of the lens with a positive refracting power and the lens with a negative refracting power being aspheric;

the fourth lens group comprises two lenses, with at least one surface of at least one of the two lenses being aspheric; the zoom lens satisfying $0.1 < (fw \cdot \tan W)/(f1 \cdot |f2|)^{1/2} < 0.35,$ where fw is a focal length of the zoom lens operating in a wide angle condition, W is the half angle of view of the zoom lens operating in the wide angle condition, f1 is a focal length of the first lens group, f2 is a focal length of the second lens group, and 2W is at least 64.

28. The video camera according to claim 27, wherein the fourth lens group of thezoom lens comprises, aligned from the objective side, a lens with a positive refracting power and a lens with a negative refracting power.

29. The video camera according to claim 27, wherein the fourth lens group of the zoom lens comprises, aligned from the objective side, a lens with a positive refracting power and a lens with a negative refracting power, said positive and negative lenses of the fourth lens group being bonded together.

30. The video camera according to claim 27, wherein the fourth lens group of the zoom lens comprises, aligned from the objective side, a lens with a negative refracting power having a convex surface at the objective side and a lens with a positive refracting power.

31. The video camera according to claim 27, wherein the fourth lens group of the zoom lens comprises, aligned from the objective side, a lens with a negative refracting power and a lens with a positive refracting power, said positive and negative lenses of the fourth lens group being bonded together.

32. The video camera according to claim 27, wherein the second lens group of the zoom lens comprises, aligned from the objective side, a lens with a negative refracting power having a convex surface at the objective side, a biconcave lens with a negative refracting power, and a lens with a positive refracting power having a convex surface at the objective side which is bonded to the biconcave lens.

33. The video camera according to claim 27, wherein the conditions of the zoom lens, $3.0 < f1/fw < 9.0,$ $0.5 < |f2|/fw < 1.6,$ $2.0 < f3/fw < 7.0,$ $2.0 < f4/fw < 5.0,$ and $0.1 < fw/r13 < 0.2$ are satisfied, where fi is a focal length of the (i)th lens group (i=1, 2, 3, 4); and r13 is a curvature of the convex surface of the lens with a negative refracting power of the third lens group.

34. The video camera according to claim 27, wherein the conditions of the zoom lens, $6.4 < f1/fw < 8.6,$ $1.0 < |f2|/fw < 1.4,$ $3.7 < f3/fw < 5.2,$ $3.1 < f4/fw < 3.5,$ $0.13 < fw/r13 < 0.16,$ and $0.182 < (fw \cdot \tan W)/(f1 \cdot |f2|)^{1/2} < 0.248$ are satisfied, where fi is a focal length of the (i)th lens group (i=1, 2, 3, 4);

r13 is a curvature of the convex surface of the lens with a negative refracting power of the third lens group.

35. A video camera using a zoom lens which is aligned respectively from the objective side and along an optical axis, the zoom lens having a focal plane, the zoom lens comprising:

a first lens group with a positive refracting power fixed with respect to the focal plane, a second lens group with a negative refracting power movable along the optical axis to provide a zooming effect, a third lens group with a positive refracting power fixed with respect to the focal plane to provide a converging effect, a fourth lens group with a positive refracting power movable along the optical axis to keep the focal plane at a certain distance from a reference plane by compensating the position change of the focal plane subsequent to the movement of the second lens group or the movement of the objective; wherein, the first lens group comprises, aligned from the objective side, a lens with a negative refracting power, a lens with a positive refracting power and a meniscus lens with a positive refracting power having a convex surface at the objective side, the second lens group comprises, aligned from the objective side, a lens with a negative refracting power, a biconcave lens with a negative refracting power and a lens with a positive refracting power, with at least one surface of at least one of the lens with a negative refracting power, the biconcave lens and the lens with a positive refracting power being aspheric, the third lens group comprises, aligned from the objective side, a lens with a positive refracting power, and a biconcave lens with a negative refracting power, with at least one surface of at least one of the lens with a positive refracting power and the biconcave lens being aspheric;

the fourth lens group comprises, aligned from the objective side, a lens with a positive refracting power and a lens with a negative refracting power, with at least one surface of at least one of the lens with a positive refracting power and the lens with a negative refracting power being aspheric;

the zoom lens satisfying $0.1 < (fw \cdot \tan W)/(f1 \cdot |f2|)^{1/2} < 0.35,$ where fw is a focal length of the zoom lens operating in a wide angle condition, W is the half angle of view of the zoom lens operating in the wide angle condition, f1 is a focal length of the first lens group, f2 is a focal length of the second lens group, and 2W is at least 64°.

36. The video camera according to claim 35, wherein the fourth lens group of the zoom lens comprises, aligned from the objective side, a biconvex lens with a positive refracting power and a lens with a negative refracting power having a convex surface at the focal plane side.

37. The video camera according to claim 35, wherein the fourth lens group of the zoom lens comprises, aligned from the objective side, a lens with a positive refracting power and a lens with a negative refracting power, said positive and negative lenses of the fourth lens group being bonded together.

38. The video camera according to claim 35, wherein the second lens group of the zoom lens comprises, aligned from the objective side, a lens with a negative refracting power having a convex surface at the objective side, a biconcave lens having a negative refracting power, and a lens with a positive refracting power having a convex surface at the objective side which is bonded to the biconcave lens.

39. The video camera according to claim 35, wherein the conditions of the zoom lens, $3.0 < f1/fw < 10.0,$ $0.5 < |f2|/fw < 1.8,$ $2.0 < f3/fw < 7.0,$ $2.0 < f4/fw < 5.0,$ and $$-0.2 < fw/r13 < -0.1$$

are satisfied, where fi is a focal length of the (i)th lens group (i=1, 2, 3, 4); and r13 is a curvature of an objective side surface of the biconcave lens of the third lens group.

40. The video camera according to claim 35, wherein the conditions of the zoom lens, $$6.6 < f1/fw < 9.3,$$

$$1.1 < |f2|/fw < 1.6,$$

$$4.1 < f3/fw < 4.6,$$

$$3.3 < f4/fw < 3.6,$$

$$-0.17 < fw/r13 < -0.15,$$

and $$0.168 < (fw \cdot \tan W)/(f1 \cdot |f2|)^{1/2} < 0.236$$

are satisfied, where fi is a focal length of the (i)th lens group (i=1, 2, 3, 4);

r13 is a curvature of an objective side surface of the biconcave lens of the third lens group.

41. A video camera using a zoom lens which is aligned respectively from the objective side and along an optical axis, the zoom lens having a focal plane, the zoom lens comprising:

a first lens group with a positive refracting power fixed with respect to the focal plane, a second lens group with a negative refracting power movable along the optical axis to provide a zooming effect, a third lens group with a positive refracting power fixed with respect to the focal plane to provide a converging effect, a fourth lens group with a positive refracting power movable along the optical axis to keep the focal plane at a certain distance from a reference plane by compensating the position change of the focal plane subsequent to the movement of the second lens group or the movement of the objective; wherein, the first lens group comprises, aligned from the objective side, a lens with a negative refracting power, a lens with a positive refracting power and a meniscus lens with a positive refracting power having a convex surface at the objective side, the second lens group comprises, aligned from the objective side, a lens with a negative refracting power, a biconcave lens and a lens with a positive refracting power, with at least one surface of at least one of the lens with a negative refracting power, the biconcave lens, and the lens with a positive refracting power being aspheric, the third lens group comprises, aligned from the objective side, a lens with a positive refracting power, and a biconcave lens with a negative refracting power, with at least one surface of at least one of the lens with a positive refracting power and the biconcave lens being aspheric, the fourth lens group comprises, aligned from the objective side, a lens with a negative refracting power and a lens with a positive refracting power, with at least one surface of at least one of the lens with a negative refracting power and the lens with a positive refracting power being aspheric;

the zoom lens satisfying $$0.1 < (fw \cdot \tan W)/(f1 \cdot |f2|)^{1/2} < 0.35,$$

where fw is a focal length of the zoom lens operating in a wide angle condition, W is the half angle of view of the zoom lens operating in the wide angle condition, f1 is a focal length of the first lens group, f2 is a focal length of the second lens group, and 2W is at least 64°.

42. The video camera according to claim 41, wherein the fourth lens group of the zoom lens comprises, aligned from the objective side, a lens with a negative refracting power having a convex surface at the objective side and a lens with a positive refracting power.

43. The video camera according to claim 41, wherein the fourth lens group of the zoom lens comprises, aligned from the objective side, a lens with a negative refracting power and a lens with a positive refracting power, said positive and negative lenses of the fourth lens group being bonded together.

44. The video camera according to claim 41, wherein the second lens group of the zoom lens comprises, aligned from the objective side, a lens with a negative refracting power having a convex surface at the objective side, a biconcave lens with a negative refracting power, and a lens with a positive refracting power having a convex surface at the objective side which is bonded to the biconcave lens.

45. The video camera according to claim 41, wherein the conditions of the zoom lens, $$3.0 < f1/fw < 12.0,$$

$$0.5 < |f2|/fw < 1.8,$$

$$2.0 < f3/fw < 7.0,$$

$$2.0 < f4/fw < 5.0,$$

and $$0.1 < fw/r13 < 0.2$$

are satisfied, where fi is a focal length of the (i)th lens group (i=1, 2, 3, 4); and r13 is a curvature of an objective side surface of the lens with a negative refracting power of the third lens group.

46. The video camera according to claim 41, wherein the conditions of the zoom lens, $$6.5 < f1/fw < 9.7,$$

$$1.0 < |f2|/fw < 1.6,$$

$$4.1 < f3/fw < 4.4,$$

$3.0 < f4/fw < 3.2,$ $0.1 < fw/r13 < 0.2,$ and $0.167 < (fw \cdot \tan W)/(f1 \cdot |f2|)^{1/2} < 0.246$ are satisfied, where fi is a focal length of the (i)th lens group (i=1,2, 3, 4); and r13 is a curvature of an objective side surface of the biconcave lens of the third lens group.

47. A video camera using a zoom lens which is aligned respectively from the objective side and along an optical axis, the zoom lens having a focal plane, the zoom lens comprising:

a first lens group with a positive refracting power fixed with respect to the focal plane, a second lens group with a negative refracting power movable along the optical axis to provide a zooming effect, a third lens group with a positive refracting power fixed with respect to the focal plane to provide a converging effect, a fourth lens group with a positive refracting power movable along the optical axis to keep the focal plane at a certain distance from a reference plane by compensating the position change of the focal plane subsequent to the movement of the second lens group or the movement of the objective; wherein, the first lens group comprises, aligned from the objective side, a lens with a negative refracting power, a lens with a positive refracting power and a meniscus lens with a positive refracting power having a convex surface at the objective side, the second lens group comprises, aligned from the objective side, a lens with a negative refracting power, a biconcave lens and a lens with a positive refracting power, with at least one surface of the lens with a negative refracting power, the biconcave lens, and the lens with a positive refracting power being aspheric, the third lens group comprises a biconvex lens with a positive refracting power, with at least one surface of said biconvex lens being aspheric, the fourth lens group comprises three lenses, with at least one surface of at least one of the three lenses being aspheric;

the zoom lens satisfying $0.1 < (fw \cdot \tan W)/(f1 \cdot |f2|)^{1/2} < 0.35,$ where fw is a focal length of the zoom lens operating in a wide angle condition, W is the half angle of view of the zoom lens operating in the wide angle condition, f1 is a focal length of the first lens group, f2 is a focal length of the second lens group, and 2W is at least 64°.

48. The video camera according to claim 47, wherein the fourth lens group of the zoom lens comprises, aligned from the objective side, a lens with a negative refracting power, a lens with a positive refracting power and a lens with a positive refracting power.

49. The video camera according to claim 47, wherein the second lens group of the zoom lens comprises, aligned from the objective side, a lens with a negative refracting power having a convex surface at the objective side, a biconcave lens with a negative refracting power, and a biconvex lens with a positive refracting power which is bonded to the biconcave lens.

50. The video camera according to claim 47, wherein the second lens group of the zoom lens comprises, aligned from the objective side, a lens with a negative refracting power having a convex surface at the objective side, a biconcave lens with a negative refracting power, and a lens with a positive refracting power having a convex surface at the objective side which is bonded to the biconcave lens.

51. The video camera according to claim 47, wherein the conditions of the zoom lens, $3.0 < f1/fw < 12.0,$ $0.5 < |f2|/fw < 1.8,$ $2.0 < f3/fw < 7.0,$ $2.0 < f4/fw < 5.0,$ and $-0.8 < (f1 \cdot f2)/(f3 \cdot f4) < -0.1$ are satisfied, where fi is a focal length of the (i)th lens group (i=1, 2, 3, 4).

52. The video camera according to claim 47, wherein the conditions of the zoom lens, $6.0 < f1/fw < 8.6,$ $1.0 < |f2|/fw < 1.5,$ $4.8 < f3/fw < 5.3,$ $-0.7 < (f1 \cdot f2)/(f3 \cdot f4) < -0.3,$ and $0.181 < (fw \cdot \tan W)/(f1 \cdot |f2|)^{1/2} < 0.267$ are satisfied, where fi is a focal length of the (i)th lens group (i=1, 2, 3, 4).

53. The zoom lens according to claim 1, wherein the zoom lens has an F No. as low as about 1.4.

54. The zoom lens according to claim 1, wherein the zoom lens has a zoom ratio of about 14.

55. The zoom lens according to claim 9, wherein the zoom lens has an F No. as low as about 1.4.

56. The zoom lens according to claim 9, wherein the zoom lens has a zoom ratio of about 14.

57. The zoom lens according to claim 15, wherein the zoom lens has an F No. as low as about 1.4.

58. The zoom lens according to claim 15, wherein the zoom lens has a zoom ratio of about 14.

59. The zoom lens according to claim 21, wherein the zoom lens has an F No. as low as about 1.4.

60. The zoom lens according to claim 21, wherein the zoom lens has a zoom ratio of about 14.

61. The video camera according to claim 27, wherein the zoom lens has an F No. as low as about 1.4.

62. The video camera according to claim 27, wherein the zoom lens has a zoom ratio of about 14.

63. The video camera according to claim 35, wherein the zoom lens has an F No. as low as about 1.4.

64. The video camera according to claim 35, wherein the zoom lens has a zoom ratio of about 14.

65. The video camera according to claim 41, wherein the zoom lens has an F No. as low as about 1.4.

66. The video camera according to claim 41, wherein the zoom lens has a zoom ratio of about 14.

67. The video camera according to claim 47, wherein the zoom lens has an F No. as low as about 1.4.

68. The video camera according to claim 47, wherein the zoom lens has a zoom ratio of about 14.

* * * * *